(12) United States Patent
Rao et al.

(10) Patent No.: US 10,331,764 B2
(45) Date of Patent: Jun. 25, 2019

(54) METHODS AND SYSTEM FOR AUTOMATICALLY OBTAINING INFORMATION FROM A RESUME TO UPDATE AN ONLINE PROFILE

(71) Applicant: Hired, Inc., San Francisco, CA (US)

(72) Inventors: Ashwin Rao, Palo Alto, CA (US); Gaurav Bubna, Kolkata (IN); Zubin Mehta, Mumbai (IN)

(73) Assignee: Hired, Inc., San Francisco, CA (US)

( * ) Notice: Subject to any disclaimer, the term of this patent is extended or adjusted under 35 U.S.C. 154(b) by 530 days.

(21) Appl. No.: 14/723,404

(22) Filed: May 27, 2015

(65) Prior Publication Data

US 2015/0317610 A1 Nov. 5, 2015

Related U.S. Application Data

(63) Continuation-in-part of application No. 14/269,691, filed on May 5, 2014, now abandoned.

(51) Int. Cl.
| | |
|---|---|
| G06F 17/21 | (2006.01) |
| G06F 17/27 | (2006.01) |
| G06Q 10/10 | (2012.01) |
| G06F 17/22 | (2006.01) |
| G06Q 10/06 | (2012.01) |

(52) U.S. Cl.
CPC .......... *G06F 17/21* (2013.01); *G06F 17/2229* (2013.01); *G06F 17/2705* (2013.01); *G06F 17/2745* (2013.01); *G06F 17/2785* (2013.01); *G06Q 10/063112* (2013.01); *G06Q 10/10* (2013.01); *G06Q 10/105* (2013.01); *G06Q 10/1053* (2013.01)

(58) Field of Classification Search
CPC .................................................. G06F 17/2745
USPC .................................... 705/320, 321; 704/9
See application file for complete search history.

(56) References Cited

U.S. PATENT DOCUMENTS

| | | | |
|---|---|---|---|
| 6,385,620 B1 | 5/2002 | Kurzius et al. | |
| 6,874,002 B1 * | 3/2005 | Peleus | G06F 17/30616 707/812 |
| 6,917,952 B1 | 7/2005 | Dailey et al. | |
| 7,650,286 B1 † | 1/2010 | Obeid | |
| 7,711,573 B1 | 5/2010 | Obeid | |
| 8,010,460 B2 | 8/2011 | Work et al. | |

(Continued)

OTHER PUBLICATIONS

Office Communication dated Dec. 11, 2013 for U.S. Appl. No. 13/672,132.

(Continued)

*Primary Examiner* — Tamara Griffin
(74) *Attorney, Agent, or Firm* — Wolf, Greenfield & Sacks, P.C.

(57) ABSTRACT

Techniques involving accessing a resume of a person; automatically parsing the resume at least in part by: identifying, based at least in part on formatting of the resume, a plurality of sections in the resume including a first section; identifying, based at least in part on content in the first section and formatting of the content, a plurality of subsections of the first section; and processing text in the plurality of subsections to identify a plurality of credentials and associated attributes; and updating a profile for the person to reflect the plurality of credentials and the associated attributes.

23 Claims, 23 Drawing Sheets

(56) References Cited

U.S. PATENT DOCUMENTS

| | | | |
|---|---|---|---|
| 8,209,374 B2 | 6/2012 | Work | |
| 8,261,186 B2* | 9/2012 | Mansfield | G06F 17/211 715/234 |
| 8,352,311 B2† | 1/2013 | Twyman | |
| 8,595,149 B1* | 11/2013 | Obeid | G06Q 10/06 705/1.1 |
| 8,600,931 B1* | 12/2013 | Wehrle | G06Q 10/1053 707/607 |
| 8,620,909 B1 | 12/2013 | Rennison | |
| 8,650,177 B2 | 2/2014 | Skomoroch et al. | |
| 9,311,371 B2* | 4/2016 | Mohan | G06F 16/258 |
| 9,430,464 B2* | 8/2016 | Carrier | G06F 17/28 |
| 2001/0039508 A1 | 11/2001 | Nagler et al. | |
| 2003/0101121 A1 | 5/2003 | Spampinato et al. | |
| 2004/0254822 A1 | 12/2004 | Mandelbaum | |
| 2005/0080657 A1 | 4/2005 | Crow et al. | |
| 2005/0177408 A1 | 8/2005 | Miller | |
| 2006/0106629 A1 | 5/2006 | Cohen et al. | |
| 2006/0229896 A1 | 10/2006 | Rosen et al. | |
| 2006/0265258 A1 | 11/2006 | Powell et al. | |
| 2006/0271421 A1 | 11/2006 | Steneker et al. | |
| 2007/0027672 A1* | 2/2007 | Decary | G06F 17/278 704/7 |
| 2008/0086366 A1 | 4/2008 | Concordia et al. | |
| 2008/0222133 A1 | 9/2008 | Au | |
| 2009/0276209 A1* | 11/2009 | Dane | G06F 17/271 704/9 |
| 2009/0299993 A1 | 12/2009 | Novack | |
| 2010/0070492 A1 | 3/2010 | Dattatri et al. | |
| 2010/0153289 A1 | 6/2010 | Schneiderman et al. | |
| 2010/0191748 A1* | 7/2010 | Martin | G06F 16/355 707/750 |
| 2011/0137816 A1 | 6/2011 | Kornblum et al. | |
| 2011/0137900 A1* | 6/2011 | Chang | G06F 17/30707 707/737 |
| 2011/0238591 A1 | 9/2011 | Kerr et al. | |
| 2011/0276356 A1 | 11/2011 | Smith et al. | |
| 2011/0313963 A1 | 12/2011 | Liu et al. | |
| 2012/0041955 A1* | 2/2012 | Regev | G06F 17/3071 707/740 |
| 2012/0066017 A1 | 3/2012 | Siegel | |
| 2012/0197733 A1 | 8/2012 | Skomoroch et al. | |
| 2012/0226623 A1 | 9/2012 | Jurney et al. | |
| 2012/0278227 A1 | 11/2012 | Kolo et al. | |
| 2013/0036065 A1 | 2/2013 | Chen et al. | |
| 2013/0103758 A1 | 4/2013 | Alison et al. | |
| 2013/0198599 A1* | 8/2013 | Kumar | G06F 17/30424 715/227 |
| 2013/0262175 A1 | 10/2013 | Deshpande et al. | |
| 2013/0346334 A1 | 12/2013 | Van Pelt | |
| 2014/0101186 A1 | 4/2014 | Lau et al. | |
| 2014/0122355 A1* | 5/2014 | Hardtke | G06Q 10/105 705/321 |
| 2014/0122356 A1 | 5/2014 | Rao | |
| 2014/0122357 A1 | 5/2014 | Rao | |
| 2014/0122358 A1 | 5/2014 | Rao | |
| 2014/0122359 A1 | 5/2014 | Rao | |
| 2014/0122360 A1 | 5/2014 | Rao | |
| 2014/0164512 A1 | 6/2014 | Allen et al. | |
| 2014/0180947 A1 | 6/2014 | Baeck et al. | |
| 2014/0250024 A1* | 9/2014 | Takalpati | G06Q 10/1053 705/321 |
| 2014/0337242 A1 | 11/2014 | Bailey et al. | |
| 2014/0369602 A1* | 12/2014 | Meier | G06K 9/00463 382/182 |
| 2015/0220884 A1 | 8/2015 | Kabdebon | |
| 2015/0248645 A1 | 9/2015 | Rao et al. | |
| 2015/0248648 A1 | 9/2015 | Rao et al. | |
| 2015/0317602 A1 | 11/2015 | Rao et al. | |
| 2015/0317603 A1 | 11/2015 | Rao et al. | |
| 2015/0317604 A1 | 11/2015 | Bubna et al. | |
| 2015/0317605 A1 | 11/2015 | Rao et al. | |
| 2015/0317606 A1 | 11/2015 | Bubna et al. | |
| 2016/0117551 A1* | 4/2016 | Hausmann | G06K 9/00463 382/161 |

OTHER PUBLICATIONS

Office Communication dated Jul. 8, 2014 for U.S. Appl. No. 13/672,132.
Office Communication dated Apr. 30, 2015 for U.S. Appl. No. 13/672,132.
Office Communication dated Dec. 18, 2013 for U.S. Appl. No. 13/672,206.
Office Communication dated Jul. 7, 2014 for U.S. Appl. No. 13/672,206.
Office Communication dated Apr. 30, 2015 for U.S. Appl. No. 13/672,206.
Office Communication dated Dec. 29, 2014 for U.S. Appl. No. 13/672,263.
Office Communication dated Jan. 12, 2015 for U.S. Appl. No. 13/672,331.
Office Communication dated Dec. 29, 2014 for U.S. Appl. No. 13/672,374.
Office Communication dated Aug. 21, 2015 for U.S. Appl. No. 13/672,132.
Office Communication dated Aug. 24, 2015 for U.S. Appl. No. 13/672,206.
Office Communication dated Apr. 3, 2015 for U.S. Appl. No. 13/672,263.
Office Communication dated Jul. 20, 2015 for U.S. Appl. No. 13/672,263.
Office Communication dated Apr. 28, 2016 for U.S. Appl. No. 13/672,263.
Office Communication dated Apr. 3, 2015 for U.S. Appl. No. 13/672,331.
Office Communication dated Jul. 23, 2015 for U.S. Appl. No. 13/672,331.
Office Communication dated Apr. 6, 2015 for U.S. Appl. No. 13/672,374.
Office Communication dated Jul. 15, 2015 for U.S. Appl. No. 13/672,374.
Preacher et al., Advantages of Monte Carlo Confidence Intervals for Indirect Effects. Communication Methods and Measures. Apr. 2012. 6(2):77-98.
[No Author Found], Recruiter Split Placement Networks. Recruiter. com. Wayback machine. Apr. 4, 2014. Last accessed Jun. 15, 2018. 4 pages. https://web.archive.org/web/20140404050134/https://www.recruiter.com/i/recruiter-split-placement-networks-sites/ entire document.

\* cited by examiner
† cited by third party

FIG. 7

DETAILS

Job Title (required)

Required Skills

Preferred Skills

Experience  0  to  5  Years ▶

EDUCATION

Preferred Universities

Examples of schools (ideally at least 3) that typify the kind of education you are looking for.

Highest Degree Preferences

Ph.D   Masters   Bachelors
I like     ○      ⦿       ○
I don't like   ○      ○       ○    (You can select "I don't like" option for maximum 2 degrees)
Neutral    ⦿      ○       ⦿

Preferred Fields of Study

Other Fields of Study

You may select multiple fields of study to select a broader candidate pool.

Save   Cancel

METHODS AND SYSTEM FOR AUTOMATICALLY OBTAINING INFORMATION FROM A RESUME TO UPDATE AN ONLINE PROFILE

CROSS REFERENCE TO RELATED APPLICATIONS

This application claims the benefit under 35 U.S.C. § 120 and is a continuation-in-part of U.S. application Ser. No. 14/269,691, entitled "SCORING MODEL METHODS AND APPARATUS" filed on May 5, 2014, which is incorporated by reference herein in its entirety.

BACKGROUND

People use online services and/or websites to make their biographical information and credentials accessible to others. Among other benefits, making credentials accessible to others on such online services and/or websites (e.g., LinkedIn®, Monster®, Indeed®, and Facebook®, etc.) allows people to search for jobs, provides a platform for networking with others, facilitates employers in their search for job applicants, and permits professionals to obtain information about people with whom they are doing business. A person who wishes to make his or her credentials accessible to others via an online service and/or website may create a profile on the online service and/or website and enter information about his/her credentials into the profile.

SUMMARY

Some embodiments provide for a method comprising using at least one computer hardware processor to perform: (1) accessing a resume of a person; (2) automatically parsing the resume at least in part by: identifying, based at least in part on formatting of the resume, a plurality of sections in the resume including a first section; identifying, based at least in part on content in the first section and formatting of the content, a plurality of subsections of the first section; and processing text in the plurality of subsections to identify a plurality of credentials and associated attributes; and (3) updating a profile for the person to reflect the plurality of credentials and the associated attributes.

Some embodiments provide for at least one non-transitory computer-readable storage medium storing processor executable instructions that, when executed using at least one computer hardware processor, cause the at least one computer hardware processor to perform a method. The method comprises: (1) accessing a resume of a person; (2) automatically parsing the resume at least in part by: identifying, based at least in part on formatting of the resume, a plurality of sections in the resume including a first section; identifying, based at least in part on content in the first section and formatting of the content, a plurality of subsections of the first section; and processing text in the plurality of subsections to identify a plurality of credentials and associated attributes; and (3) updating a profile for the person to reflect the plurality of credentials and the associated attributes.

Some embodiments provide for a system comprising at least one computer hardware processor configured to perform: (1) accessing a resume of a person; (2) automatically parsing the resume at least in part by: identifying, based at least in part on formatting of the resume, a plurality of sections in the resume including a first section; identifying, based at least in part on content in the first section and formatting of the content, a plurality of subsections of the first section; and processing text in the plurality of subsections to identify a plurality of credentials and associated attributes; and (3) updating a profile for the person to reflect the plurality of credentials and the associated attributes.

BRIEF DESCRIPTION OF DRAWINGS

Various aspects and embodiments of the application will be described with reference to the following figures. It should be appreciated that the figures are not necessarily drawn to scale.

FIG. 7 shows an illustrative example of a user interface that may be provided to a candidate by a talent scoring system, in accordance with some embodiments.

FIG. 15 shows an illustrative example of an interface that may be used to specify job requirements for a job, in accordance with some embodiments.

DETAILED DESCRIPTION

Figure 1:
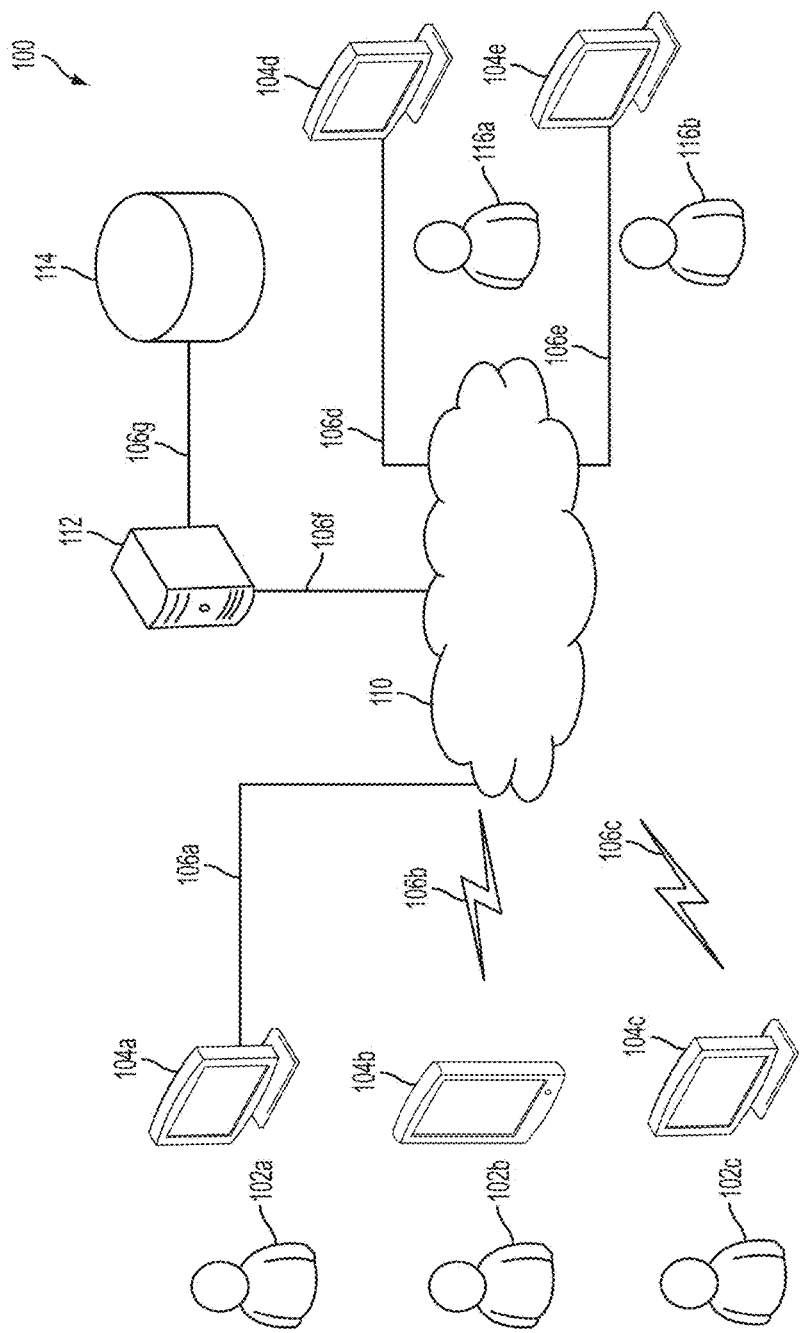
FIG. 1 shows an illustrative environment in which some embodiments may operate.

As described above, a person may create an online profile on an online service and/or website and enter information about his/her credentials into the online profile. This process of creating, updating, and maintaining the online profile requires people to perform a lot of manual operations and, as a result, many people have incomplete online profiles. When many user profiles accessible via an online service and/or website are incomplete, the recruiting and networking benefits provided by the online service and/or website are diminished. For example, an employer seeking to hire employees may not be able to find the best job candidates from among the users of the online service and/or website because the online profiles of potential job candidates do not accurately reflect all of their credentials, including potentially one or more of the credentials sought by the employer.

The inventors have recognized that the above problem may be addressed by using automated techniques for generating and updating a person's online profile based on information contained in the person's resume, and have developed techniques to automatically extract information from an electronic version of a resume accurately so that a person's online profile can be created and populated so that it faithfully presents the information contained in the resume.

Some aspects of the techniques described herein are derived from the inventors' recognition that conventional techniques for automatically extracting information from a document, such as a resume, often mischaracterize information in the resume due, in part, to a reliance on keyword matching. As a result, conventional techniques are not accurate enough to be used to automatically produce an online profile satisfactorily. Although conventional techniques may be used to determine whether certain keywords appear in a resume, this is not sufficient to create profile that accurately reflects the information provided in a resume.

As a simple example to illustrate deficiencies in conventional keyword matching, the presence of the keyword "Boston University" in a resume does not indicate whether the person attended Boston University or works at Boston University. However, attending Boston University is an academic credential and has a very different significance to a prospective employer than a professional credential indicating that a person worked at Boston University. As a result, conventional keyword matching techniques for automatically extracting information from resumes cannot be used for a variety of applications in which the structure of information in a resume matters, such as for automatically generating or updating a person's online profile on one or more online services/websites. For example, it is unclear how to update a person's online profile with the information "Boston University," when it is ambiguous that "Boston University" is an employer where the person worked or a school where the person studied.

The inventors have appreciated that contextual information (e.g., formatting information) of a resume may be used to more accurately assess the meaning of the resume's content so that a person's information can be accurately reflected in an automatically generated online profile. Accordingly, some embodiments provide for automated techniques, developed by the inventors, for processing resumes based not only on the content of the resumes, but also on the formatting of the content, to obtain information about the credentials described in the resumes. The inventors have recognized that using content and formatting information together allows for the structure of the information in the resume to be accurately extracted, which provides context to the information in the resume and enables a computer to process that information appropriately.

With reference to the example above, techniques described herein would not only identify that the keyword "Boston University" appears in a particular resume, but also determine whether the keyword appears in the Education or the Experience section of the resume. As a result, credentials information obtained from a person's resume in accordance with embodiments described herein may be used to automatically populate the person's online profile by resolving any ambiguities as to the significance of a credential using contextual information (e.g., formatting information).

Accordingly, in some embodiments, resumes are processed to: (1) identify sections having different semantic content (e.g., a section containing information about academic credentials, a section containing information about professional credentials such as employment history, etc.); (2) identify subsections within the sections that corresponding to particular credentials (e.g., a degree from a particular school, a particular previously held job, etc.); (3) process the subsections to identify the credentials and their attributes described therein. Each of the above-listed steps may be performed based on content in the resume and on formatting of that content, as described in more detail below with reference to FIGS. 18 and 21.

The inventors have also appreciated that conventional approaches to recruiting candidates for jobs require significant manual effort to be expended, which is not only costly from a time and money perspective, but manually driven approaches to evaluating candidates often injects unwanted subjectivity into the process. As discussed above, manual effort is needed to identify candidates for the job as well as to evaluate the suitability of each identified candidate for the job. Often multiple people are involved in each of these tasks such as, for example, one or more human resources personnel of an employer, third-party human resources personnel (e.g., recruiting consultants), one or one or more employees (e.g., employees whose jobs relate to the job for which candidates are sought), and/or other personnel.

Such personnel may expend significant amounts of time preparing and placing job advertisements, providing information about the job to candidates requesting further information about the job, gathering and evaluating credentials for each candidate that shows interest and/or applies for the job, interviewing candidates, comparing evaluations of candidates performed by different people, etc. As a result, the overall hiring effort is slow, results in hiring delays and may involve significant costs, due at least in part to processing candidates that may be unsuitable and/or are unlikely to be the best fit for the job.

The inventor has appreciated that an improved approach to recruiting could be provided if the task of evaluating the suitability of a candidate for a job could be at least partially automated. Thus, some embodiments described herein relate to automating one or more aspects of evaluating the suitability of a candidate for a job based on the candidate's credentials. The inventor has also appreciated that, when seeking candidates for a job, employers find it difficult to articulate precisely the profile of candidates they are seeking. For example, an employer may specify that, for a particular job, the employer prefers a candidate that has an undergraduate degree in economics, has programming experience, and speaks Japanese.

In the example above, it is not clear from these preferences alone, however, whether the employer seeks candidates with an undergraduate degree in economics from any university or specific universities (e.g., universities having an economics department ranked among the top-ten). It is also unclear how much programming expertise the employer desires candidates for the job to have (e.g., basic familiarity, some experience, or extensive experience with programming). It is also unclear how much facility with Japanese (e.g., familiarity, proficiency, or fluency) is desired.

Imprecisely specified preferences may lead to employers receiving inquiries and applications from candidates that loosely meet the credentials the employer is seeking, but who may not be the candidate the employer is specifically targeting. Thus, without better means for specifying preferences, the candidate pool on which an employer must perform further diligence may include numerous candidates that are not a suitable fit and/or the candidate pool may not include candidates representing the best fit for the job.

As an example of the above described issue, if an employer is seeking candidates with an undergraduate economics degree only from universities having one of the top-ten ranked economics departments, the employer may receive job inquires and/or applications from candidates having an economics degree from other universities that the employer is not inclined to consider. As another example, if the employer is seeking candidates having a basic familiarity with programming, the employer may receive job applications from candidates having extensive experience with programming that may for one reason or another be less suitable for the job than less experienced programmers. Not only do these less desirable candidates frequently undergo costly further processing, without more precise credential specifications, the more appropriate candidates may even be excluded from the candidate pool in mistaken preference for candidates that do not provide as suitable a fit.

It may often be the case that when an employer specifies multiple credentials for a candidate, the employer may not specify the extent to which these credentials matter when evaluating the candidate (e.g., the employer may not specify the significance each credential will play in evaluating the suitability of candidates). For instance, in the above-described example, it is unclear whether or not the employer prefers someone with extensive programming experience and proficiency in Japanese to someone who is fluent in Japanese, but only has basic familiarity with programming. That is, one or the other specified credential may be of secondary significance in connection with suitability for a given job. Such imprecision may lead to a mismatch between the types of candidates applying for a job and the types of candidates that the employer seeks.

The inventor has recognized that an improved approach to identifying and evaluating candidates for a job could be provided if employers were able to articulate more precisely the credentials they are seeking in candidates for a job. Thus, some embodiments described herein relate to providing tools for helping employers to specify their preferences for credentials as well to specify how much these credentials matter when evaluating candidates (e.g., by allowing employers to specify the significance of one or more specified credentials). In addition, the inventor has appreciated that identifying suitable candidates may be facilitated by automating the process of applying specified preferences to candidates to evaluate their suitability for a job.

Accordingly, some embodiments are directed to a talent scoring system and method configured to calculate a talent score of a candidate that is indicative of the candidate's suitability for a job. The talent scoring system/method may be configured to calculate the candidate's talent score based at least in part on one or more of the candidate's credentials. Additionally, the talent scoring system may be configured to calculate the candidate's talent score based at least in part on one or more credential value preferences specified for the job by an employer, a candidate seeking to understand his or her suitability for the job, or otherwise specified.

The inventors have appreciated that a talent score calculated based on the candidate's credentials and an employer's credential value preferences may have some degree of uncertainty resulting, at least in part, from the fact that the credentials used to obtain the talent score are not perfectly quantifiable with absolute certainty. Accordingly, an employer may be interested in ascertaining the level of certainty associated with a given talent score for a candidate. The inventors have developed techniques for computing a confidence interval or range about a given talent score that provides a measure of uncertainty associated with a given talent score. For example, a computed talent score of 85 with a relatively high level of certainty may have associated with it a range from 83 to 87, while a computed talent score of 85 with a relatively low level of certainty may have associated with it a (wider) range from 78 to 92. While the example uncertainty intervals above are symmetric about the talent score, in other embodiments the range of uncertainty may be asymmetric about the talent score.

Accordingly, some embodiments provide for techniques for computing a range for a given computed talent score based, at least in part, on the type and/or value of the credentials used in computing the talent score. This range provides a measure of the certainty associated with a given talent score. As such, according to some embodiments, a talent score provided to an employer and/or candidate may be accompanied by a minimum value and a maximum value defining the above-described range that characterizes the certainty/uncertainty of the associated talent score.

The inventors have further appreciated that online services provided for multiple users (frequently large numbers of users) such as business and/or professional online service sites such as LinkedIn® or Monster® and/or social networking sites such as Facebook® provide search facilities that allow users to search for individuals that have a certain set of qualifications that the user may be interested in. For example, an employer may search the LinkedIn® database for potential candidates that appear suitable for a given job. However, such searches frequently match numerous individuals that may be displayed to the user over multiple pages. As a result, individuals that best match the job from a qualification perspective may be one or more pages down the list of results and the user may not take the time to even view best match individuals. Even when strong matches appear early on in the list of search results, it is difficult to ascertain quickly and easily whether a given candidate is a strong match for the job.

Accordingly, some embodiments provide for an application program that receives profile information of individuals identified via a user search on an online service and generates a talent score for these individuals, with or without an accompanying measure of uncertainty (e.g., a confidence interval). The individuals may then be presented to the user ranked according to their talent scores and/or corresponding measures of uncertainty. As a result, the most suitable individuals will be presented to the user for quick and efficient investigation, and the user has immediate feedback with respect to the suitability of individuals returned by the search that meet the provided search criteria.

A credential of a candidate may be indicative of the candidate's knowledge and/or skill in one or more areas including, but not limited to, physical sciences, life sciences, social and behavioral sciences, technology, engineering, mathematical sciences, formal sciences, and/or any other suitable subjects and/or fields. For example, a candidate's undergraduate major in a field (e.g., economics) is a credential that may be indicative of the candidate's knowledge in that field. As another example, a candidate's knowledge of a programming language (e.g., Java) is a credential that may be indicative of the candidate's knowledge in computer science and the candidate's programming skills. As yet another example, a candidate's participation in a mathematics competition (e.g., the Putnam competition) is a credential that may be indicative of the candidate's knowledge and/or skill in mathematics. The above-listed credentials are illustrative non-limiting examples of possible credentials that may be considered.

A candidate may have academic credentials, professional credentials, publication credentials, competition credentials, awards and honors credentials, computer literacy credentials, language credentials, leadership and management credentials, and/or any other suitable types of credentials indicative of the candidate's knowledge and/or skill in one or more areas. Examples of academic credentials include, but are not limited to, the candidate's undergraduate school(s), degree(s), major(s), minor(s), undergraduate grades, undergraduate grade point average (GPA), graduate school(s), graduate degree(s), graduate school(s), graduate grades, graduate GPA, performance on one or more standardized examinations (e.g., SAT) and academic honors (e.g., Dean's List).

Examples of professional credentials include, but are not limited to, the candidate's prior and/or current job(s), length of employment at the prior and/or current job(s), responsibilities at the prior and/or current job(s), project(s) at the current and/or prior job(s), leadership or management roles at the prior and/or current jobs(s), either for prior and/or current jobs that were paid or unpaid. Professional credentials may also include professional certifications, licenses or the like.

Examples of publication credentials include, but are not limited to, research publications (e.g., a conference paper, a journal article, newspaper article, a book, and/or any other suitable type of publication) at least partially authored by the candidate, where and/or whom published the publication (e.g., name of an academic journal, name of a professional conference, name of publisher, etc.), one or more patent applications or issued patents on which the candidate is a named inventor, or any other suitable publication credential.

Examples of competition credentials include the name(s) of one or more competitions (e.g., a local/state/national programming competition, a local/state/national mathematics competition, a local/state/national physics competition, a local/state/national debate competition, etc.) in which the candidate participated and/or the performance of the candidate in the competition (e.g., placement). Examples of awards and honors credentials include, but are not limited to, one or more academic awards (e.g., Dean's list, honors such as summa cum laude, magna cum laude or cum laude, high distinction, etc.), community service awards, undergraduate/graduate research awards, scholarships, grants, etc.

Examples of computer literacy credentials include, but are not limited to, ability to program in one or more computer programming languages, knowledge of one or more operating systems, and knowledge of one or more application programs (e.g., computer-aided design application programs, statistical analysis application programs, mathematical programming application programs, database application programs, spreadsheet application programs, word processing application programs, etc.), industry and/or standards certifications, etc.

Examples of language credentials include an ability to speak, read, and/or write in one or more foreign languages. Language credentials may also include the ability to translate from one language to another, either orally in writing or both.

The above-listed credentials are non-limiting illustrative examples of credentials that may be considered and evaluated, but any other suitable credential of any suitable type may also be considered, as techniques described herein are not limited for use with the above-listed illustrative credentials. In addition, any suitable number of credentials of any suitable type may be considered, as techniques described herein are not limited for use to any particular number or set of credentials.

In some embodiments, a credential of a candidate may be associated with a value, herein termed "a credential value" or "value of a credential," that may be indicative of the amount of knowledge and/or skill that the candidate has in one or more areas associated with the credential. For example, a value associated with a candidate's credential of an undergraduate degree in economics from a school with the top-ranked economics department may be indicative of an amount of knowledge/skill that the candidate has in economics. As another example, a value associated with a candidate's credential of having an undergraduate GPA of 3.7 may be indicative of an amount of knowledge/skill the candidate has in the area he/she majored in. As yet another example, a value associated with the credential of participating and/or placing in a programming competition may be indicative of an amount of knowledge/skill the candidate has in the areas of programming and/or computer science.

As another example, the prestige of an award may provide a value indicative of an amount of knowledge/skill the candidate possesses in this respect. As yet another example, a value associated with the credential of speaking Japanese may be indicative of the amount of candidate's facility with the Japanese language. These examples of credential values are illustrative and non-limiting, as any credential may be assigned a credential value that indicates the amount or extent the candidate possesses knowledge/skill with respect to the credential.

To further illustrate the concept of a credential value, consider the above-described credential of having an undergraduate degree in economics from a school with the top-ranked economics department. This value may be different (e.g., higher) than the credential of having an undergraduate degree in economics from a school with the $50^{th}$-ranked economics department. The values of these credentials may be different because having an economics degree from a top-ranked department may be indicative of a greater amount of knowledge and/or skill in economics than having an economics degree from the $50^{th}$-ranked department.

As another example, a value associated with the above-described credential of GPA=3.7 in a school where 30% of the students have a GPA greater than 3.7 may be different from the value associated with a credential of GPA=3.7 in a school where only 5% of students have a GPA greater than 3.7. As yet another example, a value associated with placing first in a national programming competition may be different from the value associated with placing first in a local programming competition. As yet another example, a value associated with the credential of speaking Japanese may be different for a candidate who is fluent in Japanese than for a candidate who is only proficient in Japanese.

A credential value may be of any suitable type provided it adequately reflects the amount or extent of knowledge/skill or aptitude a candidate is deemed to have with respect to the credential. According to some embodiments, the credential value may be a numeric value. This numeric value may be indicative of the amount of knowledge and/or skill that the candidate has in one or more areas. The credential value may be a number in a specified range (e.g., a real number between 0 to 1 inclusive, an integer between 0 and 100, a real number between 0 and 100, etc.). In some embodiments, multiple credentials may have numeric values. The numeric values of the multiple credentials may lie in the same range. For example, multiple credentials being evaluated may take on values in the range of 0 to 1.

In some embodiments, larger credential values may indicate a greater amount/extent of knowledge and/or skill that the candidate is deemed to possess. Thus, for example, the value associated with the credential of GPA being 3.7 in a school where 30% of the students have a GPA greater than 3.7 may be 0.6, whereas the value associated with the credential of GPA being 3.7 in a school where 5% of the students have a GPA greater than 3.7 may be 0.85. As another example, the value associated with the credential of speaking Japanese fluently may be 0.9, whereas the value associated with the credential of speaking Japanese only proficiently may be 0.5. However, in other embodiments, smaller credential values may indicate a greater amount of knowledge and/or skill that the candidate may have, as techniques herein are not limited to the way in which credential values are indicated or quantified.

According to some embodiments, the credential value may be a categorical value. For example, the credential value may take on the value of "Small," "Medium," or "Large" indicating a small, medium, or large amount of knowledge and/or skill that the candidate has in one more areas. For example, the value associated with the credential of speaking Japanese fluently may be "Large," whereas the value associated with the credential of speaking Japanese only proficiently may be "Medium." The above examples of categorical values are illustrative and non-limiting, as credential values may be assigned or labeled with any other suitable categorical values (e.g., "Low," "Medium," "High", or "Basic," "Proficient," "Fluent," etc.).

In some embodiments, a talent scoring system is configured to assign a value to each of one or more of the candidate's credentials. The talent scoring system may be configured to assign a value to a candidate's credential in any suitable way and, for example, may be configured to assign a value to the credential based on any available information accessible by the talent scoring system that is indicative of an amount of knowledge/skill indicated or implied by the credential of the candidate in the area of the credential.

As previously described, in some embodiments, a talent score of a candidate indicative of the candidate's suitability for a job may be calculated based on one or more credential preferences specified by an employer for the job. The credential preferences may specify one or more credentials that the employer is seeking in candidates to consider them for employment. In some embodiments, the credential preferences may also comprise preferences for values of preferred credentials. In this way an employer may specify not only that the employer prefers candidates to have knowledge and/or skill in a particular area, but also may specify the amount of knowledge and/or skill that the employer prefers the candidate to have in that particular area. Credential preferences that comprise at least one preferred value for at least one preferred credential are herein termed "credential value preferences."

In some embodiments, credential value preferences may specify at least one preferred value for a credential to indicate an amount of knowledge/skill the employer prefers candidates to have in the area of the credential. For example, credential value preferences may specify at least one preferred value associated with the credential of participating and/or placing in a programming competition, which may be indicative of an amount of knowledge/skill the employer the candidate has in the area of computer science. However, a candidate may have many different credentials indicative of his/her knowledge/skills in computer science (e.g., computer science courses, computer science degree(s), knowledge of multiple programming languages, experience with sub-areas of computer science such as compilers, algorithms, databases, machine learning, etc.) and, as such, credential value preferences may specify one or more preferred value(s) for the area of computer science generally rather than specifying preferred values for each credential in the area of computer science that candidates may potentially have.

In this way, credential value preferences may specify, compactly, one or more preferred values for any credentials in the area of computer science. In this general manner, credential value preferences may be used to specify one or more preferred values for any credential in any suitable area, some non-limiting examples of which are described herein. However, it should be appreciated that credential value preferences may be specified for particular expertise in a given area, as there are no limitations on the number, type or variety of credentials for which credential value preferences may be specified. For example, credential value preferences may comprise one or multiple preferred values for each of any suitable number of the preferred credentials and/or areas, as techniques described herein are not limited in this respect.

As a non-limiting illustrative example, credential value preferences specified by an employer for a job may specify that the employer prefers candidates to have the credential of speaking Japanese and may further specify a preferred value for the credential of speaking Japanese. For example, the preferred value may be 0.9 on a scale from 0 to 1, where 0 indicates the least amount of knowledge and/or skill a candidate may have in speaking Japanese (e.g., none or novice level), and 1 indicates the greatest amount of knowledge and/or skill a candidate may have (e.g., native or fluency). In this way, the employer not only specifies that the employer seeks candidate who speak Japanese, but also specifies the amount of skill in speaking Japanese that the employer prefers candidates to have. As another non-limiting illustrative example, credential value preferences specified by an employer for a job may specify that the employer prefers candidates to have the credential of an undergraduate degree in economics and may further specify a preferred value for this credential, such as an undergraduate degree from a top ten ranked university and/or economics department.

Accordingly, in some embodiments, a talent scoring system may be configured to calculate a talent score of a candidate for a job based at least in part on one or more values of one or more credentials of the candidate. The talent scoring system may be configured to assign a value to each of one or more credentials of the candidate. The talent scoring system may further calculate the talent score based at least in part on credential value preferences that are associated with the job and that indicate at least one preferred value for one or more credentials preferred by the employer.

In some embodiments, a candidate's talent score may reflect how close the value of a candidate's credential is to the employer's preferred value for that credential. As such, the candidate's talent score may reflect whether the amount of knowledge/skill possessed by the candidate in the area of the credential is close to the amount of knowledge/skill that the employer desires candidates to have in that area. For example, if an employer indicates that 0.85 is a preferred value for the credential of having a GPA equal to 3.7, then the talent score of a candidate whose credential of having an undergraduate GPA equal to 3.7 has a value of 0.6 (e.g., when 30% of students at the candidate's school have a GPA greater than 3.7) may be lower than the talent score of a candidate whose same credential has a value of 0.85 (e.g., when 5% of students at the candidate's school have a GPA greater than 3.7).

As another example, if an employer indicates that 0.6 is a preferred value for the credential of speaking Japanese, then the talent score of a candidate whose credential of speaking Japanese has a value of 0.7 (e.g., if the candidate is only proficient in Japanese) may be higher than the talent score of a candidate whose credential of speaking Japanese has a value of 0.9 (e.g., if the candidate is fluent in Japanese). As yet another example, if an employer indicates that 0.9 is a preferred value for the area of computer science, then the talent score of a candidate whose credential of having a course in computer science has a value of 0.6 may be lower than the talent score of a candidate whose credential of publishing in a computer science journal has a value of 0.9.

It should be appreciated from the foregoing that an employer may not be seeking candidates having the highest possible values (e.g., 1.0) for each credential because an employer may not be seeking candidates having the greatest amount of knowledge and/or skill in at least some of the areas of interest to the employer. For example, an employer may not be seeking the best programmer for a job that only requires basic computer literacy. As another example, an employer may not be seeking the best mathematician for a job, when the employer views mathematical skills as helpful but not required for the job, and views other credentials as being more essential.

As yet another example, the employer may not be looking for candidates with the highest GPAs at the best schools, but rather for candidates in a specific range of GPAs (e.g., 3.3-3.7) from schools ranked in a particular range (e.g., schools ranked 10-40) because the employer believes such candidates are better suited for the job for one reason or another. Accordingly, an employer may specify credential value preferences that indicate a preferred value for a preferred credential, but the preferred value may or may not be the largest possible value of the preferred credential depending on the circumstances and the preferences of the employer seeking a fit, or the preferences of a candidate evaluating his/her suitability for one or more jobs.

An employer may wish to evaluate multiple candidates for a job based on their respective credentials. Accordingly, in some embodiments, a talent score for each of multiple candidates for a job may be calculated. The talent score for a particular candidate may be calculated based at least in part on at least one value of one or more credentials of the candidate and credential value preferences specified by the employer for the job. The candidates may be ranked based on their respective talent scores. The employer may use the ranked talent scores to identify candidates to evaluate further (e.g., to interview), to identify candidates to hire, and/or for any other suitable purpose.

The inventor has also appreciated that results of evaluating the suitability of a candidate for a job comprise information of interest not only to employers, but also to candidates seeking jobs. The candidate may use this information to answer questions such as "How talented am I?", "Who would want to interview me?" or "How suitable am I for a particular job?" Accordingly in some embodiments, a talent score of a candidate may be calculated for a given job or for each of multiple jobs that are of interest to the candidate. The talent score for a particular job may be calculated based at least in part on at least one value of one or more credentials of the candidate and credential value preferences specified by the employer for the job (or alternatively specified by the candidate, as discussed in further detail below). The calculated talent score(s) may then be presented to the candidate to provide him/her with a measure of his/her suitability for the job(s) for which the talent score(s) were calculated. When multiple jobs are considered, the jobs may be ranked based on the talent score computed for the respective job. The candidate may use the ranked talent scores to identify the jobs they are most suitable for so that they can request more information, apply, and/or better understand how the candidate fits into the employment market.

As previously described, an employer may specify credential value preferences for a job. However, aspects of the technology described herein are not limited in this respect and, in some embodiments, a candidate may specify credential value preferences for a job. For example, the candidate may specify credential value preferences for a "mock" job (e.g., a candidate's dream job) in order to evaluate himself with respect to these credential value preferences. Accordingly, in some embodiments, a talent score for a candidate for a job may be calculated based at least in part on at least one value of one or more credentials of the candidate and credential value preferences specified by the candidate for the job.

In some embodiments, a candidate may change credential value preferences, which the candidate previously specified, to determine the effect of these changes on the candidate's talent score. For example, a candidate may specify one set of credential value preferences indicating a preference for a high value for the area of computer science and another set of credential value preferences indicating a preference for a lower value in the area of computer science. The candidate may then obtain talent scores calculated for each of the above-described credential value preferences to determine the effect of changes of credential value preferences on his/her talent score.

In some embodiments, a candidate may change his/her credentials, which the candidate previously specified, to determine the effect of these changes on the candidate's talent score. In this way, the candidate may be able to answer questions such as "How can I get better?" For example, if a candidate is considering obtaining additional computer literacy credentials (e.g., learning to program in another programming language, taking a computer science course, participating in a programming competition, etc.), the candidate may add such a credential to the credentials he/she previously specified in order to ascertain the effect of adding these credentials on his/her talent score. Indeed, if adding a credential (e.g., learning another programming language) substantially changes the candidate's talent score, the candidate may be persuaded to obtain the credential (e.g., to learn the other programming language).

The inventor has also appreciated that candidates may be looking to obtain new credentials in addition to the credentials they already have in order to be more favorably evaluated by employers for jobs. However, a candidate may be faced with many choices of which credential(s) to obtain, but only have the resources to obtain one or a small number of new credentials and/or may be uncertain or unaware of what additional credentials would make the candidate more attractive to potential employers. Such a candidate would benefit from being provided with a recommendation as to which credentials the candidate should obtain in order to appear better suited for a job or a job class.

Accordingly, in some embodiments, a talent scoring system may be configured to recommend to a candidate one or more new credentials that the candidate could obtain to increase his/her talent score. The talent scoring system may evaluate the candidate for a job by calculating the candidate's talent score based on the candidate's credentials and credential value preferences specified for the job. Then, the talent scoring system may calculate the candidate's talent score for each of multiple potential credentials the candidate may obtain as though the candidate had obtained the credential. In this way, the effect of adding each particular credential on the candidate's talent score may be measured. The talent scoring system may recommend that the candidate obtain those credentials which increase his talent score by the greatest amount. Techniques related to providing suggestions to candidates to improve their talent scores and/or make them more attractive to employers are described in further detail below.

In some embodiments, a talent score of a candidate for a job may be calculated based on the candidate's credentials in a primary set of credentials and based on the candidate's credentials in a secondary set of credentials. The primary set of credentials may comprise credentials of primary importance (e.g., to an employer) in evaluating candidates. For example, a primary set of credentials may comprise academic credentials related to a candidate's undergraduate education (e.g., a candidate's undergraduate school(s), degree(s), major(s) and/or minor(s), GPA, class rank, etc.).

As another example, a primary set of credentials may comprise one or more of the candidate's professional credentials, examples of which have been described. The secondary set of credentials may comprise credentials (in areas) of secondary importance (e.g., to the employer) in evaluating candidates. For example, a secondary set of credentials may comprise a candidate's professional credentials, computer literacy credentials, and foreign language credentials. The above examples of primary and secondary credentials are non-limiting and illustrative, as primary and secondary credentials may each comprise any suitable set of one or more credentials and may differ depending on the type of job and/or the particular preferences of a given employer.

Accordingly, in some embodiments, a talent score of a candidate for a job may be calculated at least in part by calculating a primary credentials score based on the candidate's credentials in the primary set of credentials, calculating at least one secondary credential score for each of one or more of the candidate's credentials in a secondary set of credentials, and calculating the talent score based at least in part on the primary credentials score and the secondary credential score(s). The primary credentials score may be further calculated based on credential value preferences indicating at least one preferred value for at least one preferred credential in the primary set of credentials. The secondary credential score(s) may be further calculated based on credential value preferences indicating at least one preferred value for at least one preferred credential in the secondary set of credentials.

In some embodiments, the candidate's primary credentials score may be adjusted based at least in part on the candidate's secondary score(s) to obtain the candidate's talent score. For example, in some embodiments, the candidate's primary credentials score may be increased when at least one of the candidate's secondary score(s) is greater than the candidate's primary credentials score. In this way a candidate's initial evaluation, obtained based on the candidate's primary credentials, may be adjusted based on the candidate's secondary credentials.

In some embodiments, each of a candidate's credentials may be either in the primary set of credentials or in the secondary set of credentials. However, in some embodiments, a candidate may have one or more credentials that are neither in the primary set of credentials nor in the secondary set of credentials. Such a situation may occur when the employer seeks to evaluate candidates based on a particular set of credentials of interest to the employer rather than based on every possible credential that the candidates may possess. For example, an employer may specify the primary set of credentials as including one or more academic credentials and the secondary set of credentials as including one or more computer literacy credentials, but neither set comprises foreign language credentials.

The inventors have further appreciated that employers, in some instances, may specify preferences for a credential that a candidate does not possess, but that this preferred credential may be related to one or more credentials that the candidate does possess. For example, a candidate may have a credential of programming experience in the Java programming language, but an employer's credential value preferences for a job do not specify any preferred values either for this credential or for the area of programming. On the other hand, the employer's credential value preferences may specify a preferred value for the credential area of computer science, which is related to the area of programming and the credential of Java programming experience.

Accordingly, in some embodiments, a candidate's talent score may be calculated at least in part by calculating a score for a credential that the candidate possesses based at least in part on preferred value(s) for another credential that the candidate does not possess (e.g., a credential desired by an employer) and the degree to which the candidate's credential and the other credential are related. The degree to which the candidate's credential and the other credential are related may be obtained by using a credentials graph whose nodes correspond to credentials and the weight of an edge between any two nodes in the graph represent the degree to which the two credentials represented by the two nodes are related. The weight may be used to calculate the score of a credential that the candidate possesses and, in turn, the candidate's talent score. In this way, a candidate's talent score may reflect whether the candidate possesses skills related to those desired by an employer.

As described above, a talent scoring system may be configured to calculate a talent score of a candidate that is indicative of the candidate's suitability for a job (e.g., a quantitative analyst). Additionally or alternatively, a talent scoring system may be configured to calculate a talent score of a candidate that is indicative of the candidate's suitability for jobs in a job category (e.g., finance jobs). Accordingly, credential value preferences may be specified and a talent score may be calculated for a job and/or a job category, as techniques described herein are not limited in this respect. For clarity, some embodiments provided below are described in the context of jobs. However, it should be appreciated that unless indicated otherwise, all references to jobs may also be understood as being references to job categories.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as the application is not limited in this respect. Some benefits derived from the inventor's insights may only be realized by virtue of implementation of talent scoring techniques on one or more computers, as such talent scoring, even if in theory possible, would not be practicable or even useable unless performed by one or more computers. Furthermore, some advantages derived from the inventor's innovation result from candidates and/or employers being able to access talent scoring resources over a network (e.g., via web access over the Internet), so that candidates and employers do not need to be proximate one another and such resources are generally available to anyone anywhere. Such advantages of which cannot be exploited using manual approaches. Computer implementation and automation are integral aspects of some embodiments.

Some embodiments of the present application may operate in the illustrative environment 100 shown in FIG. 1. In the illustrative environment 100, one or multiple candidates (e.g., candidates 102a, 102b, and 102c) may interact with talent scoring system 112 via respective computing devices 104a, 104b, and 104c. Although only three candidates are shown in the illustrative environment 100, one or any suitable number of candidates may interact with talent scoring system 112, as aspects of the technology described herein are not limited in this respect.

In the illustrative environment 100, one or multiple employers (e.g., employers 116a and 116b) may interact with talent scoring system 112 via respective computing devices 104d and 104e. Although only two employers are shown in the illustrative environment 100, one or any suitable number of employers may interact with talent scoring system 112, as aspects of the technology described herein are not limited in this respect. Computing devices 104a, 104b, 104c, 104d, and 104e communicate with talent scoring system via network 110. Network 110 may be any suitable network such as a local area network, a wide area network, a corporate intranet, the Internet, and/or any other suitable network. Computing devices 104a-e are communicatively coupled to network 110 via connections 106a-e, respectively. These connections may be wired, wireless, and/or any other suitable type of connections, as aspects of the technology described herein are not limited in this respect.

Each of computing devices 104a-e may be any suitable type of electronic device which a candidate and/or an employer may use to interact with talent scoring system 112. In some embodiments, one or more of computing devices 104a-e may be a portable device such as a mobile smart phone, a personal digital assistant (PDA), a laptop computer, a tablet computer, or any other portable device that may be used to interact with talent scoring system 112. In some embodiments, one or more of computing devices 104a-e may be a fixed electronic device such as a desktop computer, a server, a rack-mounted computer, or any other suitable fixed electronic device that may be used to interact with talent scoring system 112.

In some embodiments, a candidate (e.g., candidate 102a, 102b, and 102c) may interact with a talent scoring system (e.g., talent scoring system 112) via any suitable application program configured to execute on the candidate's computing device (e.g., computing device 104a, 104b, and 104c). For example, the candidate may interact with the talent scoring system by using a web-browser application program. As another example, the candidate may interact with the talent scoring system by using a stand-alone application program dedicated to providing access to the talent scoring system. Similarly, in some embodiments, an employer (e.g., employer 116a, 116b, etc.) may interact with a talent scoring system via any suitable application program (e.g., web-browser application program, stand-alone application program, etc.) configured to execute on the employer's computing device (e.g., computing device 104d and 104e).

In some embodiments, a candidate may interact with a talent scoring system by providing the talent scoring system with information about him/her. For example, the candidate may provide the talent scoring system with information specifying one or more of the candidate's credentials, examples of which have been previously described. As another example, the candidate may provide the talent scoring system with information specifying credential value preferences associated with one or more jobs. The candidate may specify credential value preferences in order to have the talent scoring system evaluate the candidate's credentials with respect to these credential value preferences.

As yet another example, the candidate may provide the talent scoring system with personal information including, but not limited to, the candidate's name, address, e-mail address, telephone numbers, information identifying the candidate's references, one or more of the candidate's identification numbers (e.g. social security number, driver's license number, passport number, etc.). As yet another example, the candidate may provide the talent scoring system with information indicative of one or more jobs of interest to the candidate (e.g., by specifying one or more employers, identifying one or more jobs, specifying one or more industries, specifying one or more salary ranges, etc.).

As yet another example, the candidate may use the talent scoring system to apply for one or more jobs and provide the talent scoring system with any information needed to do so. The above examples are illustrative and non-limiting examples of information that a candidate may provide to a talent scoring system. A candidate may provide any other suitable information to a talent scoring system, as aspects of the technology described herein are not limited by the type of information that a candidate can provide to a talent scoring system.

A candidate may provide a talent scoring system with any of the above-described information via an application program (e.g., web-browser application program, stand-alone application program, etc.) executing on the candidate's computing device. The candidate may provide this information using any suitable user interface (e.g., by filling out one or more forms, uploading one or more files, clicking one or more checkboxes, etc.), or in any other suitable way, as aspects of the technology described herein are not limited by the manner in which a candidate provides information to the talent scoring system.

In some embodiments, a talent scoring system may provide information to a candidate. For example, the talent scoring system may provide the candidate with his/her talent score for one or multiple jobs. As described herein, in some embodiments, the talent scores may be calculated based on the candidate's credentials, values associated with the candidate's credentials, and/or credential value preferences (specified by the candidate or at least one employer) associated with the job or jobs. As another example, the talent scoring system may provide the candidate with information about one or multiple jobs. In the latter case, the talent scoring system may rank information about the jobs based on the respective talent scores and present information about the jobs based at least in part on the ranking.

As yet another example, the talent scoring system may recommend one or more jobs and/or job classes of potential interest to the candidate and provide the candidate with any suitable information to do so. For instance, the talent scoring system may suggest one or more jobs to the candidate for which the candidate has a talent score above a specified threshold (e.g., one or more particular jobs and/or one or more job classes such as an occupation type). Though, the talent scoring system may suggest one or more jobs to the candidate based on any criteria in addition to or instead of talent scores, as aspects of the technology described herein are not limited in this respect.

As yet another example, the talent scoring system may provide a candidate with an indication of how the candidate's talent score for a job compares with scores of other candidates who applied for the job. This may be done in any suitable way and, for example, may be done by providing the candidate with an indication of the percentile of his talent score for the job among the talent scores of other candidates whose talent scores were calculated for the job. Additionally or alternatively, the talent scoring system may provide the candidate with the talent scores of other candidates whose talent scores were calculated for the job. In some embodiments, when the talent scoring system has permission to do so, the talent scoring system may provide the candidate with the talent scores and identities of other candidates whose talent scores were calculated for the job. It should be appreciated that a talent scoring system may provide any other suitable information to a candidate, as aspects of the technology described herein are not limited by the type of information that a talent scoring system can provide to a candidate.

Figure 7:
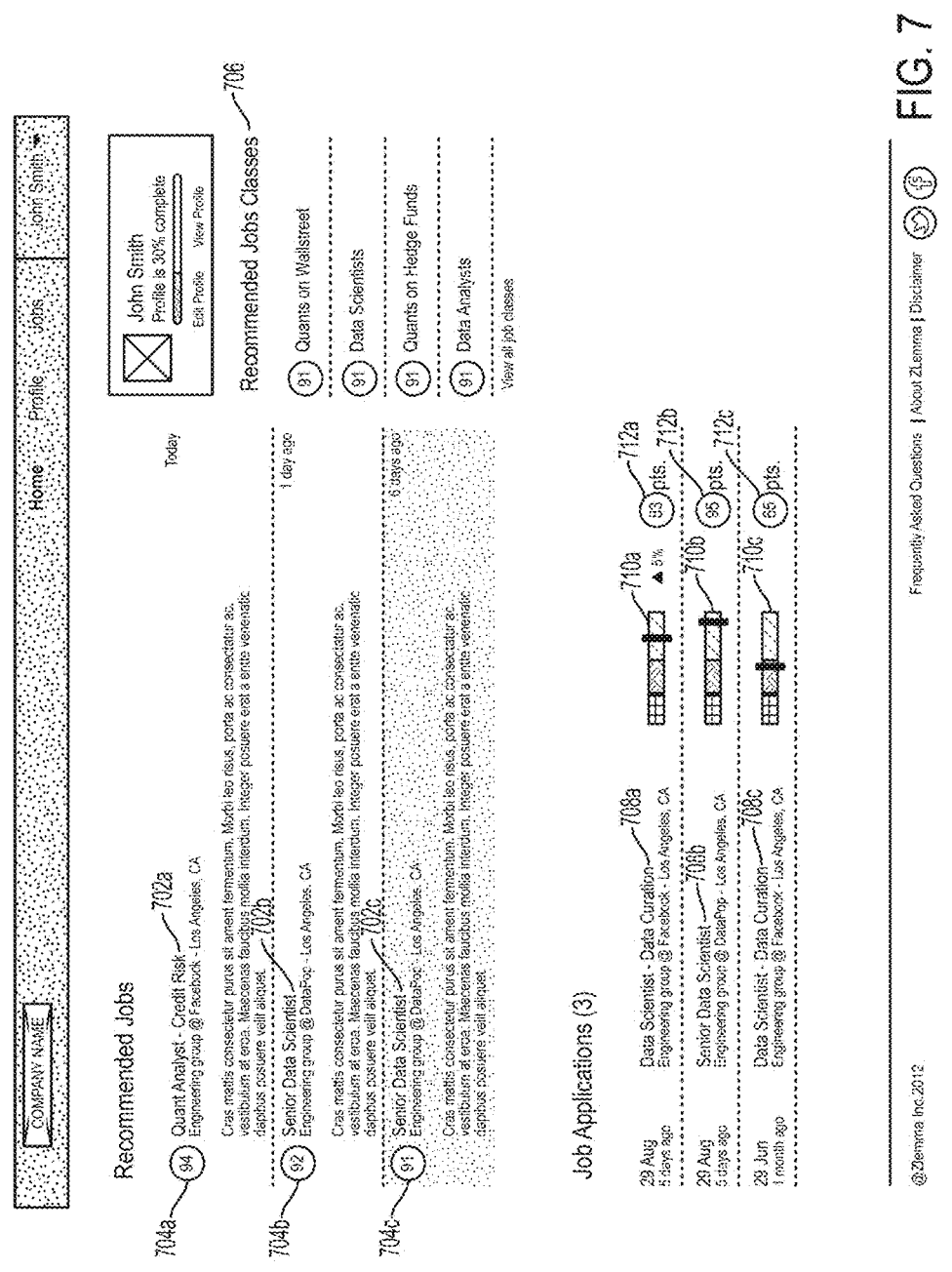

FIG. 7 shows an illustrative, non-limiting example of a user interface 700 that the talent scoring system may provide to a candidate. The user interface 700 provides the candidate with information about three recommended jobs 702a, 702b, and 702c associated with respective talent scores 704a, 704b, and 704c. In user interface 700, information about the recommended jobs is ordered based on the talent scores. The user interface 700 also provides the candidate with four recommended job classes 706. The user interface 700 also provides the candidate with information about jobs 708a, 708b, and 708c, for which the candidate has applied. For each such job, user interface 700 provides the candidate with an indication, via elements 710a, 710b, and 710c, of how the candidate's talent score compares with scores of other candidates who applied for the job.

The user interface 700 also provides the candidate with a talent score (scores 712a, 712b, and 712c) for each of the jobs to which the candidate has applied. It should be appreciated that user interface 700 is merely an illustrative and non-limiting example. For example, although user interface 700 shows three recommended jobs, four recommended job classes and three jobs for which the candidate has applied, the talent scoring system may provide the candidate with any suitable number of talent scores, recommended jobs, recommended job classes, and may allow the candidate to apply for any suitable number of jobs, as aspects of the technology described herein is not limited in this respect.

In some embodiments, an employer may interact with a talent scoring system by providing the talent scoring system with information about one or more jobs for which the employer seeks candidates. The employer may provide the talent scoring system with information about each job such as the job title, job description, job location, and/or any other suitable information about each job. The employer may provide the talent scoring system with credential preferences and/or credential value preferences for one or more job(s), examples of such credential preferences and credential value preferences are described herein. Additionally, the employer may provide the talent scoring system information about the employer (e.g., name of employer, place(s) of business of the employer, information about the employer's business, etc.). An employer may provide any other suitable information to a talent scoring system, as aspects of technology described herein are not limited by the type of information that an employer can provide to a talent scoring system.

An employer may provide a talent scoring system with any of the above-described information via an application program (e.g., web-browser application program, stand-alone application program, etc.) executing on a computing device of the employer. The employer may provide this information using any suitable user interface (e.g., by filling out one or more forms, uploading one or more files, clicking one or more checkboxes, etc.), or any other suitable way, as aspects of the technology described herein are not limited by the manner in which an employer provides information to the talent scoring system.

In some embodiments, a talent scoring system may provide information to an employer. For example, a talent scoring system may provide an employer with a talent score for one or multiple candidates that have expressed interest in and/or applied for a job for which the employer is evaluating candidates. As described herein, in some embodiments, the talent scores may be calculated based on credentials of the candidates, values associated with the candidate's credentials, and/or credential value preferences specified for the job by the employer.

In some embodiments, the talent scoring system may provide an employer with information about one or more candidates in addition to their respective talent score(s). For example, the talent scoring system may provide an employer with information about the credentials and/or credential values of a candidate, when it has permission to do so (e.g., when allowed by the candidate to do so, when the candidate indicates to the talent scoring system that he/she has interest in an employer's job without applying for the job, and/or when the candidate applies for the job). As another example, the talent scoring system may provide an employer with information identifying a candidate (e.g., the candidate's name, the candidate's contact information), when the talent scoring system has permission to do so (e.g., when allowed by the candidate to do so, when a candidate applies for the job, etc.).

When the talent scoring system presents information about multiple candidates to an employer, the talent scoring system may rank information about the candidates based on their talent scores and present information about the candidates in accordance with the ranking. It should be appreciated that a talent scoring system may provide any other suitable information to an employer, as aspects of the technology described herein are not limited by the type of information that a talent scoring system can provide to an employer.

The talent scoring system 112 may be configured to perform any of numerous functions for evaluating the suitability of one or more candidates for one or more jobs. Talent scoring system 112 may comprise one or more computing devices (e.g., server(s), rack-mounted computer(s), desktop computer(s), etc.) each comprising one or more processors. The one or more computers forming talent scoring system 112 may be local, distributed (e.g., cloud), and may be connected via any suitable means. Talent scoring system 112 may comprise one or more non-transitory computer readable storage media (e.g., memory and/or one or more other non-volatile storage media) configured to store processor-executable instructions that, when executed by one or more processors of talent scoring system 112, cause the talent scoring system to perform any of numerous functions for evaluating the suitability of one or more candidates for one or more jobs and/or to perform any other techniques or services described herein.

The talent scoring system 112 may be configured to send information to and receive information from users (e.g., one or more candidates, one or more employers, system administrators, etc.) of the talent scoring system. This may be done in any suitable way. As illustrated in computing environment 100, talent scoring system 112 may be configured to send and receive information via network 100 to which it is communicatively couple via connection 106f. Connection 106f is shown as a wired connection, but may be a wireless connection or any other suitable type of connection.

The talent scoring system is communicatively coupled (e.g., via connection 106g which may be a wired, wireless, or any other suitable type of connection or combination of connections) to data store 114 that is configured to store any information that may be used by the talent scoring system. For example, data store 114 may store any information provided to the talent scoring system by one or more candidates, one or more employers, and/or any other entities (e.g., system administrators).

In some embodiments, data store 114 may store information used by the talent scoring system to compute talent score(s) for one or more candidates, but which may not have been provided to the talent scoring system either by the candidates or by employers. In some embodiments, data store 114 system may store information used for assigning values to the credentials of one or more candidates. As one non-limiting example, data store 114 may store information that may be used for assigning values to one or more of the candidate's academic credentials. Such information may include, but is not limited to, one or more rankings of schools (e.g., universities, colleges, vocational schools, etc.), one or more rankings of one or more academic departments (e.g., a ranking of mathematics departments, a ranking of physics departments, a ranking of economics departments, etc.), and information about distributions of grades and/or grade point averages at one or more schools and/or one or more departments (e.g., information indicating that at least a certain percentage of students in a school and/or department have a GPA above a threshold).

As another non-limiting example, data store 114 may store information that may be used for assigning values to one or more of the candidate's computer literacy credentials. For instance, data store 114 may store information used by the talent scoring system to assign a value to a credential of a candidate winning first place in a national programming competition. As another non-limiting example, data store 114 may store information that may be used by the talent scoring system to assign a value to a foreign language credential (e.g., the credential of fluently speaking Japanese). Though, it should be appreciated that the above-described examples of information that may be used for assigning values to the credentials of one or more candidates are illustrative and non-limiting, as data store 114 may store any suitable information that may be used for and/or inform the process of assigning values to credentials (of any suitable type) of one or more candidates.

Figure 2:
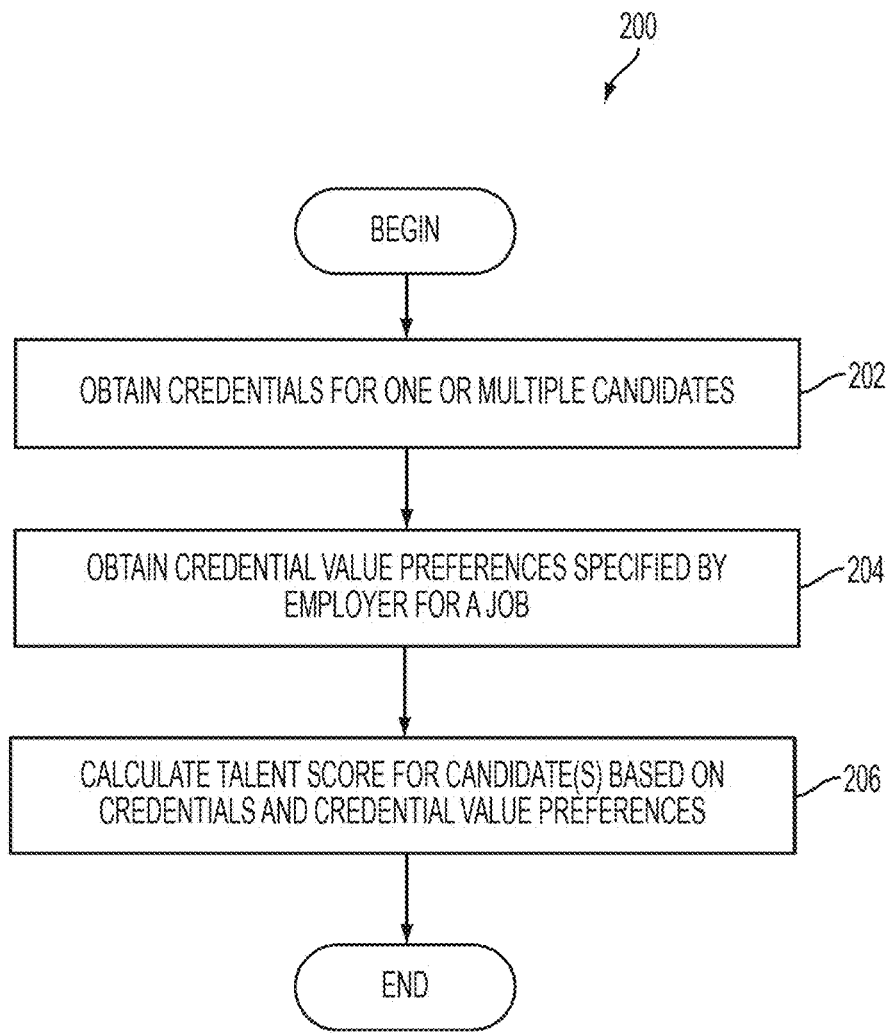
FIG. 2 is a flow chart of an illustrative process performed by a talent scoring system for calculating a talent score indicative of a candidate's suitability for a job based on credential value preferences specified by an employer for the job, in accordance with some embodiments.

Illustrative computing environment 100 may be used to implement any suitable technique or techniques for evaluating the suitability of one or more candidates for one or more jobs. One such technique is illustrated in FIG. 2, which is a flowchart of illustrative process 200 for calculating a talent score indicative of a candidate's suitability for a job based on credential value preferences specified by an employer for the job, in accordance with some embodiments. Illustrative process 200 may be performed by any talent scoring system and, for example, may be performed by talent scoring system 112, which was previously described.

Illustrative process 200 begins at act 202, where a talent scoring system obtains credentials for one or multiple candidates. As previously described, the talent scoring system may obtain at least some of a candidate's credentials by receiving input from the candidate specifying the candidate's credentials, which that candidate may do in any of numerous ways as described with reference to FIG. 1. Additionally or alternatively, the talent scoring system may obtain at least some of a candidate's credentials from other sources, rather than directly from the candidate. For example, the talent scoring system may obtain at least some of a candidate's credentials from one or more websites and/or web-services (e.g., LinkedIn®, Facebook®, Twitter®, the candidate's webpage or webpages, etc.), one or more recommendations of the candidate by one or more third parties, one or more schools that the candidate is associated with (e.g., is attending or attended), one or more of the candidate's former and/or current employers, and/or any other suitable sources.

In some embodiments, the talent scoring system may obtain credentials for one or multiple candidates by accessing the credentials after they have been previously obtained (e.g., in any of the above-described or other ways such as from a data store that has obtained credential information from submitted resumes or curriculum vitae) and made accessible (e.g., by storing them using one or more non-transitory computer-readable storage media, such as data store 114, accessible by the talent scoring system). As previously described, the talent scoring system may obtain credentials for any suitable number of candidates, as aspects of the technology described herein are not limited in this respect.

After credential(s) of one or more candidates are obtained at act 202, process 200 proceeds to act 204, where the talent scoring system obtains credential value preferences specified by an employer for a job. In some embodiments, the talent scoring system may obtain credential value preferences from the employer, as described with reference to FIG. 1. In some embodiments, the talent scoring system may obtain credential value preferences by accessing the credential value preferences after they have been previously obtained (e.g., in any of the above-described or other ways) and made accessible (e.g., by storing them using one or more non-transitory computer-readable storage media, such as data store 114, accessible by the talent scoring system).

As previously described, credential value preferences may specify one or more credentials that the employer prefers candidates for the job to have as well as one or more preferred value(s) for one or more of the preferred credentials and/or area(s) to which the preferred credentials apply. The preferred values may be indicative of the amount of knowledge and/or skill that the employer prefers the candidate to have in the area(s) of the preferred credential(s).

In some embodiments, an employer's preference for one more values of a candidate's credential may be specified by using one or more weights. The weight(s) may be specified in the credential value preferences. A weight may be assigned to one or more values that a preferred credential may take on. The magnitude of a weight assigned to a particular value of a preferred credential may indicate the extent to which the employer prefers that candidates applying for the job have the amount of knowledge/skill in the area(s) of the preferred credential associated with that particular value. For example, the preferred value may be indicated by the weight having the largest magnitude. Though, it should be appreciated, that an employer's preference for one or more values of a candidate's credential is not limited to being specified by using weights and may be specified in any other suitable way using any suitable type of input (e.g., using language indications such as "less important," "important," "very important," "extremely important," or similar linguistic indications of the significance an employer attaches to a particular credential and/or credential value), as aspects of the technology described herein are not limited in this respect.

As one non-limiting illustrative example, consider an employer seeking a candidate who is a proficient Japanese speaker. Suppose that, in this example, values of the credential of speaking Japanese are numeric ranging from 0 to 1, with 1 representing the greatest amount of knowledge/skill in speaking Japanese and 0 representing the least amount of knowledge/skill in speaking Japanese (e.g., values of 0-0.5 may indicate some familiarity with speaking Japanese, values of 0.5-0.7 may indicate proficiency in speaking Japanese, and values of 0.8-0.1 may indicate fluency in speaking Japanese. The employer may specify his preferences by providing a weight for each of one or more credential values that they credential of speaking Japanese may take on. For example, as shown in Table 1 below, the employer may assign the weight of 1 to credential values of 0.5, 0.6, and 0.7, the weight of 0.6 to the credential value of 4, and the weights of 0.8 to the credential values of 0.8, 0.9, and 1.0. These weights may indicate the employer prefers candidates that have the credential values of 0.5, 0.6, and 0.7 (e.g., indicative of proficiency in speaking Japanese), prefers candidates that have the credential values of either 0.8, 0.9, or 1 (e.g., indicative of fluency in speaking Japanese) less, and prefers candidates that have the credential value of 0.4 (e.g., indicative of some familiarity in speaking Japanese) the least.

TABLE 1

Example of Specifying Preferred Values for a Credential Having Numeric Values

| Credential\Value | 0.4 | 0.5 | 0.6 | 0.7 | 0.8 | 0.9 | 1 |
|---|---|---|---|---|---|---|---|
| Japanese | 0.6 | 1 | 1 | 1 | 0.8 | 0.8 | 0.8 |

As previously described, credential values are not limited to being numeric and may be categorical. For instance, in the above-described example, values of the credential of speaking Japanese may be categorical and may take on the values "Some Familiarity," "Proficiency," and "Fluency," and/or any other suitable categorical values. As shown in Table 2A below, the employer may assign a weight for each of one or more of these credential values.

TABLE 2A

Example of Specifying Preferred Values for a Credential Categorical Values

| Credential\Value | Some Familiarity | Proficiency | Fluency |
|---|---|---|---|
| Japanese | 0.6 | 1 | 0.8 |

As also discussed above, an employer (or other party) may indicate the significant of a given credential value using linguistic indicators, as shown in Table 2B below. Such linguistic indicators may then be translated into number or weights, or otherwise converted into a form consistent with the respective technique for computing one or more talent scores.

TABLE 2B

Example of Specifying Significance of Credential Values Using Language

| Credential\Value | Some Familiarity | Proficiency | Fluency |
|---|---|---|---|
| Japanese | Less Important | Most Important | Important |

As another non-limiting illustrative example, an employer may specify one or more preferred values using weights for each of multiple preferred credentials as shown in Table 3 below.

TABLE 3

Example of Credential Value Preferences Specified for Multiple Credentials

| Credential\Value | 0.4 | 0.5 | 0.6 | 0.7 | 0.8 | 0.9 | 1 |
|---|---|---|---|---|---|---|---|
| Programming | 0.8 | 0.8 | 0.9 | 1 | 0.9 | 0.8 | 0.7 |
| Machine Learning | 0.4 | 0.5 | 0.5 | 0.8 | 0.8 | 1 | 1 |
| Science, Technology, Engineering, and Math (STEM) | 0.8 | 0.8 | 0.9 | 1 | 1 | 0.9 | 0.8 |

As another non-limiting illustrative example, an employer may specify one or more preferred values using weights for each of multiple values of a candidate's GPA credential as shown in Table 4, below. In this illustrative example, a candidate's GPA credential is assigned a value based on the percentile of his GPA among other candidates attending (or having attended) in the same school or department (though, a candidate's GPA credential may be assigned a value in any other suitable way as aspects of the technology described herein are not limited in this respect). For example, if a candidate's GPA is 3.7 and is higher than the GPA of 80% of other candidates associated with the same school or department, then the candidate's GPA credential may be assigned the value of 80% (or 0.80).

As another example, if a candidate's GPA is 3.7 and is higher than the GPA of 90% of other candidate in the same school or department, then the candidate's GPA credential may be assigned the value of (90% or 0.9). The employer may then specify value preferences for values of the GPA credential by assigning a weight to each of one or more credential values. For example, as shown in the first row of Table 4, an employer may assign weights of 1.0, 0.8, 0.7 and 0.5 to candidate's whose GPA puts them in the $50^{th}$-$70^{th}$ percentile, $90^{th}$ percentile, $100^{th}$ percentile, and $20^{th}$ percentile, respectively, of candidates having the same school and/or department.

In some embodiments, the employer may specify different value preferences for a candidate's GPA credential depending on a rank of the candidate's school (e.g., $10^{th}$ best university, $50^{th}$ best university, etc.) and/or a rank of the candidate's department (best economics department, $20^{th}$ best economic department, etc.). Each row of Table 4 illustrates weights indicative of an employer's preferred values for a candidate's GPA credential for a school having a different rank (i.e., $10^{th}$, $50^{th}$, $100^{th}$, and $200^{th}$ ranked school). Note that the lower the rank of the school, the higher GPA credential values are preferred by the employer.

TABLE 4

Example of Credential Value Preferences Specified for GPA Credential

| School Rank\Value | 20% | 40% | 50% | 60% | 70% | 90% | 100% |
|---|---|---|---|---|---|---|---|
| $10^{th}$ | 0.5 | 0.8 | 1.0 | 1.0 | 1.0 | 0.8 | 0.7 |
| $50^{th}$ | 0.4 | 0.7 | 0.9 | 1.0 | 1.0 | 1.0 | 0.8 |
| $100^{th}$ | 0.3 | 0.6 | 0.8 | 0.9 | 1.0 | 1.0 | 1.0 |
| $200^{th}$ | 0.2 | 0.5 | 0.7 | 0.8 | .9 | 1.0 | 1.0 |

In the illustrative examples of Tables 1 and 2, for instance, the employer specified a weight for each of 7 and 3 credential values, respectively. However, it should be appreciated that when the employer is specifying value preferences for a credential using weights, the employer may specify a weight for each of any suitable number (e.g., zero, at least one, at least two, at least three, at least four, at least five, at least ten, at least fifteen, at least twenty, etc.) of values of the credential. For example, in some embodiments, the employer may specify one weight for only one value of the credential (e.g., only one weight (e.g., 1.0) specified for the value of "Proficiency" in Japanese, only one weight specified for the value of $50^{th}$ percentile for the GPA credential for a $10^{th}$ ranked school and/or department). Specifying a weight for only one particular value (e.g., "Proficiency") may be an indication that the employer prefers that candidates have that value more than they have any other value.

Figure 5A:
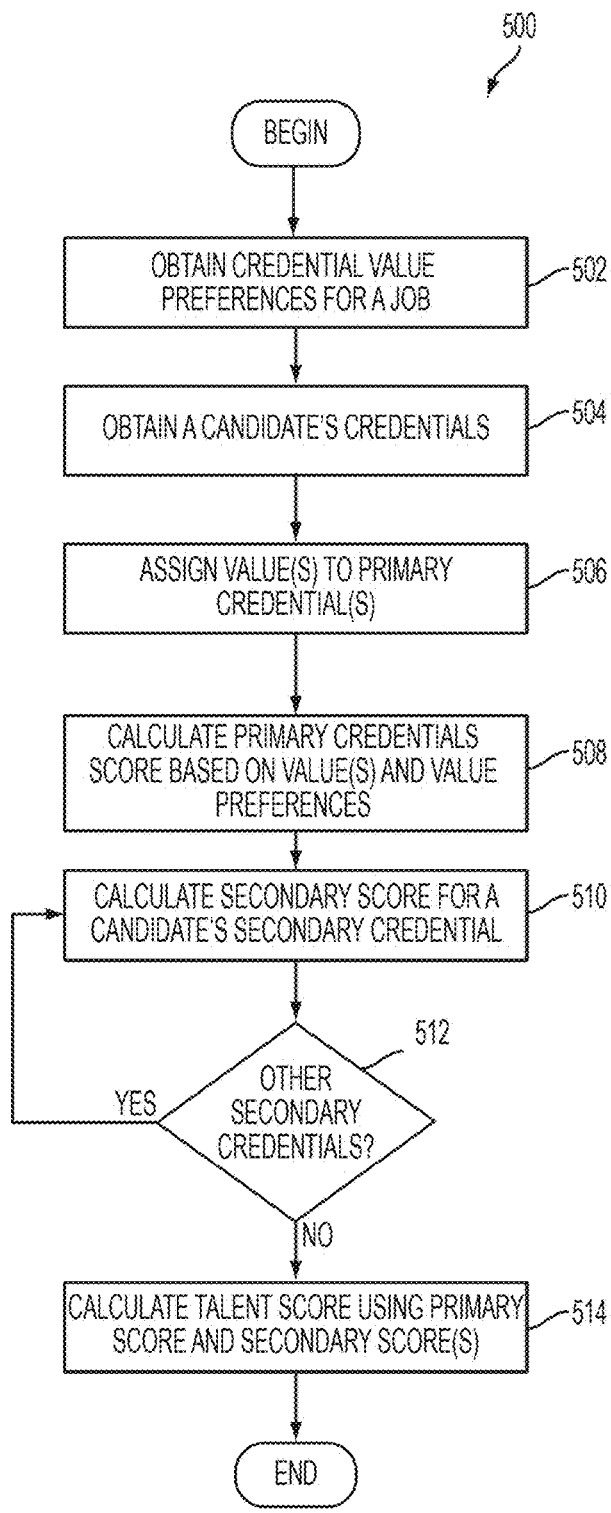
FIG. 5A is a flow chart of an illustrative process performed by a talent scoring system for calculating a talent score indicative of a candidate's suitability for a job at least in part by calculating a first score for at least one of the candidate's primary credentials and a second score for at least one of the candidate's secondary credentials, in accordance with some embodiments.

In some embodiments, a credential may take on a greater number of values than the number of values for which the employer specified a weight indicating the extent to which the employer prefers candidates having that credential value. For example, in some embodiments, a GPA credential value may be any integer between 1 and 100 indicating the percentile of the candidate's GPA among candidates associated with the same school or department and the employer may specify a weight for only some of these values. In such embodiments, the talent scoring system may assign a weight for any credential value based at least in part on the weights that were specified for one or more credential values (e.g., by interpolation or any other suitable technique). This is described in greater detail below with reference to FIG. 5A.

As described above, in some embodiments, credential value preferences may not specify any weight (or any information indicating preference or an amount of preference) for any credential value of a preferred credential. In such embodiments, the talent scoring system may use one or more default preference values for that preferred credential. The scoring system may obtain the default preference values in any suitable way and, for example, may access a stored default preference value for the preferred credential based at least in part on the job (e.g., Quantitative Analyst) and/or job category (e.g., Finance). To this end, the talent scoring system may be configured to access one or more default preference values for one or more credentials for each of one or more jobs and or job categories.

In some embodiments, credential value preferences may further specify the relative importance of different credentials and/or types of credentials that a candidate may have. For example, credential value preferences may specify that academic credentials are more important to the employer than publications credentials. As another example, credential value preferences may specify that the credential of "Programming Skills" is more important to the employer than the credential of "Speaking Japanese." As another example, the credential value preferences may specify that the credential of being a computer science major is more important than the credential of a physics major.

Relative importance of different credentials and/or types of credentials may be specified in any suitable way and, in some embodiments, may be specified by using weights to indicate the degree of importance. For example, as shown in Table 5, weights indicate the relative importance of five types of credentials to an employer.

TABLE 5

Example of Credential Value Preferences Specifying Relative Importance of Credential Types

| | Credential Type | | | | |
|---|---|---|---|---|---|
| | Professional | Competition | Awards and Honors | Computer Literacy | Language |
| Weight | 0.2 | 0.3 | 0.5 | 0.9 | 0.6 |

In another example, as shown in Table 6, weights indicate the relative importance of six different academic credentials, each credential specifying a department the candidate may be associated with.

TABLE 6

Example of Credential Value Preferences Specifying Relative Importance of Credentials

| | Credential | | | | | |
|---|---|---|---|---|---|---|
| | Computer Science | Electrical Engineering | Mechanical Engineering | Math | Statistics | Physics |
| Weight | 0.9 | 0.9 | 1 | 1 | 0.9 | 0.85 |

In some embodiments, credential value preferences provided by the employer may specify a primary set of credentials of primary importance to an employer and a secondary set credentials of secondary importance to the employer, examples of which have been described. The credential value preferences may further specify at least one preferred value for at least one credential in the primary set of credentials and at least one preferred value for at least one credential in the secondary set of credentials.

Returning to the discussion of process 200, after candidate value preferences are obtained at act 204, the talent scoring system executing process 200 (e.g., talent scoring system 112) calculates a talent score for each of one or multiple candidates based at least in part on their respective credentials (obtained at act 202) and credential value preferences for the job obtained at act 204. This may be done in any suitable way, including the techniques described below in connection with FIG. 5A. The talent score(s) calculated at act 206 may be used to evaluate the suitability of the candidate(s) for the job (e.g., by identifying candidates having their respective talent scores in a range and/or above a threshold, by ranking the candidates based on their talent scores, etc.), and/or used for any other suitable purpose. After the talent score(s) are calculated at act 206, process 200 completes.

It should be appreciated that process 200 is illustrative and that variations of process 200 are possible. For example, although process 200 was described as being used for evaluating the suitability of one or more candidates for a job, process 200 may be adapted to evaluate the suitability of one or more candidates for one or more job categories, examples of which were described. This may be done in any suitable way. For example, in some embodiments, credential value preferences may be obtained for a job category (e.g., from one or multiple employers evaluating candidates for jobs in this category and/or in any other suitable way) and the suitability of each of one or more candidates for the job category may be evaluated based at least in part on the credentials of the candidate(s) and the credential value preferences associated with the job category.

Figure 3:
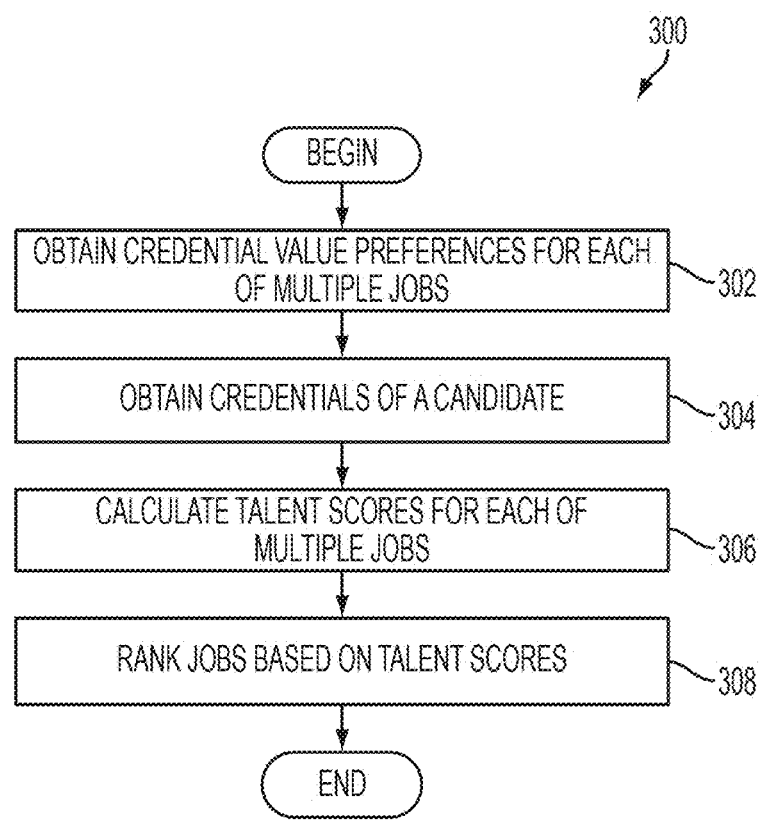
FIG. 3 is a flow chart of an illustrative process performed by a talent scoring system for calculating a respective talent score indicative of a candidate's suitability for each of multiple jobs based on credential value preferences associated with each of the multiple jobs, in accordance with some embodiments.

As previously described, a talent scoring system may provide a candidate using the system with his/her talent score calculated for one or multiple jobs and/or job categories. FIG. 3 is a flow chart of an illustrative process 300 for calculating a respective talent score indicative of a candidate's suitability for each of multiple jobs based on credential value preferences associated with each of the multiple jobs. Illustrative process 300 may be performed by any talent scoring system and, for example, may be performed by talent scoring system 112, which was previously described.

Process 300 begins at act 302, where credential value preferences may be obtained for each of one or multiple jobs (e.g., at least two jobs, at least five jobs, at least ten jobs, at least twenty jobs, etc.). Credential value preferences may be obtained in any suitable way including any of the previously described ways. As an illustrative non-limiting example, credential value preferences for a job may be obtained from an employer evaluating suitability of the candidates for the job. As another illustrative non-limiting example, the talent scoring system may store default credential value preferences for the job and/or for a job category of the job and may access the default credential value preferences as part of act 302.

Next, process 300 proceeds to act 304, where a candidate's credentials are obtained. The candidate's credentials may be obtained in any suitable way, including any of the previously described ways.

Next, process 300 proceeds to act 306, where the talent scoring system calculates a talent score of the candidate for each of the jobs for which credential value preferences were obtained at act 302. A candidate's talent score for a job may be calculated based at least in part on the candidate's credentials (obtained at act 304) and the credential value preferences associated with the job (obtained at act 302). This may be done in any suitable way, including the techniques described below with reference to FIGS. 5A, 5B, 6, and 14.

Next, process 300 proceeds to act 308, where the talent score(s) may be used to evaluate the suitability of the candidate for the job. The talent score(s) may be used to rank the jobs and rankings (and/or the talent scores themselves) may be used to evaluate the suitability of the candidate for the job(s). This may be done in any suitable and, for example, may comprise identifying jobs (and/or job categories) for which the candidate's score falls in a range and/or above a threshold. After act 308 is performed, process 300 completes.

Figure 4:
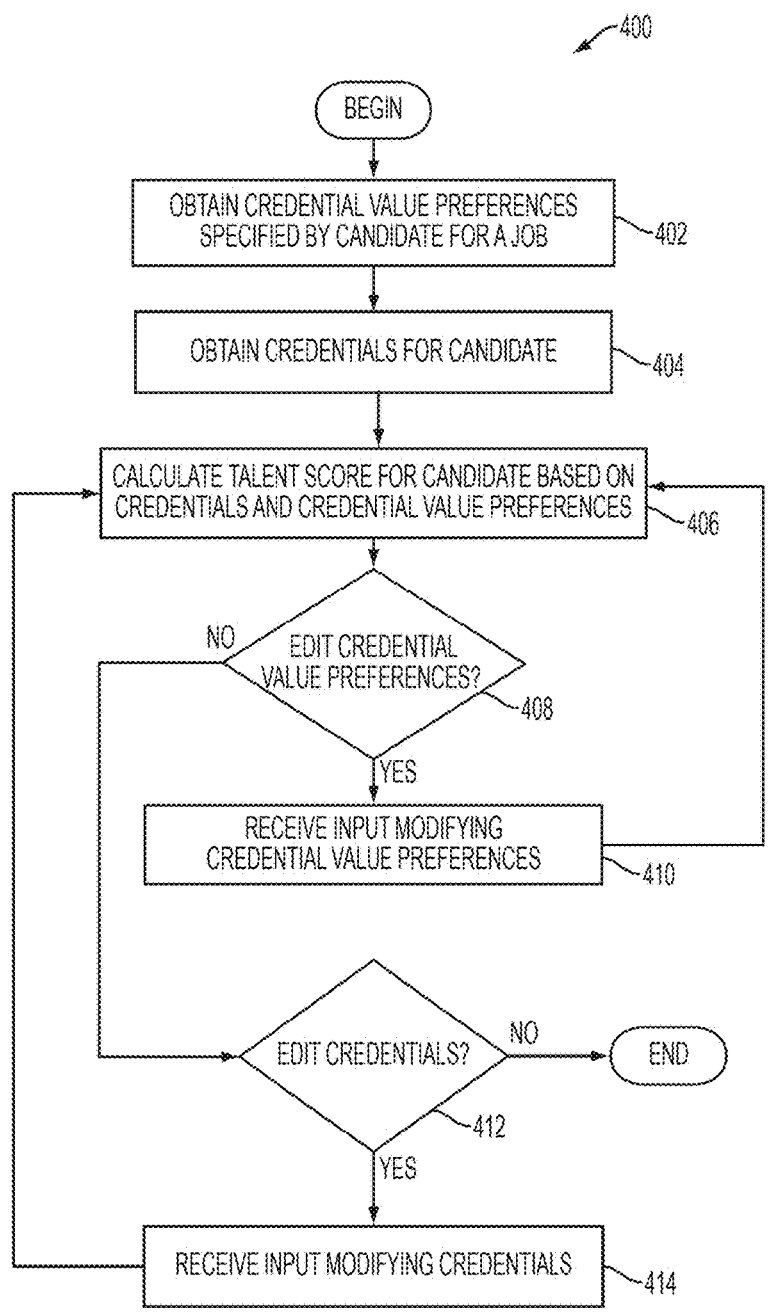
FIG. 4 is a flow chart of an illustrative process performed by a talent scoring system for calculating a talent score indicative of a candidate's suitability for a job based on credential value preferences specified by the candidate for the job, in accordance with some embodiments.

As previously described, in some embodiments, a candidate may specify credential value preferences for a job in order to evaluate himself or herself against the credential value preferences. FIG. 4 is a flow chart of an illustrative process for calculating a talent score indicative of a candidate's suitability for a job based on credential value preferences specified by the candidate for the job. Illustrative process 400 may be performed by any talent scoring system and, for example, may be performed by talent scoring system 112, which was previously described.

Process 400 begins at act 402, where credential value preferences specified by a candidate for a job are obtained. A candidate may specify any of the previously described credential value preferences that may be specified by an employer. The talent scoring system executing process 400 may allow candidates to specify credential value preferences for the job using the same or different user interface(s) as used by employers, as aspects of the technology described herein are not limited in this respect.

Next, process 400 proceeds to acts 404 and 406, where the talent scoring system obtains the candidate's credentials and calculates a talent score of the candidate for the jobs for which credential value preferences specified by the candidate were obtained at act 402. The candidate's credentials may be obtained in any suitable way, including any of the previously described ways. A candidate's talent score for a job may be calculated based at least in part on the candidate's credentials (obtained at act 404) and the credential value preferences associated with the job (obtained at act 402). This may be done in any suitable way, including the techniques described below with reference to FIGS. 5A, 5B, 6, and 14.

Next, process 400 proceeds to decision block 408, where it is determined whether the candidate wishes to edit credential value preferences. This determination may be made in any suitable way. For example, the talent scoring system may prompt the candidate to provide input indicating whether he/she wishes to edit credential value preferences that he/she had specified. As another example, the talent scoring system may receive input from the candidate (e.g., without the candidate being prompted) indicating that he/she wishes to edit credential value preferences.

Responsive to determining, at decision block 408, that the candidate wishes to edit credential value preferences, process 400 proceeds to act 410, where the talent scoring system may receive input specifying how credential value preferences are to be modified. For example, the talent scoring system may receive input indicating different preferred values for one or more preferred credentials. The received input may indicate different preferred values in any suitable way including, but not limited, to specifying one or more weights whose magnitudes indicate preferred values. For instance, the received input may indicate that GPA credentials having values in the range 0.7-0.8 (e.g., in the $70^{th}$-$80^{th}$ percentile) are more preferred (e.g., by specifying a weight of 1.0 to these credential values) than GPA credentials having values in the range 0.8-0.9 (e.g., by specifying a weight of 0.9 to these credential values). As another example, the talent scoring system may receive input indicating a different relative importance of different credentials and/or types of credentials that a candidate may have. These are only illustrative examples, however, and credential value preferences may be edited in any suitable way, at act 410, as aspects of the technology described herein are not limited in this respect.

Modifying credential value preferences allows a candidate to determine the effect of such modifications on his/her talent score. Accordingly, after input modifying credential value preferences is received by the talent scoring system at act 410, process 400 returns to act 406, where a talent score of the candidate is calculated based at least in part on the modified credential value preferences.

On the other hand, responsive to determining, at decision block 408, that the candidate does not wish to edit credential value preferences, process 400 proceeds to decision block 412, where it is determined whether the candidate wishes to edit his credentials. This determination may be made in any suitable way. For example, the talent scoring system may prompt the candidate to provide input indicating whether he/she wishes to edit one or more credentials that he/she had specified. As another example, the talent scoring system may receive input from the candidate (e.g., without the candidate being prompted) indicating that he/she wishes to edit one or more credentials.

Responsive to determining, at decision block 412, that the candidate wishes to edit his/her credentials, process 400 proceeds to act 414, where the talent scoring system may receive input specifying how the candidate's credentials are to be modified. For example, the talent scoring system may receive input specifying additional credentials for the candidate (e.g., a new academic credential such as an additional degree, a new computer literacy credential such as learning a new programming language, a new professional credential such as a new internship/job, etc.). As another example, the talent scoring system may receive input removing or modifying an existing credential (e.g., changing the credential of being proficient in a foreign language to the credential of being fluent in the language).

Modifying credentials allows a candidate to determine the effect of such modifications on his/her talent score. For example, the candidate may wish to determine the effect that obtaining one more new credentials (e.g., a master's degree in computer science, learning a new programming language, participating in a programming competition, etc.) may have on his/her talent score for a job (e.g., a computer science job). Accordingly, after input modifying a candidate's credentials is received by the talent scoring system at act 414, process 400 returns to act 406, where a talent score of the candidate is calculated based at least in part on the modified credentials.

On the other hand, responsive to determining, at decision block 412, that the candidate does not wish to modify his/her credential, process 400 completes.

It should be appreciated that process 400 is illustrative and that variations of process 400 are possible. For example, as described above, process 400 allows a candidate to evaluate his/her suitability for a job based on his/her credentials and the credential value preferences specified by the candidate for the job. This may allow a candidate to evaluate his/her suitability for a "mock job"—a job that is not offered or advertised by any particular employer. However, in some embodiments, process 400 may be adapted to allow a candidate to evaluate his/her suitability for a job based on his/her credentials and the credential value preference specified by an employer for the job. In such embodiments, the candidate may not be allowed to modify the credential value preferences specified for the job (by the employer), but may be allowed to modify his/her credentials to determine the effect of such modifications of his/her talent score for the job. In this way, a candidate may be able to determine whether adding one or more new credentials and/or modifying one or more existing credentials may change his/her talent score for a job for which an employer may be hiring.

There are numerous techniques that a talent scoring system may use to calculate a talent score of a candidate for a job based on the candidate's credentials and credential value preferences associated with the job. One such technique is described with reference to FIG. 5A, which is a flow chart of an illustrative process 500 for calculating a talent score indicative of a candidate's suitability for a job at least in part by calculating a first score for at least one of the candidate's primary credentials and a second score for at least of the candidate's secondary credentials. Illustrative process 500 may be performed by any talent scoring system and, for example, may be performed by talent scoring system 112, which was previously described.

Process 500 begins at act 502, where credential value preferences for a job may be obtained. Credential value preferences may be obtained in any suitable way from any suitable source. For example, credential value preferences may be obtained from an employer. As another example, credential value preferences may be obtained from the candidate. As yet another example, at least some (or all) of the credential value preferences may be default value preferences for the job and/or for a job category of the job and may be obtained by the talent scoring system in any suitable way.

In some embodiments, the credential value preferences may specify at least one preferred value for at least one credential in a primary set of credentials. The primary set of credentials may be specified in any suitable way. For example, in some embodiments, the primary set of credentials may be specified by the same party (e.g., an employer or a candidate) that specified the credential value preferences. That party may specify the primary set of credentials as part of credential value preferences or in any other suitable way. As another example, the primary set of credentials may be specified as part of the configuration of the talent scoring system. As previously described, the primary set of credentials may be any suitable set of credentials (e.g., one or more academic credentials, one or more professional credentials, etc.).

In some embodiments, the credential value preferences may specify at least one preferred value for at least one credential in a secondary set of credentials. The secondary set of credentials may be specified in any suitable way including any of the ways in which the primary set of credentials may be specified. As previously described, the secondary set of credentials may be any suitable set of credentials (e.g., awards and honors, professional credentials, computer literacy credentials, foreign language credentials, etc.). In some embodiments, the primary set of credentials and secondary set of credentials do not have any credentials in common (i.e., the set of primary credentials and the set of secondary credentials are disjoint).

After credential value preferences are obtained at act 502, process 500 proceeds to act 504, where credentials of a candidate are obtained. The credentials may comprise one or more credentials in the primary set of credentials. The credentials may also comprise one or more credentials in the secondary set of credentials. The credentials may be obtained in any suitable way, examples of which have been described.

Next, process 500 proceeds to act 506, where the talent scoring system assigns a value to each of one or more of the candidate's credentials in the primary set of credentials. The talent scoring system may assign a candidate's credential (whether a credential in the primary set of credentials or not) a value based on any information, accessible by the talent scoring system, that is indicative of an amount of knowledge/skill implied by the credential to the candidate in the area of the credential.

As one illustrative non-limiting example, the talent scoring system may be configured to access one or more rankings of schools, one or more rankings of one or more academic departments, and/or information about distributions of grades and/or grade point averages at one or more schools and/or one or more departments. The talent scoring system may use such information to assign a value to a candidate's academic credential. For instance, if a candidate has a credential of GPA=3.7 in a school (or department) where 25% of students have a GPA of at least 3.7, the talent scoring system may use this GPA distribution information to assign the value of 0.75 to the credential. If a candidate has a credential of GPA=3.7 in a school (or department) where 10% of students have a GPA of at least 3.7, the talent scoring system may use this GPA distribution information to assign the value of 0.9 to the credential. As previously described, credential values are not limited to being numeric values in the range of 0 to 1 and, in some embodiments, credential values may be numeric values in any suitable range or categorical values, as aspects of the technology described herein are not limited in this respect.

As another illustrative non-limiting example, the talent scoring system may be configured to access information indicative of an amount of knowledge/skill implied by a computer literacy credential. For example, the talent scoring system may access information indicating that placing in the top ten in a national programming competition implies a greater amount of programming skill than does placing in the top ten in state-wide programming competition. Accordingly, the talent scoring system may assign a higher value (e.g., 0.9 or "High") to the credential of placing in the top ten in a national programming competition than to the credential of placing in the top ten in a state-wide programming competition.

As yet another illustrative non-limiting example, the talent scoring system may be configured to access information indicative of an amount of knowledge/skill implied by a foreign language credential. For example, the talent scoring system may access information indicating that speaking a foreign language fluently implies a greater amount of knowledge/skill in the foreign language, than does being only proficient in speaking the language. Accordingly, the talent scoring system may assign a higher value (e.g., 0.9 or "High") to the credential of being fluent in a foreign language than to the credential of being only proficient in the foreign language. Though, it should be appreciated that the above-described examples of assigning values to credentials are illustrative and non-limiting, as a talent scoring system may be configured to assign values to any suitable type of credentials in any suitable way.

After the talent scoring system assigns values to one or more of the candidate's credentials in the primary set of credentials, process 500 proceeds to act 508, where the talent scoring system calculates a primary credentials score based at least in part on the values of the candidate's credentials (i.e., the values assigned at act 506) and one or more preferred values for these credentials (i.e., the preferred values specified in credential value preferences for the job obtained at act 502). This may be done in any suitable way.

In some embodiments, the talent scoring system may calculate a primary credentials score based at least in part on a measure of distance between the value(s) of the candidate's primary credential(s) and the corresponding preferred value(s). The smaller the measure of distance between the value(s) of the credential(s) and the preferred value(s), the higher the primary credentials score may be. For example, if the value of a candidate's academic credential (e.g., GPA=3.7) were 0.5 and the preferred value for this credential were specified to be 0.8, then the associated primary credentials score may be lower than the primary credentials score in a case where the value of the candidate's academic credential were closer to 0.8 than 0.5 (e.g., if the value of the candidate's academic credential were 0.6, 0.7, or 0.8).

In some embodiments, the talent scoring system may calculate a primary credentials score by using a mapping from a value of a credential (or values of multiple credentials) to a primary credentials score. The talent scoring system may generate this mapping as part of act 508 or at any time after obtaining credential value preferences at act 502. Accordingly, at act 508, the talent scoring system may generate a mapping (or access a previously generated mapping) from a value of a credential (or values of multiple credentials) to a primary credentials score and may use this mapping to calculate the candidate's primary credentials score.

Figure 8A:
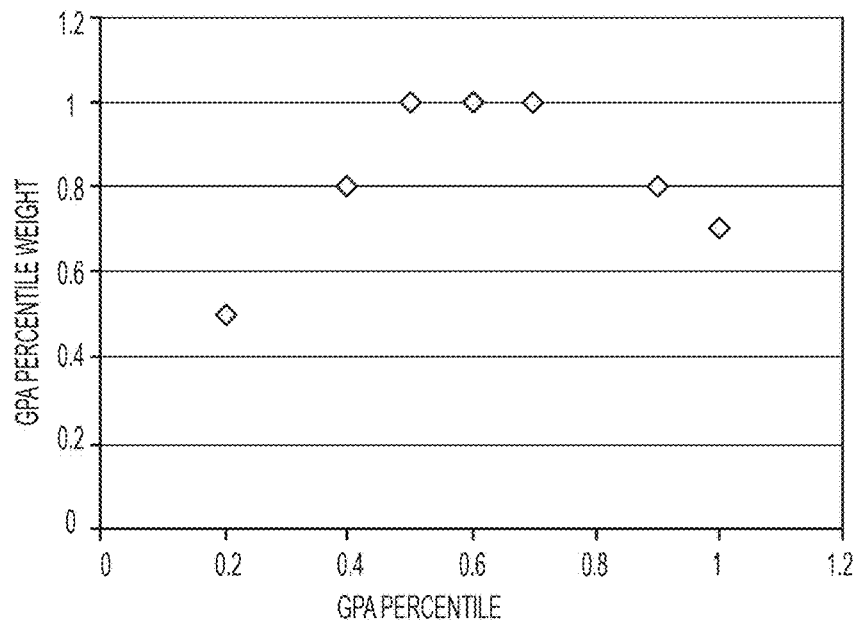
FIGS. 8A and 8B illustrate a mapping from a credential value to a score, in accordance with some embodiments.
Figure 8B:
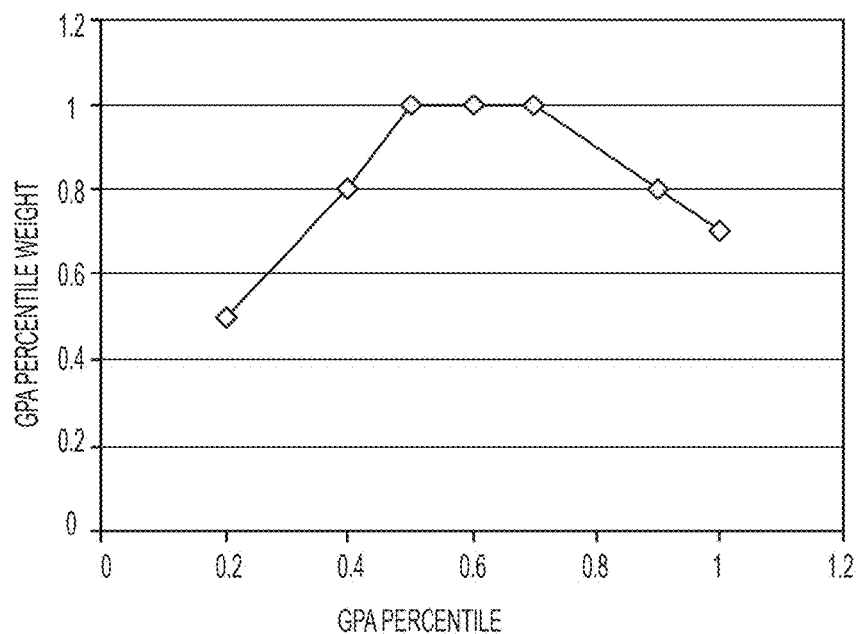

The talent scoring system may generate the mapping at least in part by using the credential value preferences obtained at act 502. This may be done in any suitable way. In some embodiments, when credential value preferences for a credential (or multiple credentials) are specified using one or multiple weights, the talent scoring system may generate the mapping at least in part by using the weights. The mapping may be generated based on the weights in any suitable way such as by using any suitable interpolation technique (e.g., linear interpolation, polynomial interpolation, spline interpolation, wavelet interpolation, etc.) and/or by specifying how the primary credentials score should fall off for as credential values increasingly deviate from a preferred credential value or values. For example, if preferred values for the credential of GPA were specified using weights according to the weights shown in the first row in Table 4 and plotted in FIG. 8A, these weights may be used to construct a mapping from values of a candidate's GPA credential to a score using linear interpolation as shown in FIG. 8B. The piecewise linear mapping illustrated in FIG. 8B may be used to assign a score to any value of a candidate's GPA credential.

As another example, the weights shown in Table 4 may be used to generate a mapping from values of two of the candidate's credentials (i.e., the candidate's school and the candidate's GPA) to a primary credentials score. To calculate the primary credentials score for the candidate in this example, the candidate's credential specifying the candidate's school (or department) may be assigned a value based on its rank (e.g., $10^{th}$ best school/department, $50^{th}$ best school/department, etc.) and the candidate's GPA may be assigned a value based on the distribution of GPAs at the candidate's school (or department). The mapping may then be used to determine a score for the values of the candidate's school and GPA credentials.

In some embodiments, the mapping may be scaled such that the maximum primary credentials score may be bounded from above and/or below so that there may be a maximum and/or minimum primary credentials score that may be obtained by using the mapping. For example, the mapping illustrated in FIG. 8B may be scaled by 0.75 (e.g., by multiplying every weight by 0.75) such that the maximum primary credentials score that may be obtained by using the mapping is 0.75.

As may be appreciated from the foregoing examples, the talent scoring system may generate a mapping from values of any suitable number of credentials in a primary set of credentials (e.g., at least one, at least two, at least three, at least four, at least five, etc.) to a primary credentials score. It should also be appreciated that a mapping from a credential value (or from values of multiple credentials) to a primary credentials score may be generated from any suitable number of weights (one, at least two, at least five, at least ten, etc.), as aspects of the technology described herein are not limited in this respect.

In the above-described examples, the primary credentials score was shown to be a value between 0 and 1. However, the primary credentials score may be a numeric value in any suitable numeric range, as aspects of the technology described herein are not limited in this respect.

After the primary credentials score for the candidate is calculated at act 508, process 500 proceeds to act 510, where the talent scoring system calculates a secondary score for a candidate's credential in the secondary set of credentials.

The secondary score may be calculated in any suitable way. In some embodiments, the secondary score for a credential in the secondary set of credentials may be calculated in a manner analogous to how the primary credentials score was calculated. That is, the secondary score may be calculated by: (1) assigning a value to the credential and (2) calculating the secondary score based on the value assigned to the credential and at least one preferred value for the credential, as specified in the credential value preferences obtained at act 502. The talent scoring system may assign a value to the credential using any of the techniques described above with reference to act 506 or in any other suitable way. The talent scoring system may calculate the secondary score based on the value and at least one preferred value for the credential using any of the techniques described above with reference to act 508 (e.g., by using a mapping from value of the credential to the secondary score, the mapping generated at least in part by using the at least one preferred value for the credential). The above-described and other techniques for calculating a secondary score are further described below with reference to FIG. 6.

After a secondary score is calculated for a candidate's credential in the secondary set of credentials, process 500 proceeds to decision block 512, where it is determined whether the candidate has any other credentials in the secondary set of credentials for which a score has not been calculated. If it is determined that the candidate has at least one other credential in the secondary set of credentials for which a score has not been calculated, process 500 returns, via the YES branch, to act 510 where a score is calculated for the other secondary credential. Accordingly, process 500 calculates a secondary score for each of the candidate's credentials in the secondary set of credentials. Thus, a talent scoring system may calculate one or multiple secondary scores for a candidate.

Responsive to determining, at decision block 512, that the candidate has no other credentials in the secondary set of credentials for which a secondary score is to be calculated, process 500 proceeds to act 514, where a talent score for the candidate is calculated. The talent scoring system may calculate a score for the candidate based at least in part on the candidate's primary credentials score (calculated at act 508) and one or more secondary scores (calculated at act 510).

In some embodiments, the talent scoring system may calculate the candidate's talent score as a result of increasing the candidate's primary credentials score based at least in part on the candidate's secondary score(s). The candidate's primary credentials score may be increased when at least one of the candidate's secondary score(s) is greater than the candidate's primary credentials score. When there is no secondary score greater than the primary credentials score, the talent scoring system may determine the candidate's primary credentials score to be the candidate's talent score. On the other hand, when there is a secondary score (secondary score "A") greater than the primary credentials score, the primary credentials score may be increased based on the secondary score to produce a first intermediate score having a value between the primary credentials score and the secondary score. When there is no other secondary score greater than the first intermediate score, the talent scoring system may determine the first intermediate score to be the candidate's talent score. On the other hand, when there is another secondary score (secondary score "B" different from secondary score "A") greater than the first intermediate score, the first intermediate score may be increased based on the other secondary score to produce a second intermediate score having a value between the first intermediate score and the other secondary score (i.e., secondary score "B"). When there is no secondary score (other than secondary scores "A" and "B") greater than the second intermediate score, the talent scoring system may determine the second intermediate score to be the candidate's talent score. Otherwise, the above described process continues by computing successively increasing intermediate scores until no previously unused secondary score greater than the last computed intermediate score remains. The talent scoring system may determine the last computed intermediate score to be the candidate's talent score.

As described above, the first intermediate score may be calculated based on the primary credentials score and a secondary score greater than the primary credentials score. This may be done in any suitable way. For example, the first intermediate score may be calculated as an affine combination of the primary credentials score and the secondary score according to $P\alpha+S(1-\alpha)$, where P is the primary credentials score, S is the secondary score and the weighting factor $\alpha$ is a real number between 0 and 1. The weighting factor $\alpha$ may be set in any suitable way and, in some embodiments, may be set based on the relative importance of the credential associated with the secondary score S. As previously described, credential value preferences may specify the relative importance of different credentials that a candidate may have and, in some embodiments, the relative importance of different credentials may be specified by using weights (see e.g., Table 5). Accordingly, the weighting factor $\alpha$ may be set to be (or may be set based on) a weight specifying the relative importance of the credential associated with the secondary score S.

It should be appreciated that the above-described way of calculating a talent score based on the primary credentials score and the secondary score(s) is illustrative and that a candidate's talent score may be calculated based on his/her primary credentials score and secondary score(s) in any other suitable way. After the candidate's talent score is calculated at act 514, process 500 completes.

Figure 5B:
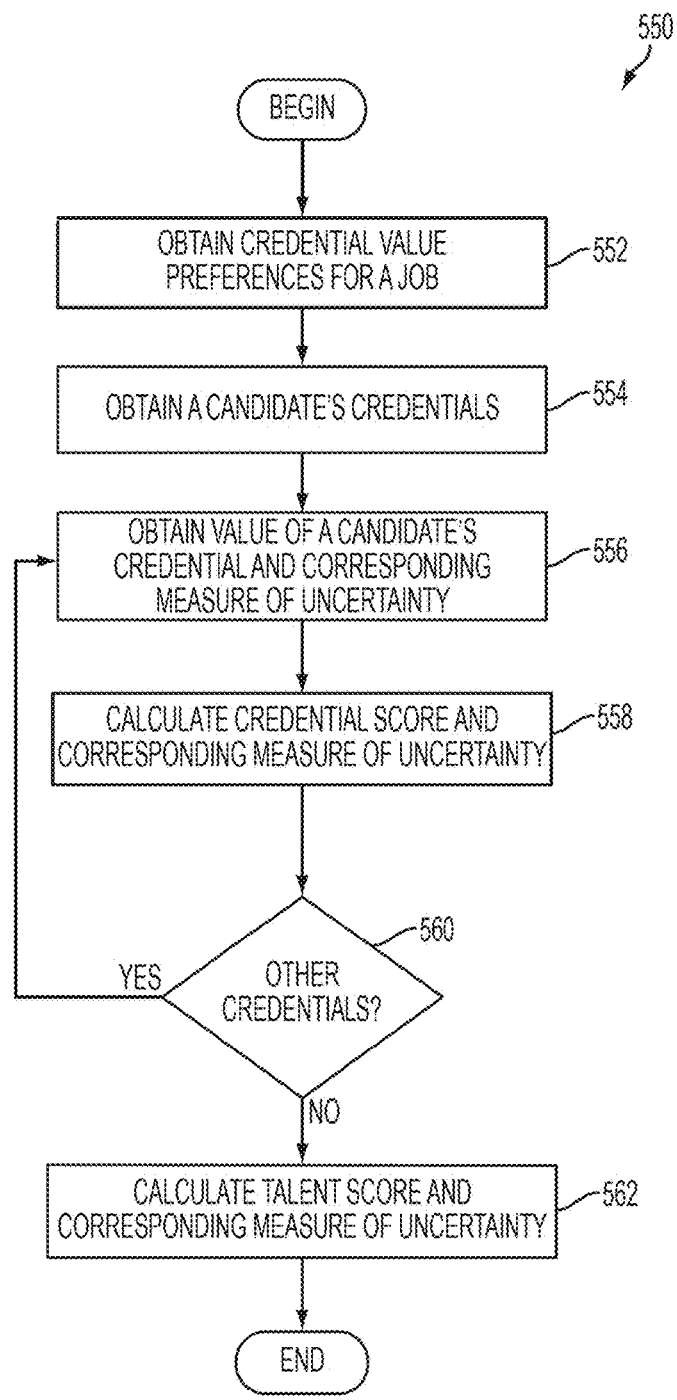
FIG. 5B is a flow chart of an illustrative process performed by a talent scoring system for calculating a talent score indicative of a candidate's suitability for a job and an associated measure of uncertainty, in accordance with some embodiments.

As previously described, a talent score computed according to some embodiments described herein may have some amount of uncertainty resulting from, among other reasons, the fact that the credentials used to calculate the talent score may not be quantifiable with absolute certainty. As a result, a measure of uncertainty may be computed for a talent score based on the level of corresponding uncertainty. A measure of uncertainty refers herein to any number, interval or range (discrete or continuous) associated with a talent score (or a credential value) that is indicative of a level of certainty/uncertainty associated with the talent score or credential value. For example, the measure of uncertainty may be a symmetric or asymmetric range about the talent score, or may be an independent number reflecting the certainty/uncertainty of the talent score (e.g., a number between 1 and 100, a percentage, or any other number reflecting certainty/uncertainty). A measure of uncertainty represented as an interval may also be referred to herein as a confidence interval. FIG. 5B is a flow chart of an illustrative process 550 performed by a talent scoring system for calculating a talent score indicative of a candidate's suitability for a job and an associated measure of uncertainty, in accordance with some embodiments. Illustrative process 550 may be performed by any talent scoring system and, for example, may be performed by talent scoring system 112, which was previously described. Process 550 begins at act 552, where the talent scoring system obtains credential value preferences for a job. This may be done in any suitable way, examples of which have been described.

Next, process 550 proceeds to act 554, where the talent scoring system obtains the candidate's credentials. The credentials may comprise any suitable number of credentials of any suitable type. For example, the credentials may comprise one or more credentials in a primary set of credentials and/or one or more credentials in a secondary set of credentials (e.g., as described with reference to FIG. 5A).

Next, process 550 proceeds to act 556, where the talent scoring system obtains a value of and/or assigns a value to one of the candidate's credentials, and provides a measure of uncertainty corresponding to the obtained and/or assigned value. The talent scoring system may assign a value to the credential in any suitable way and, for example, may assign a value to the credential based on information indicative of an amount of knowledge/skill implied by the credential to the candidate in the area of the credential, as previously described with reference to act 506 of process 500.

In some embodiments, the measure of uncertainty corresponding to the value of the credential may be an interval. The interval may be a contiguous interval represented by a minimum value and a maximum value. An interval representing a measure of uncertainty corresponding to a value of the credential may include the value of the credential such that the value of the credential is greater than (or equal to) the minimum value of the interval and smaller than (or equal to) the maximum value of the interval. The interval may be symmetric about the value of the credential, but is not limited to being symmetric. For example, in some instances, the interval representing a measure of uncertainty corresponding to a value of the credential may not be centered on the value of the credential (e.g., the difference between the minimum value of the interval and the value of the credential is not the same as the difference between the maximum value of the interval and the value of the credential). It should be appreciated that the measure of uncertainty corresponding to a credential value is not limited to being an interval and may be any other suitable measure of uncertainty. For example, in some embodiments, the measure of uncertainty may be probabilistic and may be specified via one or more distributions and/or other statistical quantities.

The measure of uncertainty corresponding to a value of a candidate's credential may be obtained in any of numerous ways. As one non-limiting example, the measure of uncertainty may be calculated based, at least in part, on the magnitude of the credential value. For instance, when the measure of uncertainty is an interval, that interval may be wider when the value of the credential is smaller (signifying less certainty in the value of the credential) and narrower when the value of the credential is larger (signifying greater certainty in the value of the credential).

As another non-limiting example, the measure of uncertainty for a value of a credential may be calculated based, at least in part, on the type of the credential. For example, the measure of uncertainty for an academic credential of having a degree from a particular university may be calculated on the variance in the rankings (e.g., as obtained from various published rankings of universities) of that university among different rankings of universities, whereas the measure of uncertainty for the credential of computer programming proficiency may be calculated based on the number of programming competitions a candidate has entered and placed in. As a result, the measure of uncertainty for a value of one credential (e.g., a degree from a particular university) may be different from the measure of uncertainty for a value of another credential (e.g., proficiency in a computer programming language) even if the values of these credentials are the same (e.g., both values are 0.9).

As yet another non-limiting example, the measure of uncertainty for a credential value may depend on (e.g., may be based on the reliability of) the source of data from which the credential value was obtained. For example, the uncertainty interval of a value associated with the credential of a test score may be narrower (indicating a higher level of certainty) for a standardized national test (e.g., SAT, MCAT, GRE, etc.) than for a statewide or local test. As another example, the measure of uncertainty (e.g., an interval) of a value associated with the credential of a mathematics competition may indicate a higher level of certainty in the value of the credential for an established competition (e.g., the Putnam mathematics competition) than for a less established (e.g., local) mathematics competition.

As yet another non-limiting example, the measure of uncertainty for a credential value may depend on whether or not particular data was or was not available for use in calculating the value of the credential. For example, as described above, the value of the credential that a candidate has a 3.7 GPA may be calculated based, at least in part, on the class rankings (data indicating how many other people at the candidate's school have a GPA of 3.7 or higher). The confidence in that value may be higher than the confidence in a value of the same GPA credential if it was calculated without any class ranking information available.

Next, process 550 proceeds to act 558, where the talent scoring system calculates a score for the credential (whose value was obtained at act 556) and a corresponding measure of uncertainty. The score for the credential may be obtained based, at least in part, on the credential value preferences obtained at act 552 and the value for the credential obtained at act 556. This may be done in any of the ways previously described with reference to act 508 of process 500 or in any other suitable way.

The measure of uncertainty corresponding to the score of the credential may also be calculated based, at least in part, on the credential value preferences obtained at act 552 and the value for the credential obtained at act 556. When the measure of uncertainty for the value of a credential is an interval represented by a minimum value and a maximum value, the measure of uncertainty for the score of the credential may be obtained by calculating a score for the minimum value to obtain a minimum score and a score for the maximum value to obtain a maximum score. The minimum and maximum scores so obtained then define the interval representing the measure of uncertainty for the score of the credential. A score may be calculated for the minimum value of the interval and the maximum value of the interval in the same way as for the value of the credential, in some embodiments.

Next process 550 proceeds to decision block 560, where it is determined whether to calculate a score and/or a measure of uncertainty for any other credentials of the candidate. This determination may be made in any suitable way, as aspects of the technology described herein are not limited in this respect. For example, if the candidate has one or more credentials that have not been scored, it may be determined to obtain and/or assign value(s) and score(s) for the unscored credential(s). As another example, if the employer has specified credential value preferences for one or more credentials that have not been scored, the talent scoring system may decide to obtain and/or assign value(s) and score(s) for these unscored credential(s). When it is determined to obtain value(s) and score(s) for one or more unscored credentials, process 550 returns to act 556 so that acts 556 and 558 may be repeated. On the other hand, when it is determined that no other credentials need to be scored, process 550 proceeds to act 562, where a talent score is calculate for the candidate.

A candidate's talent score may be computed based on scores obtained for the candidate's credentials. This may be done in any suitable way and, in some embodiments, may be done as previously described with reference to act 514 of process 500. For example, the talent score may be calculated as a weighted sum (e.g., an affine combination) of credential scores. Similarly, the measure of uncertainty for the talent score may be calculated as a weighted sum (e.g., an affine combination) of the measures of uncertainty for the scored credentials. For example, when the talent score is a calculated as a weighted sum of credential scores for N credentials (where N is any integer greater than or equal to 2) and each of the credential scores is associated with a respective interval representing the measure of uncertainty associated with the credential score, a minimum talent score value may be calculated as a weighted (e.g., affine) sum of minimum values of the intervals and a maximum talent score value may be calculated as a weighted (e.g., affine) sum of the maximum values. The minimum and maximum talent scores so obtained may represent the measure of uncertainty associated with the candidate's talent score. After the talent score and corresponding measure of uncertainty are calculated, at act 562, process 550 completes. As a result, a talent score and an accompanying measure of uncertainty may be provided for a given candidate, which process may be repeated for any number of candidates.

Figure 6:
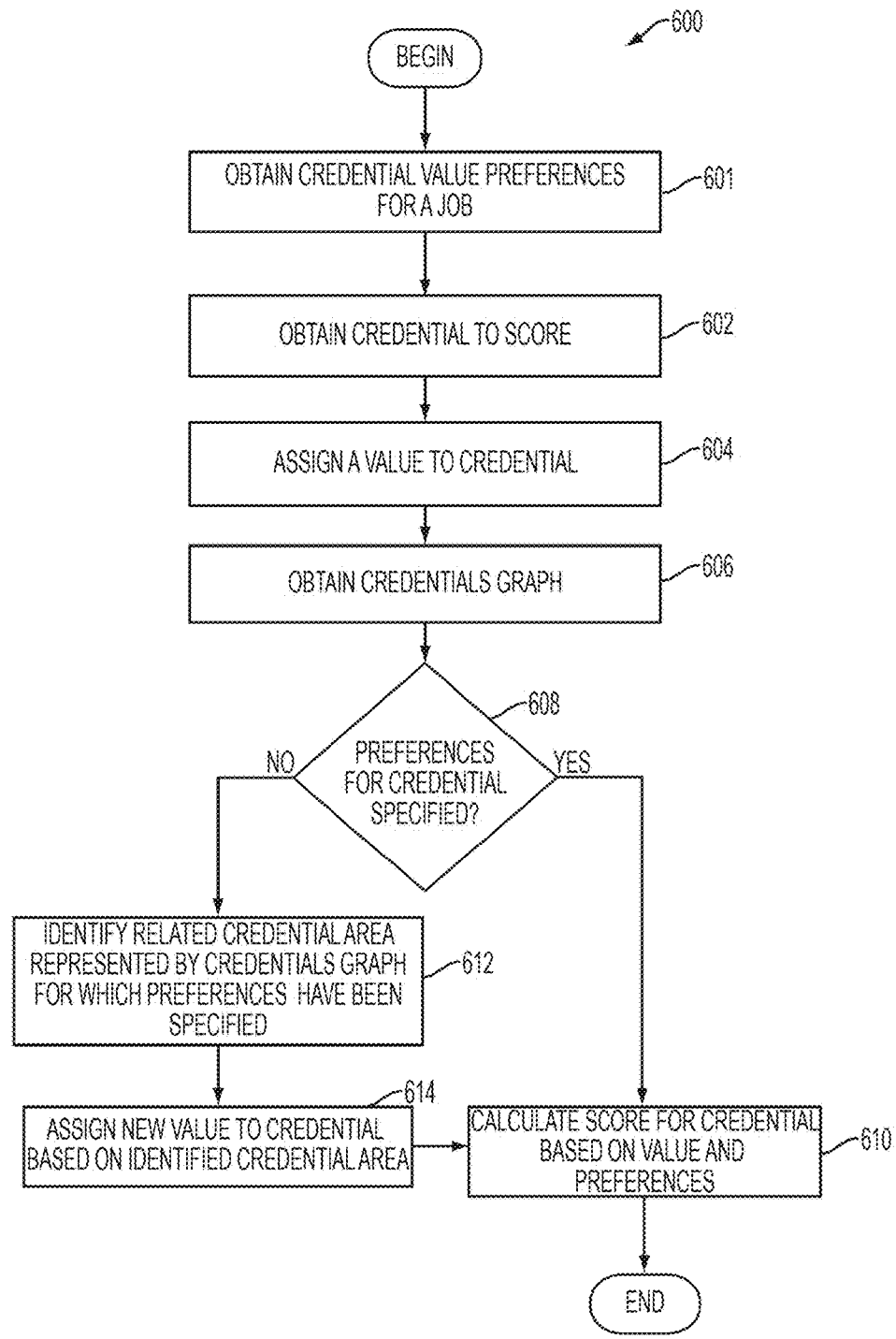
FIG. 6 is a flow chart of an illustrative process performed by a talent scoring system for calculating score of a candidate's credential based on value preferences specified for the credential or a related credential area, in accordance with some embodiments.

As previously described, credential value preferences associated with a job may not specify any preferred values for a particular credential of a candidate or its area, but may specify one or more preferred values for another related credential area. Accordingly, in some embodiments, a candidate's talent score may be calculated at least in part by calculating a score for the candidate's credential based at least in part on the preferred value(s) for another related credential area and the degree to which the candidate's credential and the other credential area are related. One example of such an approach is illustrated in FIG. 6, which is a flow chart of an illustrative process 600 for calculating a score for a credential based on value preferences specified for the credential or value preferences specified for another credential area related to the area of the credential.

Illustrative process 600 may be performed by any talent scoring system and, for example, may be performed by talent scoring system 112, embodiments of which were previously described. Illustrative process 600 may be performed to calculate a score for a candidate's credential as part of calculating the candidate's talent score. For example, illustrative process 600 may be used to calculate a secondary score for a candidate's credential in the secondary set of credentials (e.g., as part of act 510 of process 500) and/or to calculate the primary credentials score for the candidate (e.g., as part of acts 506-508 of process 500).

Process 600 begins at act 601, where the talent scoring system obtains credential value preferences for a job. This may be done in any suitable way, examples of which have been described.

Next, process 600 proceeds to act 602, where the talent scoring system obtains a candidate's credential for which the talent scoring system is to calculate a score. The credential may be a credential in the primary set of credentials or a credential in the secondary set of credentials. The credential may be any suitable type of credential indicative of knowledge/skill in any suitable area. The credential may be obtained in any suitable way by the talent scoring system, examples of which have been described.

After obtaining the credential at act 602, process 600 proceeds to act 604, where the talent scoring system assigns a value to the credential. The talent scoring system may assign a value to the credential in any suitable way and, for example, may assign a value to the credential based on information indicative of an amount of knowledge/skill implied by the credential to the candidate in the area of the credential, as previously described with reference to act 506 of process 500.

Next, process 600 proceeds to act 606, where the talent scoring system accesses a credential's graph representing relationships among credentials and/or credential areas. The credentials graph may be encoded in at least one data structure that may comprise any data necessary for representing the credentials graph and, for example, may comprise any parameters associated with the credentials graph. The data structure(s) encoding the credentials graph may be stored on any non-transitory computer-readable storage medium or media accessible by the talent scoring system (e.g., data store 114). Accordingly, the talent scoring system may access the credentials graph by accessing the data structure(s) encoding the credentials graph.

The credentials graph may comprise a set of nodes (vertices) and a set of edges connecting nodes in the set of nodes. The credentials graph may be directed or undirected. Each node may represent one or multiple credential areas and/or credentials. An edge between two nodes indicates that the credential areas and/or credentials represented by the two nodes are related. Each edge may be associated with a weight. Accordingly, the data structure(s) representing the graph may encode the graph's vertices, edges, and weights. Any of numerous data structures for encoding graphs may be used to encode the credentials graph, as aspects of the technology described herein are not limited in this respect.

The credentials graph may comprise any suitable number of edges connecting the nodes in any suitable way. For example, in some embodiments, the graph may include or be a hierarchical graph without loops (e.g., a tree). In other embodiments, the graph may contain loops and, in some instances, may be a fully connected graph. In some embodiments, the credentials graph may be a complete graph, whereby every pair of nodes is connected by an edge (or two edges, when the graph is a directed graph).

Figure 9:
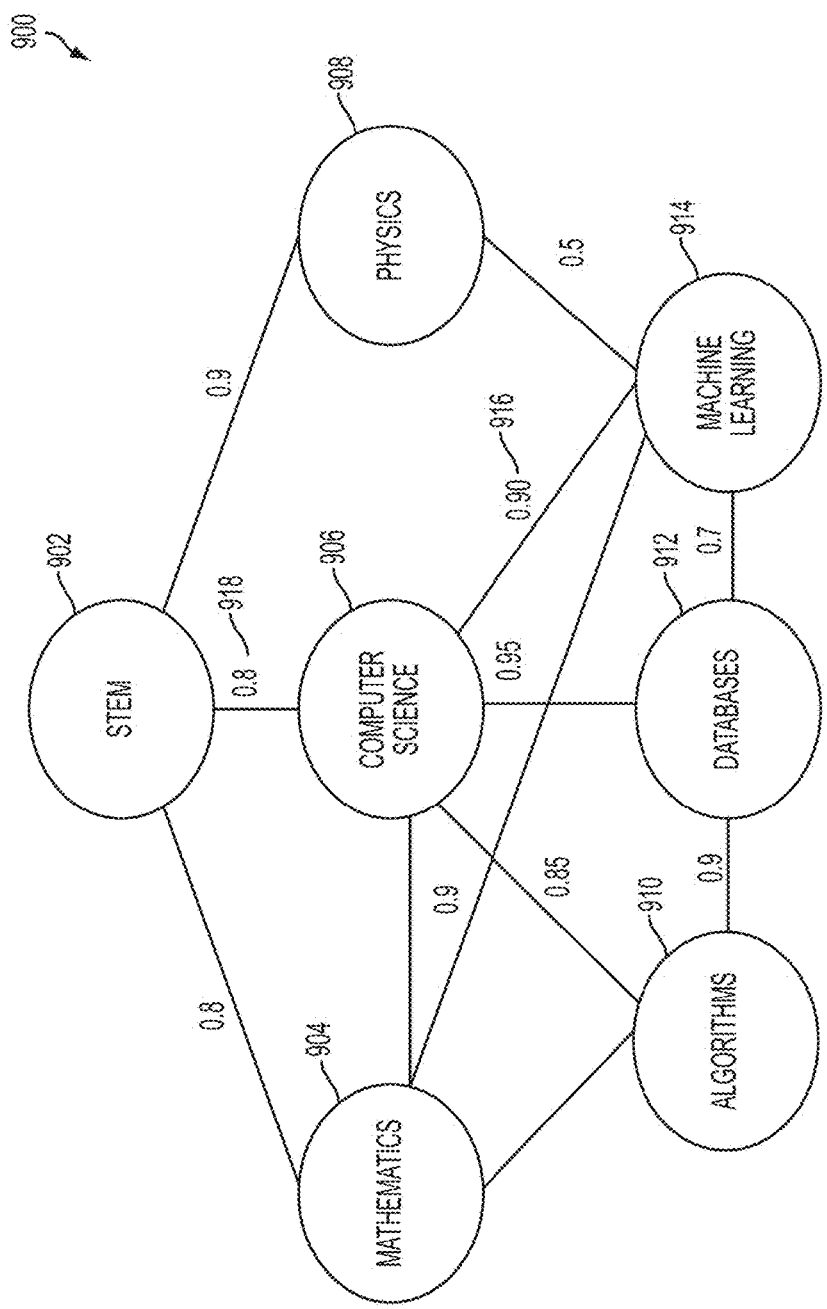
FIG. 9 illustrates a credentials graph, in accordance with some embodiments.

FIG. 9 shows an illustrative credentials graph 900 of credential areas 900. In this example, the node 902 of the graph represents the Science, Technology, Engineering, and Mathematics (STEM) credential areas. Nodes 904, 906, and 908, which are connected to node 902, represent the credential areas of mathematics, computer science, and physics, respectively. Nodes 910, 912, and 914 represent the credential areas of algorithms, databases, and machine learning, respectively. Node 914 representing machine learning is connected to node 906 ("computer science"), node 904 ("mathematics"), and node 908 ("physics"). It should be appreciated that credential graph 900 is only illustrative and shows a small number of nodes for clarity. A credential graph may be of any suitable size comprising any suitable number of nodes representing any suitable number of credential areas, as aspects of the technology described herein are not limited in this respect. It should also be appreciated that although the illustrated credentials graph represents only STEM credential areas, a graph credential areas may represent any suitable types of credential areas (e.g., humanities), as aspects of the technology described herein are not limited in this respect.

In some embodiments, where the credentials graph is a directed graph, a directed edge from a first node to a second node may indicate that the credential area represented by the second node is a sub-area of the credential area represented by the first node. In this way, the credentials graph may represent hierarchical relationships between credential areas.

Each edge in the credentials graph may be associated with a weight. The weight may be indicative of the amount of knowledge/skill in the credential area(s) represented by a first node that is implied by a given amount of knowledge/skill in the credential area(s) represented by a second node connected to the first node. For example, the amount of knowledge/skill in the area of computer science implied by a given amount of knowledge/skill in the area of machine learning is a fraction of that given amount, the fraction being specified by the weight. Consider an example in which a candidate has a credential in the area of machine learning (e.g., a course in machine learning) and the credential is assigned a value of 0.8, which is indicative of an amount of knowledge/skill the candidate has in the area of machine learning. Using the credentials graph, this same credential may be assigned a value of 0.8*0.9=0.72 (weight 916=0.9), which is indicative of the amount of knowledge/skill the candidate has in the area of computer science. Using the credentials graph 900 again, this same credential may be assigned a value of 0.8*0.9*0.8=0.576 (weight 918=0.8), which is indicative of the amount of knowledge/skill the candidate has in the STEM credential areas.

As should be appreciated from the foregoing, the credentials graph may be used to assign a value to a credential for each of multiple areas in represented in the graph. A credential (e.g., a class in machine learning) may be assigned a value for its corresponding area (e.g., machine learning) using any suitable technique and a value for each of one or more areas related to the corresponding area (e.g., computer science, mathematics, STEM, etc.). The value(s) for the related area(s) may be calculated at least in part by using weights specified in the hierarchy of credential areas. This may be advantageous when value preferences are specified only for some credential areas (e.g., computer science), but not others (e.g., machine learning), as described in further detail below.

After the talent scoring system accesses the credentials graph in act 606, process 600 proceeds to decision block 608, where it is determined whether credential value preferences have been specified for the credential obtained at act 602. Responsive to determining that credential value preferences have been specified for the credential (e.g., for the credential of having a course in machine learning) and/or for the area of the credential (e.g., the credential area of machine learning), process 600 proceeds, via the "YES" branch, to act 610, where the talent scoring system calculates a score for the credential based on the specified credential value preferences and the value assigned to the credential at act 604. This may be done in any of the ways previously described with reference to act 508 of process 500 or in any other suitable way. After the score is calculated for the credential at act 610, process 600 completes.

On the other hand, responsive to determining that credential value preferences have not been specified either for the credential or for the area of the credential, process 600 proceeds, via the "NO" branch, to act 612. At act 612, the talent scoring system identifies a related credential area in the credentials graph that is related to the area of the credential obtained at act 602 and for which credential value preferences have been specified. The related credential area may be identified by using the credential value preferences (obtained at act 601) and the credentials graph (accessed at act 606). A credential area in the graph may be related to the credential obtained at act 602 if there is a path from that credential area to the area of the credential obtained at act 602 (in a complete graph, each path would consist of a single edge). For instance, in the example of FIG. 9, the credential areas of "STEM," "computer science," and "mathematics" are related to the credential of a course in machine learning because there is a path in the graph from the nodes representing these areas to the node representing machine learning, which is the area of the credential of a course in machine learning.

After the related credential area is identified at act 612, process 600 proceeds to act 614, where the talent scoring system assigns a new value to the credential obtained at act 602 so that this new value is indicative of the amount of knowledge/skill the credential implies the candidate has in the credential area identified at act 612. The new value may be computed by discounting the value of the credential, computed at act 604, by weights along the path from the credential area identified at act 612 to the area of the credential. For example, if the value of 0.8 were assigned to the credential of a course in machine learning at act 604, and the credential area STEM were identified at act 612, then the new value may be computed as 0.8*0.9*0.8=0.576 using weights 916 and 918 in illustrative credentials graph 900.

After the new value is calculated for the credential obtained at act 602, process 600 proceeds to act 610, where the credential value preferences (obtained at act 601) and the new value are used to calculate a score for the credential. After the score is calculated, process 600 completes.

Figure 10:
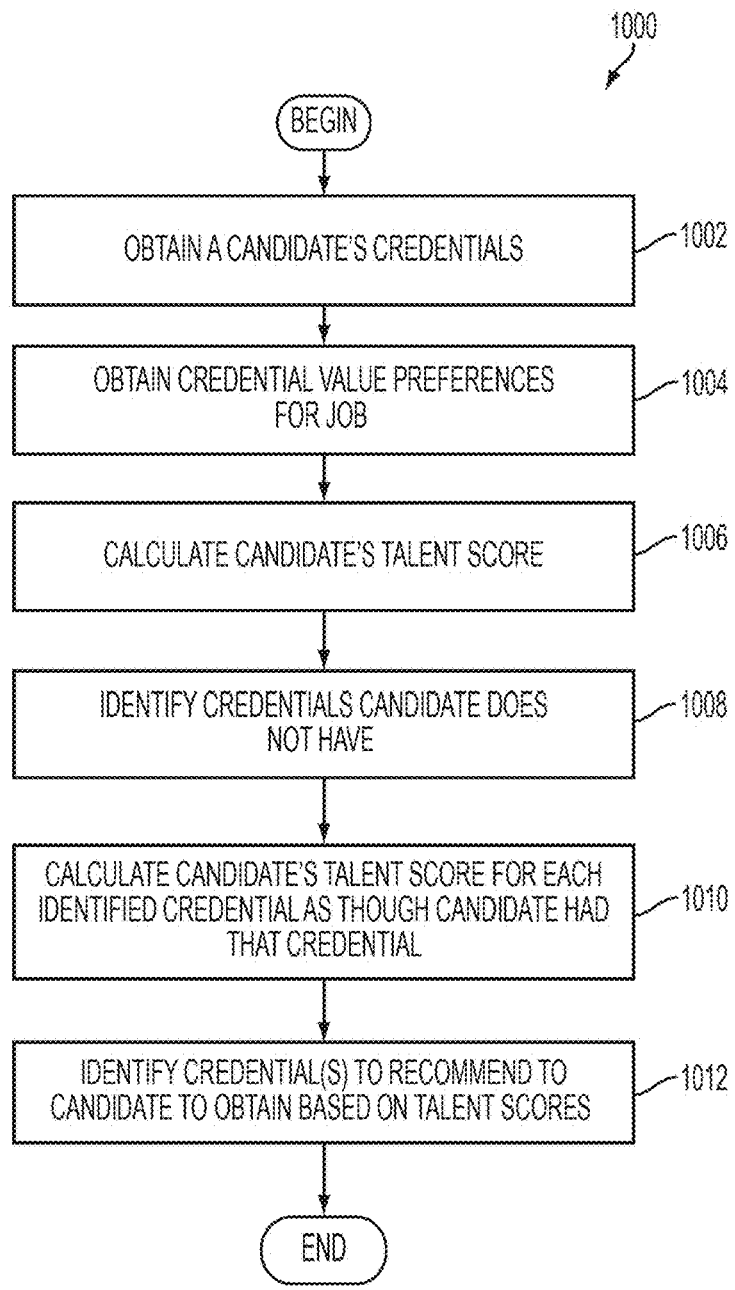
FIG. 10 is a flow chart of an illustrative process performed by a talent scoring system for recommending one or more credentials for a candidate to obtain, in accordance with some embodiments.

As has been previously discussed, a talent scoring system may be configured to recommend to a candidate one or more new credentials that the candidate may wish to obtain. FIG. 10 shows is a flowchart of an illustrative process 1000 for recommending credentials to a candidate. Illustrative process 1000 may be performed by any talent scoring system and, for example, may be performed by talent scoring system 112, which was previously described.

Process 1000 begins at acts 1002 and 1004, where the talent scoring system obtains a candidate's credentials and credential value preferences for a job, respectively. This may be done in any suitable way, examples of which have been described.

Next, process 1000 proceeds to act 1006, where a talent score for the candidate is calculated based on the candidate's existing preferences (obtained at act 1002) and the credential value preferences (obtained at act 1006). This may be done in any suitable way and, for example, may be done by using the techniques described with reference to FIGS. 5A, 5B, 6, and 14.

Next, process 1000 proceeds to act 1008, where the talent scoring system may identify one or multiple credentials that the candidate does not possess. This may be done in any suitable way. In some embodiments, the talent scoring system may identify one or more credentials that the candidate does not possess by using the credentials obtained at act 1002. For example, the talent scoring system may have access to one or more lists of credentials that candidates may have, in general, and may compare these lists(s) with the candidate's credentials obtained at act 1002 to determine which credential(s) the candidate does not possess. It should be appreciated that the talent scoring system may identify any suitable number of credentials that the candidate does not possess. For example, in some embodiments, the talent scoring system may identify some but not all credentials that the candidate does not possess, as a talent scoring system is not limited to identifying all credentials that a candidate does not possess.

Any suitable credentials of any suitable type may be identified at act 1008. For example, the talent scoring system may identify one or more courses that the candidate has not taken. As another example, the talent scoring system may identify one or more degrees (e.g., graduate degrees) that the candidate has not obtained. As yet another example, the talent scoring system may identify one or more competitions that the candidate has not entered and/or placed in. As yet another example, the talent scoring system may identify one or more publications the candidate has not published.

Next, process 1000 proceeds to act 1010, where the talent scoring system evaluates the effect of augmenting the candidate's credentials with one or more of the identified credentials on the candidate's talent score. This may be done in any suitable way. For example, in some embodiments, the talent scoring system may (1) augment the candidate's credentials with one new credential identified at act 1008 and (2) calculate the candidate's talent score based on the augmented credentials. The talent scoring system may repeat these two steps for each of the credentials identified at act 1008. Accordingly, the talent scoring system may calculate a talent score for each one of the credentials identified at act 1008 as though the candidate had that credential. As another example, in some embodiments, the talent scoring system may (1) augment the candidate's credentials with multiple credentials that the candidate does not have and (2) calculate the candidate's talent score based on the augmented credentials. The talent scoring system may repeat these two steps for each of multiple groups of multiple credentials.

As described above, a talent scoring system may calculate a candidate's talent score based on the candidate's credentials augmented by one or more credentials the candidate does not have. This may be done in any suitable way. For example, in some embodiments, the talent scoring system may obtain at least one value for at least one new credential and calculate the talent score based at least in part on the at least one value of the at least one new credential, at least one value of at least one of the candidate's existing credentials (i.e., credentials obtained at act 1002) and the credential value preferences. The credential value preferences may specify at least one preferred value for one or more of the candidate's existing credentials. Additionally, credential value preferences may specify one or more preferred values for the at least one new credential.

Next, process 1000 proceeds to act 1012, where the talent scoring system may identify which credential(s), among those identified at act 1008, to recommend to the candidate to obtain. This may be done in any suitable way and, for example, may be done based on the talent scores calculated by using the identified credentials, at act 1010. For example, the talent scoring system may identify which of the identified credentials, when augmenting the candidate's existing credentials, result in the largest increase (or largest increases) of the candidate's talent score (which was calculated at act 1006 based only on the candidate's existing credentials). The system may identify the credential leading to the largest, the two credentials leading to the two largest, the three credentials leading to the three largest increases in the candidate's talent score. As another example, the talent scoring system may identifying which of the identified credentials, when augmenting the candidate's existing credentials, result in an increase of the candidate's talent score (which was calculated at act 1006) that is greater than a threshold. As another example, the system may rank the identified credentials based on their respective talent scores and identify a number of credentials at the top of the ranking to recommend to the candidate to obtain.

The talent scoring system may recommend these credentials to the candidate in any suitable way, as aspects of the technology described herein are not limited in this respect. After act 1012, process 1000 completes.

As discussed above, some embodiments provide for an application program that receives profile information of individuals identified via a user search on an online service (e.g., a professional website) and generates a talent score for these individuals, with or without an accompanying measure of uncertainty (e.g., a confidence interval). Such an application may help employers identify the candidates, from among users in an online professional service (e.g., LinkedIn®, Monster®, etc.), that are best suited for one or more jobs. These embodiments are described in more detail below with reference to FIGS. 11 and 12.

Figure 11:
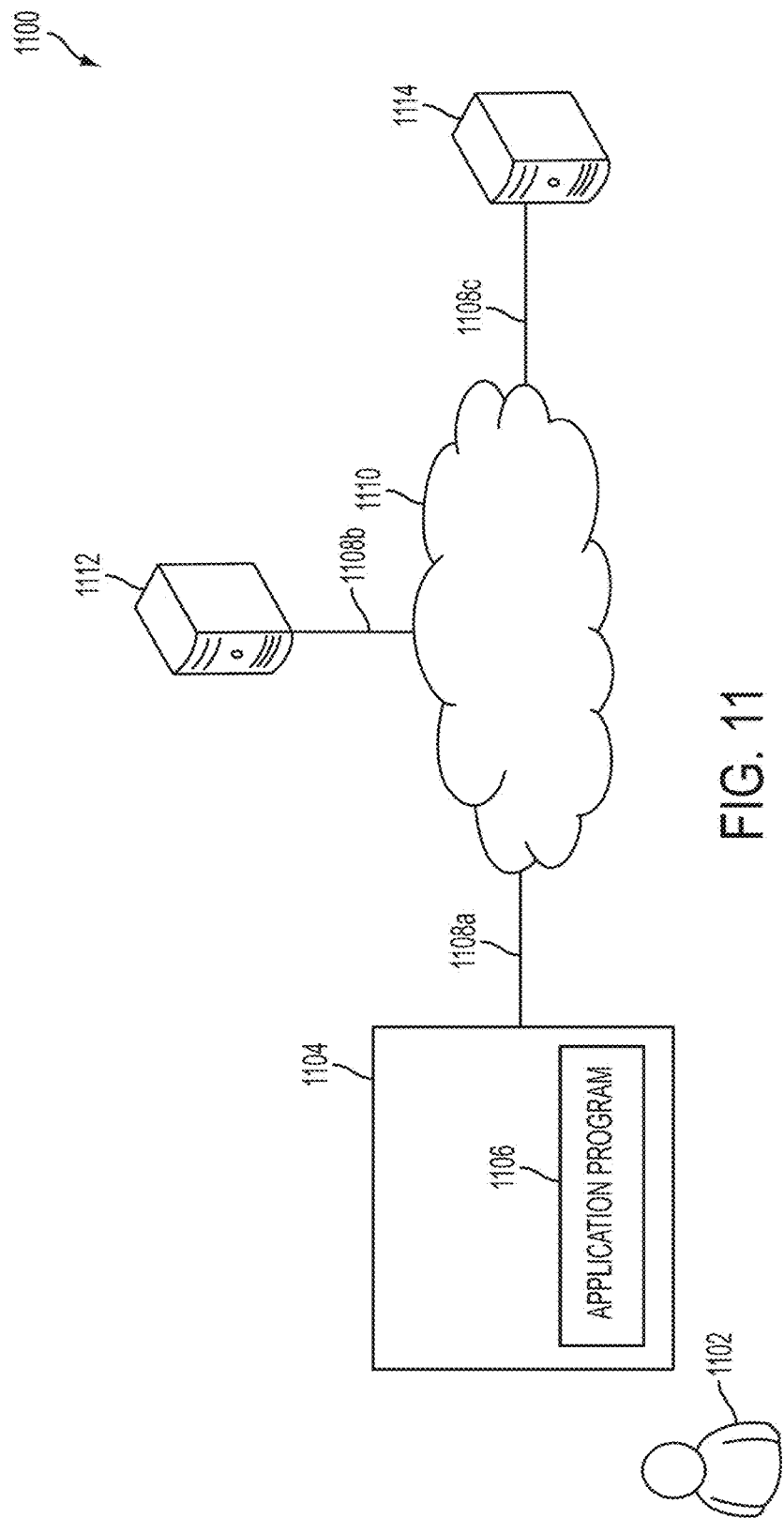
FIG. 11 shows another illustrative environment in which some embodiments may operate.

FIG. 11 shows an illustrative environment 1100 in which some embodiments, related to identifying candidates from among users in an online service of professionals, may operate. In the illustrative environment 1100, a user 1102 (e.g., an employer) may use computing device 1104 to interact with, via network 1110, an online service 1114 (e.g., provide by one or more servers connected to network 1110) to search for one or more candidates for one or more jobs. Additionally, user 1102 may use computing device 1104 to interact with, via network 1110, talent scoring system 1112 to obtain talent scores for one or more candidates identified among the users in online service 1114.

In some embodiments, user 1102 may use an application program 1106 executing on computing device 1104 (e.g., a browser or other network interface application) to access the online service 1114 and search for candidates for one or more jobs among the users of the online service 1114. User 1102 may input a search query specifying information associated with a job to the application program 1106, the application program 1106 may transmit a representation of the search query to online service 1114, the online service 1114 may perform a search for users of the service based, at least in part, on the search query and provide the search results (e.g., information specifying identified users of, or associated with, the online service, such as a list of identified online service users) to the application program 1106. In turn, application program 1106 may present the search results to user 1102.

In some embodiments, the user 1102 may obtain a talent score for one or more of the online service users identified in response to the user's query. For example, the user 1102 may obtain a talent score for one or more of the identified online service users from talent scoring system 1112. Application program 1106 or a portion thereof (or another application program executing on device 1104 and configured to communicate with application program 1106, such as a plug-in application configured for program 1106) may be configured to provide to talent scoring system 1112 any suitable information used by talent scoring system 1112 to calculate talent scores for one or more of the identified online service users. For example, application program 1106 may be configured to provide to talent scoring system 1112 information about the identified online service users that was obtained from online service 1114 (e.g., credential information for each of one or more of the identified online service users). Additionally or alternatively to obtaining or receiving information about online service users from computing device 1104 (e.g., via application program 1106), talent scoring system 1112 may be configured to obtain any suitable information about online service users directly from online service 1114. As another example, application program 1106 may be configured to provide to talent scoring system 1112 information associated with the job (e.g., the search query provided to online service 1114, credential value preferences for the job, etc.). In turn, talent scoring system 1112 may be configured to calculate talent scores for the identified online service users and provide the results to application 1106. Application 1106 may then rank the identified online service users based on their talent scores. In this way, when online service 1114 identifies many online service users such that it is difficult or undesirable for user 1102 to consider each identified online service users, talent scores computed by talent scoring system 1112 may allow the user 1102 to focus his/her attention on those online service users that are most suitable for the job for which user 1102 is looking to find candidates.

Computing device 1104 may be any suitable computing device which user 1102 may use to interact with talent scoring system 1112 and online service 1114. For example, computing device 1104 may be a fixed or a portable computing device, examples of each of these types of devices have been provided above with reference to FIG. 1. Network 1110 may be any suitable network such as a local area network, a wide area network, a corporate intranet, the Internet, and/or any other suitable network. As shown, computing device 1104 is coupled to network 1110 via connection 1108a, talent scoring system is coupled to network 1110 via connection 1108b, and online service 1114 may be coupled to network 1110 via connection 1108c. These connections may be wired, wireless, and/or any other suitable type of connection, as aspects of techniques described herein are not limited for use with any particular network configuration, connection type or implementation.

Application program 1106 may be an Internet browser (e.g., a web browser) or a stand-alone application program configured to communicate with online service 1114. Application program 1106 may also be configured to communicate with talent scoring system 1112. As described above, in embodiments where application program 1106 is a browser, application program 1106 may be configured to communicate with talent scoring system 1112 via a plug-in application program. As such, talent scoring system 1112 may provide program functionality rendered and/or operating on computing device 1104 that allows communication with talent scoring system 1113. Such program functionality may be provided as part of, integrated or otherwise accompanying, or separate from application program 1106, as the techniques for scoring users of an online service are not limited for use with any particular configuration or implementation.

Talent scoring system 1112 may be any suitable type of talent scoring system such as, for example, talent scoring system 112 described with reference to FIG. 1. Talent scoring system 1112 may be configured to calculate talent scores for candidates in accordance with the techniques for calculating talent scores described herein (e.g., the techniques described with reference to FIGS. 5A, 5B, 6, and 14). For example, talent scoring system 1112 may be configured to calculate a talent score for a candidate, based on the candidate's credentials and an employer's credential value preferences, by calculating a value for each of one or more of the candidate's credentials (e.g., credentials available via the online service) and determining how well the values of the candidate's credentials align with the employer's credential value preferences.

Online service 1114 may be any online website and/or service that has access to information its users, which may include one or more credentials. The online service may provide an interface for searching among users of the online service. For example, the online service may be an online network of users (e.g., LinkedIn®), an online service for job seekers (e.g., Monster®), and/or any other suitable type of online service. The online service may be a professional network for use by professionals (e.g., LinkedIn®), a social network online service (e.g., Facebook®), and/or any other suitable type of online service that has access to information about the credentials of at least some of its users. The online service may make information about its users available via a web-based interface, an application programming interface (API), and/or in any other suitable way.

It should be appreciated that environment 1100 is illustrative and that variations of environment 1100 are possible. For example, in some embodiments, talent scoring system 1112 and computing device 1104 may be one device (e.g., talent scoring software may execute on computing device 1104). As another example, in some embodiments, user 1102 may use device 1104 to interact with talent scoring system 1112, which in turn may be configured to communicate directly with online service 1114 such that user 1102 need not access online service 1114 directly and may search for one or more users of online service 1114 via an interface (e.g., a web interface) provided by talent scoring system 1112. Computing device 1104 may be any suitable computing device including, but not limited to, user terminals, personal computers, mobile devices such as laptops, pads, smart phones, etc., or any other computing device capable of communicating with network 1110. Network 1110 may be any combination of one or more public and/or private networks capable of allowing connected components to communicate, either directly or indirectly.

Figure 12:
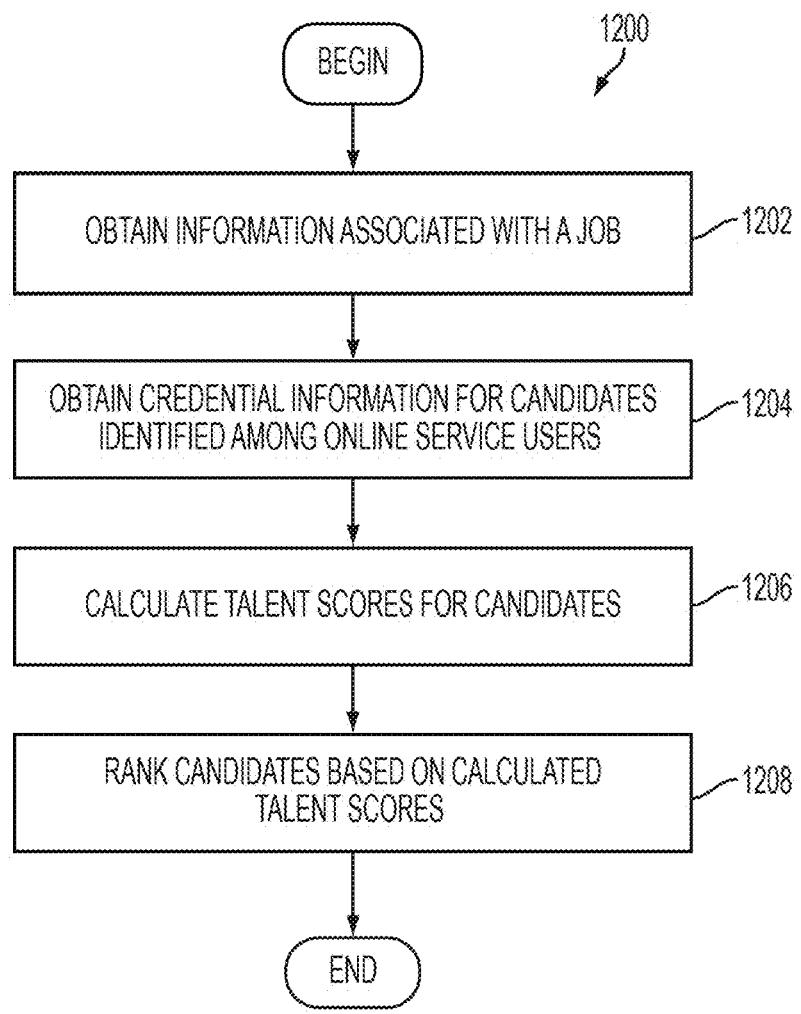
FIG. 12 is a flow chart of an illustrative process performed by a talent scoring system of calculating talent scores for candidates identified from among users associated with an online service, in accordance with some embodiments.

FIG. 12 is a flow chart of an illustrative process 1200 performed by a talent scoring system of calculating talent scores for candidates identified from among users of or associated with an online service, in accordance with some embodiments. Illustrative process 1200 may be performed by any talent scoring system and, for example, may be performed by example talent scoring systems 1112 or 112 as described herein.

Process 1200 begins at act 1202, where the talent scoring system obtains information associated with a job and/or a skill or particular set of skills. Information associated with a job may include any information describing the job, describing the types of candidates an employer may be seeking to hire for the job, credential value preferences for a job, and/or any other suitable information. Credential value preferences for the job (and/or any other type of information associated with the job) may be obtained in any suitable way, examples of which have been described.

Next, process 1200 proceeds to act 1204 where credential information for one or more users identified among users of an online service may be obtained by the talent scoring system. The online service may be any suitable online website and/or service via which credentials of one or more users may be accessed (e.g., LinkedIn®, Monster®, etc.). Credential information of a user of an online service may be obtained by the talent scoring system directly from the online service (e.g., talent scoring system 1112 may obtain credential information of an online service user directly from online service 1114) or indirectly (e.g., user 1102, such as an employer searching for candidates for a job, may obtain credential information of the online service user from online service 1114 and provide the credential information to talent scoring system 1112).

The users whose credential information is obtained by the talent scoring system at act 1204 of process 1200 may be identified from among the users of the online service based on information provided by a user seeking to identify candidates suitable for a job from among users in the online service (e.g., user 1102, such as an employer). For example, as described above with reference to FIG. 11, a user may submit a search query to the online service to find candidates suitable for a job and the online service may identify one or more candidates, among the users of the online service, based on the search query. The search query may be any desired query that, for example, pertains to a job, one or more skills, or any may include other keywords the user submitting the search query desires or finds useful. The user may submit the search query directly to the online service and/or via the talent scoring system executing process 1200. Though it should be appreciated that users whose credential information is obtained by the talent scoring system at act 1204 of process 1200 may be identified from among the users of the online service in any other suitable way.

After the credentials of one or more online service users are obtained at act 1204, process 1200 proceeds to act 1206 where a talent score is calculated for one or more of the online service users whose credentials have been obtained. The talent score for a candidate may be calculated based, at least in part, on the candidate's credentials (obtained at act 1204) and information associated with the job (obtained at act 1202). This may be done in any suitable way including in any of the ways described herein. For example, a talent score for a candidate may be obtained by calculating a value for each of one or more of the candidate's credentials and determining how well the values of the candidate's credentials align with the employer's credential value preferences. In some embodiments, a measure of uncertainty (e.g., a confidence interval) may be obtained for each of one or more of the talent scores calculated at act 1206 (e.g., as described with reference to FIG. 5B).

Next process 1200 proceeds to act 1208, where the online service users are ranked based on their respective talent scores. In some embodiments, when measures of uncertainty for the talent scores are available, online service users may be ranked based on their talent scores and the corresponding measures of uncertainty. This may be done in any suitable way. As an example, the online service users may be ranked based on their talent scores and when two users have the same talent score, the user whose score has a higher confidence may be ranked ahead of the other user. As another example, a user with a talent score that is smaller than the talent score of another user, but whose talent score is associated with a higher confidence than that of the other user, may be ranked ahead of the other user.

As may be appreciated from the foregoing, the ranking of online service users generated at act 1208 of process 1200 may be different from the ranking of these same users generated by the online service in response to information provided by a user seeking to identify candidates suitable for a job from among users in the online service. For example, in response to a user's search query, the online service may present the user with a list of online service users identified based on the query, as described above with reference to FIG. 11. This list of users may be ordered in accordance with how well each of the online service users matches the search query or the list of user may be presented alphabetically, in the order in which they were matched, based on their relationship to the user submitting the query, or in any other order. However, when the users in the list are ranked based on their talent scores, the resulting ranking may be (and most likely is) different from the ordering of the users in this list generated by the online service. After the ranking is generated, process 1200 completes. As a result, the user may obtain a ranked list of user based upon talent scores for the users.

Figure 13:
FIG. 13 shows an illustrative example of a user interface that may be used by an employer to interact with a talent scoring system in order to identify suitable job candidates among users of an online service, in accordance with some embodiments.

The talent scores and/or rankings obtained for online service users generated by using process 1200 may be presented to a user (e.g., an employer searching for suitable job candidates among online service users, user 1102 described with reference to FIG. 11, etc.) or used in any other suitable way. One illustration for how talent scores for online service users may be displayed is shown in FIG. 13. The interface shown in FIG. 13 was obtained by searching an online service (LinkedIn® in this example) using the search query "machine learning," and subsequently scoring at least some of the identified users for the job of "Software Engineer, Relevance/Machine Learning," for which the employer specified credential value preferences (e.g., by clicking the 'create job' button and specifying credential value preferences and/or any other information associated with the job). The top talent scores are shown in the top portion of the illustrative interface, with some of the talent scores being shown together with corresponding measures of uncertainty. It should be appreciated that some of the top-scoring candidates (based on their talent scores) are not shown by LinkedIn® on the first page of (over 200,000 online service users). Without a talent scoring system to identify such candidates, an employer would have had to review a very large number of online service users and would have likely given up before finding the most suitable candidates. Accordingly, aspects of techniques described herein may facilitate identifying and evaluating candidates via existing online services.

As described above, a talent score of a candidate for a job may be calculated based at least in part on job requirements for the job specified by a recruiter (e.g., an employer, a hiring manager, any person or entity seeking candidates for a job, etc.). Job requirements may be specified in different ways, and the inventors have appreciated that some ways of specifying job requirements may be more convenient for recruiters than other ways. Accordingly, some embodiments provide for different ways for recruiters to specify job requirements. For example, in some embodiments, a recruiter may specify job requirements using a graphical user interface. As another example, in some embodiments, a recruiter may specify job requirements using natural language input comprising a job description. As yet another example, in some embodiments, a recruiter may specify job requirements by identifying an individual the recruiter believes is suitable for the job. Regardless of the manner in which job requirements are specified, the job requirements may then be used to generate one or more representations of the job requirements, which in turn may be used for calculating talent scores of one or more candidates for the job.

It should be appreciated that while job requirements may indicate one or more credentials that a candidate for a job must possess to be considered for the job, job requirements are not limited to specifying required credentials and, in some instances, may not specify any required credentials. In some embodiments, job requirements may indicate one or more credentials that a candidate is preferred to have, but not necessarily required to have. Job requirements may also indicate one or more credentials that a candidate is preferred to not have. For example, job requirements for a particular job may indicate that a candidate is preferred to have a master's degree, but not just a bachelor's degree. In some embodiments, job requirements may specify, for a preferred credential, information indicating a strength of the preference. Such information may be of any suitable type such as, for example, a numerical value indicating the strength of the preference (e.g., the larger the value, the stronger the preference).

Figure 14:
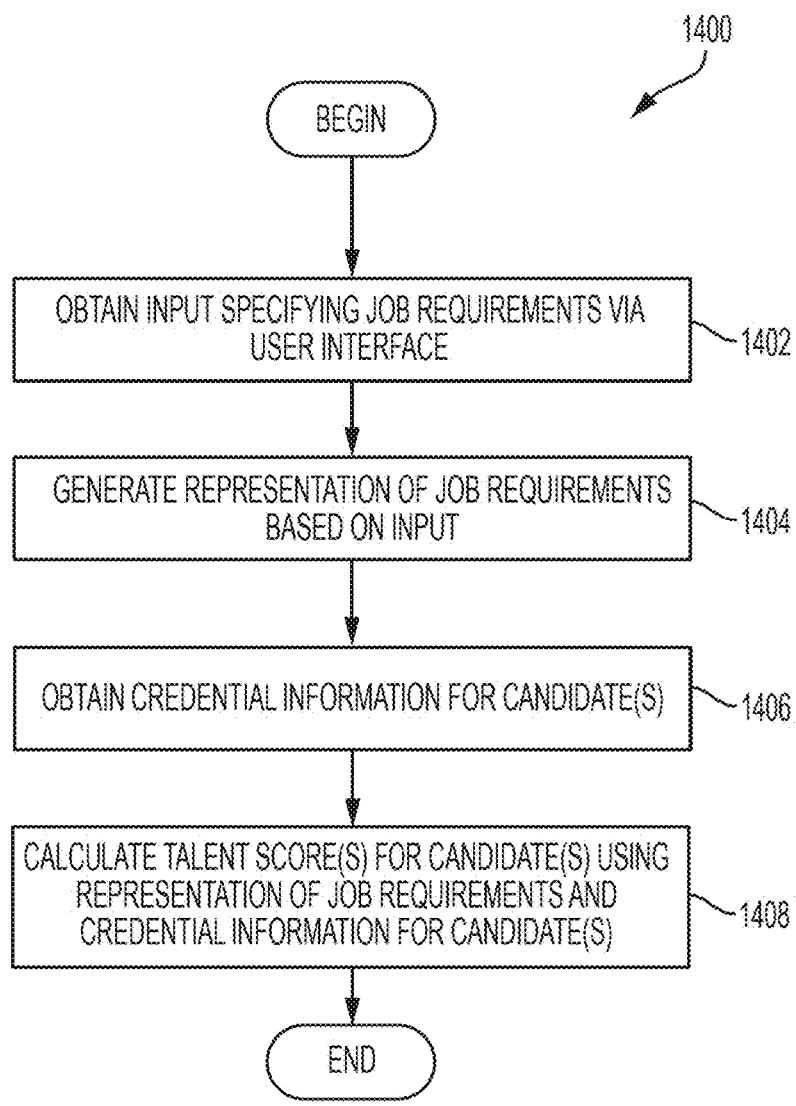
FIG. 14 is a flow chart of an illustrative process for calculating a talent score for calculating talent score(s) of one or more candidates for a job based on input specifying job requirements, in accordance with some embodiments.

FIG. 14 is a flow chart of an illustrative process 1400 for calculating talent score(s) of one or more candidates for a job based on input specifying job requirements provided via a graphical user interface. Illustrative process 1400 may be performed by any talent scoring system and, for example, may be performed by example talent scoring systems 1112 or 112 described herein. Process 1400 is described in more detail below with reference to FIG. 15 which shows an illustrative graphical user interface 1500 a recruiter may use for specifying job requirements.

Process 1400 begins at act 1402, where input specifying job requirements is obtained via a user interface. The input may be provided via the user interface by a recruiter seeking candidates for a job and/or by any other suitable person or entity seeking candidates for a job, as aspects of this technology are not limited in this respect. The job requirements input via the user interface at act 1402 may be collectively referred to as a job specification (or a "Job Spec"). Job requirements constituting a job specification need not be input via a user interface, as described with reference to FIGS. 14 and 15, and may be provided in other ways such as those described with reference to FIGS. 16 and 17 below, for example.

The input obtained at act 1402 may be obtained via any suitable type of user interface including, but not limited to, a graphical user interface (GUI), a voice interface, a text-based interface, or any suitable combination thereof. The user interface may be designed to be user-friendly and intuitive. In this respect, the user interface may be designed to assist the recruiter to specify job requirements by allowing input to be auto-completed and/or by providing a small set of discrete inputs to select from in order to specify input. The user interface may require that some are provided when specifying job requirements (e.g., job name, preferred education level of candidates for the job), whereas other inputs may be optional (e.g., a list of skills a candidate is preferred to have). In embodiments where a graphical user interface is employed, the GUI may include any suitable types of GUI elements (e.g., one or more fields, one or more check boxes, one or more drop down menus, one or more radio buttons, etc.), as aspects of the technology described herein are not limited in this respect.

The user interface may allow a recruiter to input any of numerous types of information to specify job requirements. The user interface may allow the recruiter to specify job requirements related to a candidate's academic credentials (examples of academic credentials are provided herein). Additionally or alternatively, the user interface may allow the recruiter to specify job requirements related to a candidate's professional credentials (examples of professional credentials are provided herein). It should be appreciated, however, that the user interface is not limited to allowing the recruiter to specify job requirements related to a candidate's academic and/or professional credentials, and may allow the recruiter to specify job requirements related to any suitable credentials of a candidate (e.g., publication credentials, language credentials, awards and honors credentials, computer literacy credentials, etc.).

In some embodiments, the user interface may allow the recruiter to specify preferences for the highest degree or degrees that a candidate has attained. For example, the user interface may allow the recruiter to specify that it is preferred that a particular type of degree is (and, optionally, that another type of degree is not) the highest degree that the candidate has attained. For example, as illustrated in FIG. 15, the user interface 1500 allows a recruiter to specify degree preferences by specifying, for each of three types of degrees (i.e., Bachelors, Masters, and PhD) whether the recruiter prefers that the degree is the highest degree a candidate has attained (e.g., by selecting the "I like" radio button), whether the recruiter does not prefer that the degree is the highest degree a candidate has attained (e.g., by selecting the "I don't like" radio button), or whether the recruiter has no preference either way that the degree is the highest degree is the highest degree a candidate has attained (e.g., by selecting the "Neutral" radio button). In some embodiments, the user interface may require that preferences for the highest degree(s) that a candidate has attained be specified.

In some embodiments, the user interface may allow a recruiter to specify a school or a type of school that a candidate is required to have attended (e.g., the candidate must have attended an Ivy League school). As another example, the user interface may allow the recruiter to specify one or more schools that a candidate is preferred to have attended. As yet another example, the user interface may allow the recruiter may specify one or more schools that exemplify that type of school or schools that the recruiter prefers a candidate to have attended (e.g., the candidate is preferred to have attended schools like Amherst College, Williams College, and Dartmouth College). For example, as illustrated in the GUI 1500 of FIG. 15, the user interface may comprise a field via which a recruiter may provide input comprising examples of one or more schools that indicate the type of education the recruiter prefers candidates to have received.

In some embodiments, the user interface may allow a recruiter to specify one or more primary fields of study (e.g., university majors) that a candidate is preferred to have. The recruiter may specify one or more fields of study by inputting a list of one or more specific fields (e.g., "Computer Science," "Electrical Engineering," "Mathematics," etc.) and/or by inputting information indicating a group of fields (e.g., "Engineering," "Pure Science," etc.). The user interface may assist the user to input specific fields and/or to specify one or more groups of fields by providing the user a list of fields to choose from and/or by providing autocomplete functionality. Additionally, the user interface may allow the recruiter to specify one or more secondary fields of study (e.g., university minors, secondary degrees, etc.) that a candidate is preferred to have. For example, a recruiter may specify that candidates with a Computer Science major and Mathematics minor are preferred.

In some embodiments, the user interface may allow a recruiter to specify one or more skills a candidate for the job is required to and/or preferred to have. The user interface may allow a recruiter to input a list of required and/or preferred skills. Such a list may be specified in any suitable way and, for example, may be specified using logical operands (e.g., "OR", "AND", "NOT", etc.). For example, a recruiter may specify that the candidate is required to have ("Machine Learning" OR "Data Mining") AND ("Python" OR "Java") skills and is preferred to have "SQL" skills.

In some embodiments, the user interface may allow a recruiter to specify one or more employers and/or types of employers that the candidate is preferred to have been previously employed by. Additionally, the user interface may allow a recruiter to specify an amount of professional/working experience the candidate to have in a field related to the job. For example, as shown in FIG. 15, the recruiter may specify a range of time (e.g., in months, years, etc.) in which the amount of experience a candidate has is preferred to (or required to) fall.

In some embodiments, the user interface may allow the recruiter to provide input indicating the relative importance, to the recruiter, of the candidate's professional and academic credentials. For example, the user interface may allow the recruiter to specify whether: (A) a candidate's academic credentials are more important than the candidate's professional credentials; (B) the candidate's academic and profession credentials are equally important; or (C) the candidate's professional credentials are more important than the candidate's academic credentials.

The above examples of input that a recruiter may provide via a user interface to specify job requirements are illustrative and it should be appreciated that other input specifying job requirements may be provided in addition to or instead of the above-described types of input. Once input is provided at act 1402, the input may be stored (e.g., by the system executing process 1400) in any suitable way using any suitable data structure(s), as aspects of the technology described herein are not limited in this respect.

Next, process 1400 proceeds to act 1404, where a representation of the job requirements is generated based on the input received at act 1402. The representation of job requirements generated at act 1404 may be used in conjunction with a candidate's credentials to calculate a talent score for the candidate. In some embodiments, generating the representation of job requirements at act 1404 may comprise generating credential value preferences for the job, the credential value preferences specifying at least one preferred value for at least one credential a candidate for a job is preferred to have. Examples of credential value preferences have been provided above.

In some embodiments, generating the representation of job requirements comprises calculating: (1) one or more parameter values for use in calculating credential scores for a candidate's credentials; and (2) one or more parameter values used to calculate the candidate's talent score based on the candidate's credential scores. For example, generating the representation of job requirements may comprise calculating parameter values for use in calculating credential scores for a candidate's academic credentials, professional credentials, skills credentials, etc., as well as parameter values used to combine these different credential scores into a single talent score for the candidate. At least some of the parameter values may be calculated based, at least in part, on input received at act 1402.

As discussed above, a talent scoring system may calculate a credential score for a candidate's credential (of any suitable type) by first calculating a credential value for the credential (the value indicating "quality" or "worth" of the credential to a prospective employer) and subsequently converting the calculated credential value to a corresponding credential score. The credential value may be converted to a credential score by using a function represented by one or more parameter values derived from job requirements specified by a recruiter. In this way, each of the candidate's credentials may be scored in accordance with whether a recruiter would find the credential valuable for the job. Accordingly, in some embodiments, generating one or more parameters values for use in calculating credential scores for a candidate's credentials may comprise generating parameter values used for converting credential values to corresponding credential scores.

In some embodiments, generating the representation of job requirements comprises calculating one or more parameter values for use in calculating credential scores for the candidate's academic credentials. Generating the representation of job requirements may comprise calculating parameter value(s) for use in converting credential values for the candidate's academic credentials into corresponding credential values. The credential value for a candidate's academic credential may be calculated by a talent scoring system in any of the ways described herein.

In some embodiments, a talent scoring system may convert an academic credential value to a corresponding credential score by using a function to map academic credential values to corresponding credential scores. In some embodiments, the function (e.g., f: credential values→credential scores) may be a discretized function (e.g., piecewise constant, piecewise linear, etc.) represented by one or more parameters including, but not limited to, parameters specifying the position of the peak of the function (e.g., parameter $x_{peak}$ representing a credential value associated with the largest credential score, which is represented by parameter $y_{peak}$, such that $f(x_{peak})=y_{peak}$), a parameter representing a width of the peak, parameters representing left and right slopes of the function on either side of the peak, parameters representing smoothness of the sloping regions to the left and right of the peak, and parameters representing the left and right zero crossings of the function outside of which the function takes on the value of 0.

Parameter values for at least some of the above-described parameters of the function may be calculated based, at least in part, on input obtained at act 1402. Other parameters may be assigned default values. For example, the parameters specifying the peak of the function may be calculated based, at least in part, on input specifying one or more schools (e.g., Stanford and UCLA) that exemplify the school(s) the recruiter prefers a candidate to have attended. The talent scoring system may obtain a ranking for each of the specified schools (e.g., 2 and 10), calculate an average ranking of the schools (e.g., 6), and calculate the peak credential value ($x_{peak}$) to t be associated with the largest credential score based on the average ranking (e.g., by calculating a credential value for a student having a GPA in the top 25% of his class at a university having the average ranking) The value of the corresponding credential score ($y_{peak}$) may be set to a default value (e.g., 1.0) or calculated in any other suitable way.

In some embodiments, the parameter values specifying the peak of the function may be calculated further based on input specifying one or more employers a candidate is preferred to have been employed by. In such embodiments, the talent scoring system may assign to each such employer a number (representing "a ranking" of that employer so that the value of being employed by the employer may be compared with the value of attending particular schools) that may be averaged together with school rankings so that the preferred employer and school information can be used to calculate the peak credential value. For example, if a recruiter prefers a candidate to have attended Stanford and UCLA (e.g., ranked 2 and 10, respectively) and have been employed by Amazon (e.g., assigned a rank of 21), the resulting average ranking (e.g., 11) may then be used to calculate the peak credential value ($x_{peak}$). An employer may be assigned a ranking in any suitable way, as aspects of the technology described herein are not limited in this respect.

As another example, the parameter value specifying the width of the peak may be calculated based on input specifying one or more schools that exemplify the school(s) the recruiter prefers a candidate to have attended (e.g., Stanford and UCLA) and/or the employer(s) the candidate is preferred to have been employed by. For example, the width of the peak may be calculated based on the standard deviation (or any other suitable statistical measure of variation) of the ranks of the preferred schools and/or employers.

In some embodiments, a candidate may have multiple academic credentials and a talent scoring system may calculate a credential value for each of one or more of these academic credentials using the parameter values calculated at act 1404. For example, a candidate may have multiple degrees from one or more universities and the talent scoring system may calculate a credential value for each of these degrees. In turn, the mapping from academic credential values to corresponding credential scores (which mapping depends on input provided at act 1402 as described above) may be used to calculate a credential score for each of these degrees based on their respective credential values. For example, when a candidate has a Bachelor's degree, a Master's degree, and a PhD, a separate credential score may be calculated for each of these degrees.

In some embodiments, generating the representation of job requirements may comprise obtaining a degree preference value for each of one or more types of degrees so that the degree preference values are indicative of the recruiter's preferences for the highest degree attained by a candidate for a job. In turn, the degree preference values may be used to adjust the corresponding academic credential scores, for example, by multiplying the credential scores by the corresponding degree preference values to weight the score in proportion with the recruiter's preferences. In this way, a credential score for a particular degree (e.g., Bachelor's degree from Harvard) that the recruiter does not prefer to be the highest degree a candidate has attained may be discounted (e.g., the recruiter is seeking PhD-level candidates), even if the credential score is high, so that the particular degree has a smaller impact on the overall talent score. The degree preference values may be obtained based, at least in part, on input obtained at act 1402 that specifies the recruiter's degree preferences. For example, a large value (e.g., 1.0) may be assigned to the degree that the recruiter prefers to be the highest degree a candidate has attained (e.g., by selecting the "I like" radio button, as shown in FIG. 15), a smaller value (e.g., 0.9) may be assigned to the degree that the recruiter does not prefer to be the highest degree a candidate has attained (e.g., by selecting the "Neutral" radio button, as shown in FIG. 15), and middle value (e.g., 0.975) may be assigned to the degree for which the recruiter has no preference either way (e.g., by selecting the "Neutral" radio button, as shown in FIG. 15).

In some embodiments, generating the representation of job requirements may comprise obtaining a field of study preference value for each of one or more fields of study. In turn, a preference value for a particular field of study may be used to adjust an academic credential score for a degree obtained in that particular field of study (e.g., by multiplicatively weighting the academic credential score). The field of study preference values may be obtained based at least in part on input obtained at act 1402. For example, a large value (e.g., 1.0) may be assigned to a field of study that a recruiter indicated that to be a primary field of study that candidates are preferred to have (e.g., a major in Computer Science), and a smaller value be assigned to a field of study that the recruiter indicated to be a secondary field of study that candidates are preferred to have (e.g., a minor in Mathematics).

In some embodiments, a preference value for a particular field of study not identified in the input obtained at act 1402 may be obtained further based on the credential graph described herein. This may be done in any suitable way. For example, a preference for a field of study B not specified in the input obtained at act 1402 may be calculated based on the preference value for field of study A that was specified in the input obtained at act 1402 and the weight associated with an edge between fields of study A and B in the credentials graph. As an illustrative example, the input obtained at act 1402 may specify that Computer Science is a primary field of study (so that a weight of 0.9 is assigned for example), but may not specify Electrical Engineering. However, if the weight of an edge connecting nodes in the credentials graph representing "Computer Science" and "Electrical Engineering" is 0.80, the field of study preference value for "Engineering" may be calculated according to 0.9*0.8=0.72.

In some embodiments, generating the representation of job requirements comprises calculating one or more parameter values for use in calculating credential scores for the candidate's professional credentials (e.g., calculating a credential score for the credential of having worked at a particular employer). As in the case of academic credentials, a talent scoring system may be configured to calculate values of professional credentials (indicating their "quality" or "worth" to a prospective employer) and convert the professional credential values to corresponding credential scores by using a function to map professional credential values to corresponding credential scores. This function may be parameterized by the same types of parameters as those parameterizing the function used to map academic credential values to corresponding scores. However, these parameters may take on different values. The parameter values of the function mapping professional credential values to corresponding scores may be calculated based at least in part on input obtained at act 1402. This may be done in any suitable way including in the way described above in connection with the function for mapping academic credential values to corresponding credential scores.

In some embodiments, generating the representation of job requirements comprises calculating one or more parameter values for use in calculating credential scores for a candidate's skills (e.g., Machine Learning, Java, etc.). As in the case of academic and professional credentials, a talent scoring system may be configured to calculate respective values of skill credentials (indicating their "quality" or "worth" to a prospective employer) and convert these skill credential values to corresponding credential scores. The skill credential value for a particular skill may be converted to a corresponding skill credential score based on a mapping that depends at least in part on input provided at act 1402. Different mappings may be used for calculating credential scores for different skills. For example, in some embodiments, the mapping for converting a credential value of a particular skill to a corresponding credential score may depend on a parameter whose value indicates the importance of that particular skill to the employer. For example, the mapping may be an "S"-shaped curve from (0, 1−x) to (1, 1) for a parameter value of x. The parameter value may be obtained based, at least in part, on input received at act 1402. For example, the parameter value for a skill indicated by a recruiter to be required (e.g., "Machine Learning") may be set to have a higher numerical value (e.g., 1.0) than the corresponding numerical value (e.g., 0.5) for a skill indicated by the recruiter to be preferred, but not required (e.g., proficiency in 'SQL').

As described above, generating a representation of a job description at act 1404 may further comprise calculating one or more parameter values used to calculate a candidate's talent score based the candidate's credential scores. For example, generating a representation of the job description may comprise calculating parameter values used to combine one or more academic credential scores, one or more professional credentials scores, and one or more skills scores to obtain a candidate's talent score. These parameters values may be calculated based, at least in part, on one or more inputs provided by the input obtained at act 1402. For example, input indicating the relative importance of academic and professional credentials may be used to combine academic credential scores with one or more professional credentials scores. As another example, input indicating relative importance of different types of degrees may be used to combine academic credential scores calculated for different degrees (e.g., to combine academic scores obtained for undergraduate and graduate degrees). As yet another example, input indicating the relative of importance of academic and professional credentials and input indicating a number of years of experience a candidate is preferred to have may be used to combine skill credential scores with one or more other types of scores (e.g., academic credential scores and professional credential scores).

As one illustrative example, in some embodiments, a talent score may be calculated according to:

Talent Score=$\tau$*Primary Score+(1−$\tau$)*Secondary Score;

Primary Score=$\alpha$*Education Score+(1×$\alpha$)*Employment Score;

Education Score=$\beta$*Bachelor's Score+(1−$\beta$)*Graduate Score; and

Graduate Score=$\gamma$*Master's Score+(1×$\gamma$)*PhD Score, where "Bachelor's Score," "Master's Score," and "PhD Score" are academic credential scores calculated for each one of three degrees of a candidate, "Employment Score" is a professional credentials score calculated based on one or more of the candidate's professional credentials, "Secondary Score" is a skill credentials score calculated based on one or more of the candidate's skill credentials, and the parameters $\alpha$, $\beta$, $\gamma$, and $\tau$ are parameters (each taking values in the closed interval [0,1]) whose values may be calculated based, at least in part, on input provided at act 1402 or which may be set to default values (e.g., in absence of certain input at act 1402). For example, the parameters $\beta$ and $\gamma$ may be set based on input indicating relative importance of different types of degrees to the recruiter. As another example, the parameter $\alpha$ may be calculated based on input indicating the relative importance of academic and professional credentials. As yet another example, the parameter $\tau$ may be calculated based the relative of importance of academic and professional credentials and input indicating a number of years of experience a candidate is preferred to have. This may be done in any suitable way. For example, the secondary score may be more heavily weighted (e.g., $\tau$ may be smaller) when more years of experience are desired and/or when professional credentials are indicated to be more important than academic credentials.

After a representation of the job description is generated at act 1404, process 1400 proceeds to act 1406 where credential information for one or more candidates is obtained. This may be done in any suitable way, as described herein.

Next, process 1400 proceeds to act 1408, where talent score(s) are calculated for the one or more candidates by using their credential information (obtained at act 1406) and the representation of the job requirements generated at act 1404. This may be done in any of the ways described herein. For example, in some embodiments, a talent score for a candidate may be calculated by: (1) calculating a credential value for each of one or more of the candidate's credentials; (2) calculating a corresponding credential score for each calculated credential value by using the representation of job requirements generated act 1404 (e.g., by using one or more mappings from credential values to credential scores, which are parameterized by one or more parameter values generated as part of generating the representation of job requirements, as described above); (3) calculating the talent score based on the calculated credential scores (e.g., by combining the calculated credential scores using one or more parameter values generated as part of generating the representation of job requirements, as described above). After talent score(s) are calculated at act 1408, process 1400 completes.

It should be appreciated that process 1400 is illustrative and that variations of process 1400 are possible. For example, in the illustrated embodiment, a recruiter may provide, via a user interface, various inputs specifying job requirements such as preferred schools, skills, fields of study, and other inputs, as described with reference to act 1402. In other embodiments, a recruiter may specify job requirements in other ways. For example, as described below with reference to FIG. 16, a recruiter may specify requirements for a job by identifying an individual the recruiter believes to be qualified for the job such that the job requirements may be inferred from that individual's credentials. A representation of the job requirements may then be generated based on the inferred information. As another example, as described below with reference to FIG. 17, a recruiter may provide natural language input specifying job requirements instead of providing multiple inputs separately via a user interface (e.g., via multiple different elements in a graphical user interface such as fields, check boxes, radio boxes, buttons, etc.). A representation of job requirements may then be generated based on information about the job requirements obtained from the natural language input by applying natural language processing techniques.

Figure 16:
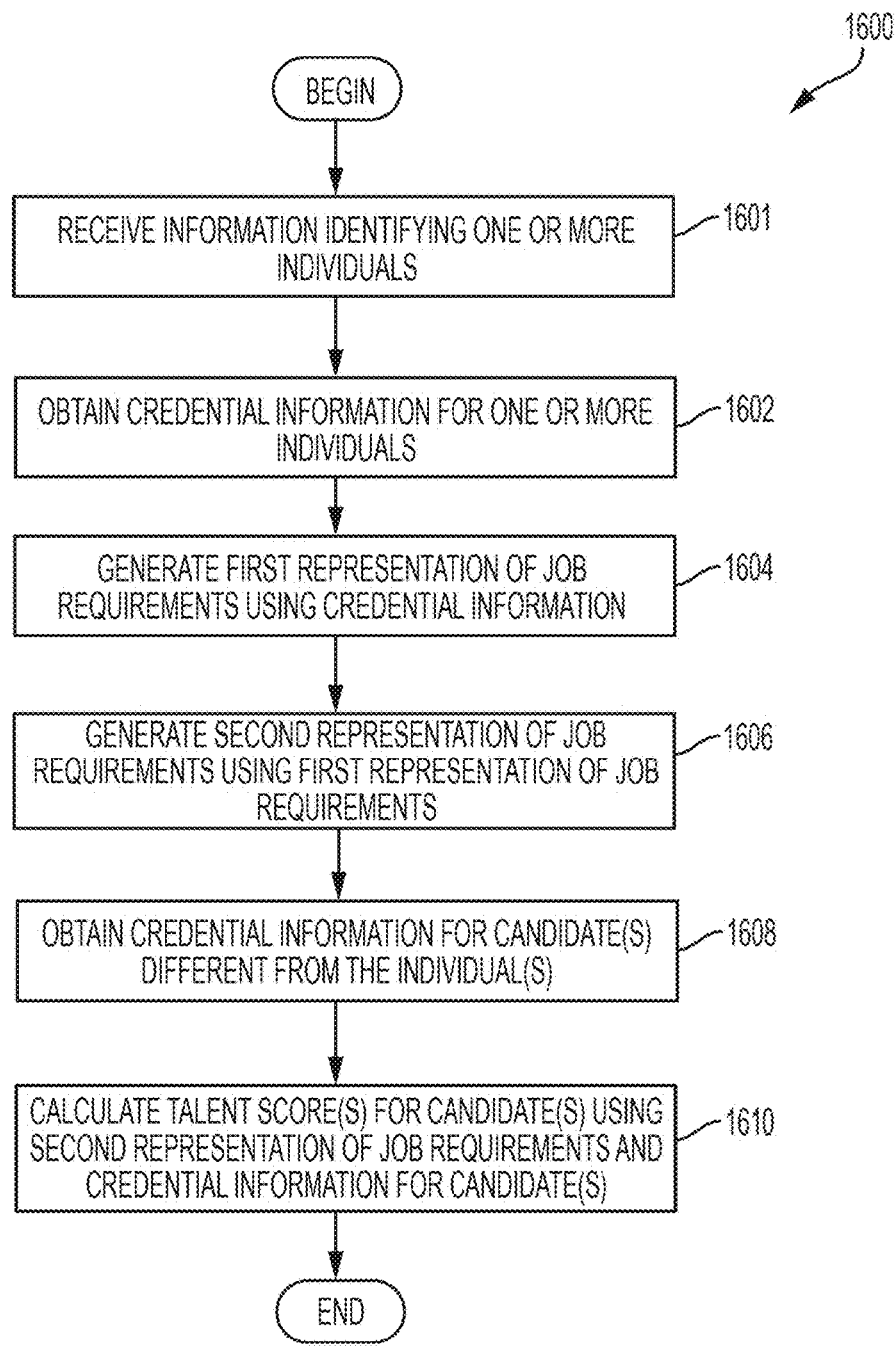
FIG. 16 is a flow chart of an illustrative process for identifying job requirements based on credentials of one or more individuals and calculating talent scores for candidates using the identified job requirements, in accordance with some embodiments.

FIG. 16 is a flow chart of an illustrative process 1600 for identifying job requirements based on credentials of one or more individuals and calculating talent scores for candidates using the identified job requirements, in accordance with some embodiments. Illustrative process 1600 may be performed by any talent scoring system and, for example, may be performed by example talent scoring systems 1112 or 112 described herein.

Process 1600 begins at act 1601, where the talent scoring system executing process 1600 may receive information identifying one or multiple individuals. The individuals may be identified by a recruiter as individuals suitable for a job for which the recruiter is seeking candidates. The recruiter may specify an individual as suitable for job because the recruiter believes that candidates who have similar credentials to that of the individual would perform well at the job for which the recruiter is hiring. For example, the recruiter may specify an individual presently employed or who has been employed at a same or a similar type of job to the job for which the recruiter is hiring because, based on that individual's performance at his/her job, the recruiter believes that candidates having similar credentials to those of the individual would also perform well at the job. In this way, the recruiter may identify one or more individuals who excel at their job(s) (e.g., one or more "superstar" employees) so that their credentials can be used to specify job requirements for the job in order to find candidates with similar credentials to those of the identified individuals.

In some embodiments, information identifying an individual may comprise any suitable information that allows the talent scoring system to access credential information for the individual. For example, information identifying an individual may comprise an identifier of an online professional profile (e.g., LinkedIn® profile, Monster® profile, etc.) of the individual. An identifier of an online professional profile may comprise a URL to the profile and/or any other suitable information using which the talent scoring system may use to access the online professional profile (e.g., the name of the individual, the name of an online portal hosting the individual's online professional profile, an ID number identifying the profile, and/or any other suitable information that may be used to access the online professional profile). As another example, information identifying an individual may comprise information providing access to credential information for the individual via one or more computers and/or networks operated by or on behalf of the individual's employer. For instance, an employer may be seeking candidates similar to a current employee and may provide the talent scoring system with access to internal information about the current employee including the employee's credentials. As yet another example, information identifying an individual may comprise credential information for the individual. A recruiter may provide information identifying any suitable number of individuals (e.g., 1, 2, 3, 4, 5, 5-10, 10-25, 25-50 individuals, etc.), as aspects of the technology described herein are not limited in this respect.

Next, process 1600 proceeds to act 1602, where the information received at act 1601 may be used to obtain (e.g., access) credential information for each of the identified individuals. In some embodiments, the talent scoring system may obtain credential information for an individual identified at act 1601 by obtaining the information in the online professional profile of the individual (e.g., the individual's LinkedIn® profile, Monster® profile, etc.). In some embodiments, the talent scoring system may obtain credential information for an individual identified at act 1601 via one or more computers and/or networks operated by or on behalf of the individual's employer. In some embodiments, the information identifying the individual may comprise credential information for an individual and so that no further by the talent scoring system action is needed to obtain the credential information from an external source. The above examples of ways that a talent scoring system may obtain credential information for one or more individuals identified at act 1601 are not-limiting, as a talent scoring system may obtain credential information for an individual in any suitable way.

Next, process 1600 proceeds to act 1604, where a first representation of job requirements is generated using credential information for one or more individuals obtained at act 1602. The first representation of job requirements may be embodied using one or more data structures of any suitable type. The data structure(s) embodying the first representation of job requirements may be encoded (e.g., instantiated) in a non-transitory tangible computer readable storage medium (e.g., a computer memory such as random access memory).

The first representation of job requirements may be generated by processing the credential information to obtain one or more job requirements that a recruiter could provide via a user interface (e.g., the user interface described with reference to act 1402 of process 1400 and FIG. 15) such as job requirements related to academic credentials, professional credentials, and/or any other suitable types of credentials examples of which are provided herein. For example, the first representation of job requirements may be generated by processing the credential information obtained at act 1602 to identify job requirements for the job including, but not limited to, preferences for the highest degree(s) that a candidate for the job is preferred to have attained, school (s) exemplifying the type of school a candidate for the job is preferred to have attended, one or more primary fields of study, one or more secondary fields of study, one or more skills a candidate for the job is required and/or preferred to have, one or more employers that the candidate is preferred to have been previously employed by, relative importance of the candidate's professional and academic credentials. Examples of these requirements were provided above with reference to FIGS. 14 and 15.

The first representation of job requirements may be obtained based on the credential information of the identified individual(s) in any of numerous ways. For example, the first representation of job requirements may comprise preferences for the highest degree(s) that a candidate for a job is preferred to have attained, which may be obtained based on the highest degree(s) attained by the individual(s) identified at act 1602. As a specific example, if the individual or majority of the individuals identified at act 1601 have a PhD, then a PhD may be identified as the highest degree that a candidate for a job is preferred to have.

As another example, the first representation of job requirements may comprise information identifying school (s) exemplifying the type of school a candidate for the job is preferred to have attended, which may be obtained based on the school(s) attended by the individual(s) identified at act 1601. As a specific example, at least some or all of the school(s) attended by the individual(s) identified at act 1601 may be identified as school(s) exemplifying the type of school a candidate for a job is preferred to have attended.

As yet another example, the first representation of job requirements may comprise information indicating one or more primary and/or secondary fields of study, which may be obtained based on the primary and secondary fields of study of the individual(s) identified at act 1601. As a specific example, at least some or all of the primary and/or secondary fields of study of the individual(s) identified at act 1601 may be identified as the primary and/or secondary fields of study a candidate for a job is preferred to have.

As yet another example, the first representation of job requirements may comprise information identifying one or more employers that a candidate for the job is preferred to have been employed by, which may be obtained based on the present and/or past employer(s) of the individual(s) identified at act 1601. As a specific example, at least some or all of the employer(s) (past and/or present) of the individual(s) identified at act 1601 may be identified as employer(s) that a candidate for the job is preferred to have been employed by.

As yet another example, the first representation of job requirements may comprise information identifying a number of years (and/or months) of experience that a candidate for the job is preferred to have, which may be obtained based on the years of experience of the individual(s) identified at act 1601. As a specific example, a range of years of experience (e.g., 5-10 years) may be identified such that the range includes the respective years of experience the individual(s) identified at act 1601 have (e.g., individual A having 5 years of experience, individual B having 7 years of experience, and individual C having 10 years of experience). As another example, a number of years of experience may be identified based on the respective years of experience the individual(s) identified at act 1601 have (e.g., as an average).

As yet another example, the first representation of job requirements may comprise information identifying one or more skills that a candidate for the job is required or preferred to have, which may be obtained based on the skills of the individual(s) identified at act 1601. As a specific example, at least some or all of the skills of the individual(s) identified at act 1601 may be identified as skills that a candidate for the job is required or preferred to have. In some embodiments, credential information for the individual(s) may comprise one or more endorsements of the candidate's skills (e.g., an individual's LinkedIn® online professional profile may comprise one or more endorsements of one or more of the candidate's skills), and the endorsements may be used to identify skills that a candidate for the job is required or preferred to have. For instance, skills for which one or more of the individuals have been endorsed for at least a threshold number of times may be identified as skills that a candidate for a job is required to or preferred to have.

As yet another example, the first representation of job requirements may comprise information indicating relative importance of the candidate's professional and academic credentials. Although this information may not be explicitly specified in the credential information of individual(s) identified at act 1601, the relative importance may be inferred or estimated based on the credential information of these individual(s) by calculating a talent score for each these individual(s) for each potential value of the relative importance parameter and selecting the value for the relative importance parameter that produces the largest talent score (s). Accordingly, the relative importance parameter may be set in a way that maximizes the talent scores of the individuals whose credentials are used to generate the first representation of job requirements. In this way, the relative importance parameter may be set in a way that is consistent with the credentials of the identified individuals, even if it is not directly specified by them.

Next, process 1600 proceeds to act 1606, where a second representation of job requirements is generated based, at least in part, on the first representation of job requirements. In turn, the second representation of job requirements may be used in conjunction with a candidate's credentials to calculate a talent score for the candidate.

In some embodiments, the second representation of job requirements generated at act 1606 of process 1600 may be a same type of representation as the representation of job requirements generated at act 1404 of process 1400. Accordingly, in some embodiments, generating the second representation of job requirements comprises calculating: (1) one or more parameter values for use in calculating credential scores for a candidate's credentials; and (2) one or more parameter values used to calculate the candidate's talent score based on the candidate's credential scores. Examples of such parameters are described above with reference to act 1404 of process 1400. At least some of the parameter values may be calculated based, at least in part, on information in the first representation of job requirements obtained at act 1604. Examples of calculating parameter values based on information in the first representation of job requirements are described with reference to act 1404 of process 1400.

Next, process 1600 proceeds to act 1608, where credential information is obtained for one or more candidates different from the individual(s) identified at act 1601. This may be done in any suitable way, as described herein.

Next, process 1600 proceeds to act 1610, where talent score(s) are calculated for the one or more candidates by using their credential information (obtained at act 1608) and the second representation of the job requirements generated at act 1606. This may be done in any of the ways described herein. For example, in some embodiments, a talent score for a candidate may be calculated by: (1) calculating a credential value for each of one or more of the candidate's credentials; (2) calculating a corresponding credential score for each calculated credential value by using the second representation of job requirements generated act 1606 (e.g., by using one or more mappings from credential values to credential scores, which are parameterized by one or more parameter values generated as part of generating the representation of job requirements, as described above); (3) calculating the talent score based on the calculated credential scores (e.g., by combining the calculated credential scores using one or more parameter values generated as part of generating the representation of job requirements, as described above). After talent score(s) are calculated at act 1610, process 1600 completes.

As discussed above, in some embodiments recruiters may specify job requirements by providing a natural language job description. This description may be processed by a talent scoring system to generate one or more internal representations of the job requirements, which in turn may be used to score one or more candidates for the based on their respective credentials.

Figure 17:
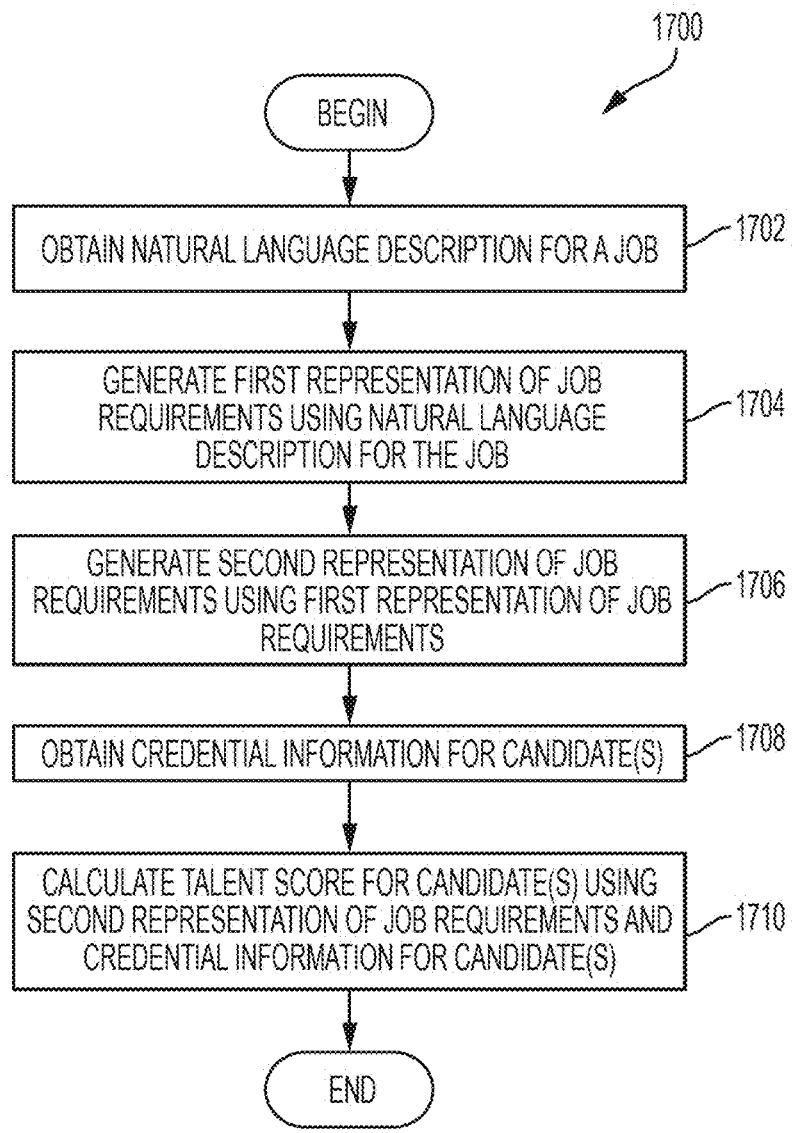
FIG. 17 is a flow chart of an illustrative process for automatically processing natural language input comprising a job description for a job to generate at least one representation of job requirements, in accordance with some embodiments.

FIG. 17 is a flow chart of an illustrative process 1700 for automatically processing natural language input comprising a job description for a job to generate at least one representation of job requirements for the job. In some embodiments, illustrative process 1700 may be performed by any talent scoring system and, for example, may be performed by example talent scoring systems 1112 or 112 described herein.

Process 1700 begins at act 1702, where natural language description of a job is obtained. In some embodiments, the natural language description may comprise one or phrases related to the job. For example, a natural language description of a job offered by an employer may comprise one or more phrases about the employer, one or more phrases about responsibilities associated with the job, one or more phrases about job requirements for the job, and one or more phrases about benefits (e.g., compensation) associated with the job. As used herein, a phrase may comprise one word, a group of more words, a sentence, and/or multiple sentences. A natural language description may be of any suitable length and may comprise any suitable number phrases. Accordingly, a natural language description may comprise any suitable number of words or sentences (e.g., at least one word, at least five words, at least ten words, at least 25 words, 5-100 words, 20-200 words, at least one sentence, 2-5 sentences, 2-10 sentences, one or more paragraphs, etc.), as aspects of the technology described herein are not limited in this respect.

The natural language description of a job may be obtained in any suitable way. For example, the natural language description of a job may be obtained from a recruiter, a job-seeker, and/or any suitable person(s). As another example, the natural language description of a job may be obtained from a website (e.g., Monster®, Indeed®, LinkedIn®, website of a company seeking employees, etc.). It should be appreciated that these examples of where a natural language job description may be obtained are illustrative, and a natural language description of a job may be obtained in any other suitable way.

Next process 1700 proceeds to act 1704, where a first representation of job requirements is generated based, at least in part, on the natural language description of the job received at act 1702.

The first representation of job requirements may be generated by automatically processing the natural language description of the job to obtain one or more job requirements such as job requirements related to academic credentials, professional credentials, and/or any other suitable types of credentials examples of which are provided herein. For example, the first representation of job requirements may be generated by processing the natural language description obtained at act 1702 to identify job requirements for the job including, but not limited to, preferences for the highest degree(s) that a candidate for the job is preferred to have attained, school(s) exemplifying the type of school a candidate for the job is preferred to have attended, one or more primary fields of study, one or more secondary fields of study, one or more skills a candidate for the job is required and/or preferred to have, one or more employers that the candidate is preferred to have been previously employed by, relative importance of the candidate's professional and academic credentials. Examples of these requirements were provided above with reference to FIGS. 14 and 15.

In some embodiments, automatically processing the natural language description of the job may comprising processing the natural language description using one or more natural language processing (NLP) techniques. In some embodiments, automatically processing the natural language description of a job using an NLP technique comprises identifying at least one phrase in the natural language description that indicates one or more credential(s) that a candidate for the job is preferred to or required to have. In turn, each of the identified phrases may be processed further to identify the credential(s) specified by the phrase, an indication of importance of the credential(s) specified by the phrase to the employer offering the job, and/or any other suitable information about the job requirements.

In some embodiments, for example, a natural language job description may comprise a plurality of phrases (e.g., a plurality of sentences), and automatically processing the natural language job description comprises determining, for a phrase in the natural language job description, whether the phrase indicates one or more credentials for the job that a candidate for the job is preferred to or required to have or indicates other information (e.g., one or more responsibilities associated with the job, information about the employer hiring for the job, benefits/compensation associated with the job, etc.). For example, an illustrative natural language job description may comprise the following language:

"Seeking a Data Scientist to work in a fast-paced and exciting environment. MS or PhD in Computer Science, Machine Learning, or similar discipline is required. In lieu of an MS, a BS with 5 years of directly related experience will be considered. Experience with analysis using tools such as MATLAB, R, Python is required. Experience with Java programming preferred. The employer is a nationally-recognized data analytics company. Our clients include Fortune 500 companies. Competitive salary and benefits including employer-matched 401K."

Processing the above natural language job description may comprise determining that the second, third, and fourth sentences indicate one or more credentials that a candidate for the job is preferred to or required to have.

In some embodiments, a statistical classification technique may be used to determine whether a phrase indicates one or more credentials for a job that a candidate for the job is preferred to or required to have. Using a statistical classification technique may comprise using one (or multiple classifiers) to determine whether a phrase indicates one or more credentials for a job. The classifier may be configured to process one or more features derived from a phrase to produce output indicating whether the phrase indicates one or more credentials for a job. The features for the classifier may comprise one or more words in the phrase, information identifying a part of speech that the sentence begins and/or ends with, information indication whether the phrase contains one or more keywords from a list of keywords that are typically present in phrases describing credentials (e.g., "desired," "required," "experience," "BS," "MS," "PhD," etc.), one or more features derived from one or more other (e.g., neighboring) phrases in the natural language job description, and/or any other suitable information derived from the natural language job description. The classifier may be implemented using any suitable statistical classification technique(s) including support vector machine techniques, Gaussian mixture model techniques, Bayesian classification techniques, decision trees techniques, neural network techniques, graphical model techniques, and any suitable combination thereof.

It should be appreciated that aspects of the technology described herein are not limited to using a statistical classification technique to determine whether a phrase indicates one or more credentials for a job that a candidate for the job is preferred to or required to have, and any other suitable technique(s) may be used. For example, in some embodiments, a rule-based technique may be used (instead of or in conjunction with a statistical classification technique) to determine whether a phrase indicates one or more credentials. For instance, phrases that contain one or more keywords from a list of keywords that have been identified as keywords typically present in phrases describing credentials may be identified as phrases that indicate one or more credentials.

In some embodiments, after a phrase has been identified as a phrase that indicates one or more credentials that a candidate for a job is preferred to or required to have, the phrase may be further processed using natural language processing techniques to identify the preferred and/or required credentials. In some embodiments, one or more keyword matching algorithms may be employed to identify particular types of credential preferences/requirements which may be present in the phrase. For example, to identify a highest degree level that a candidate for a job is preferred to have, the phrase may be processed to identify exact or partial matches with strings indicative of a degree type (e.g., such as "B.A," "B.Sc.," "BTech," "MA," MS," "PhD," "MBA," "Bachelors," "Masters," "Associate," "Doctorate," etc.). As another example, to identify a primary and/or secondary field of study a candidate is preferred to or required to have, the phrase may be processed to identify exact or partial matches with strings of names of fields (e.g., "Computer Science," "Electrical Engineering," Mathematics") and/or keywords related to fields (e.g., "Mathematical," "Financial," "Business," etc.). As yet another example, to identify a school(s) that exemplify a type of school a candidate is preferred to have attended, the phrase may be processed to identify exact or partial matches strings indicating a name of a school (e.g., "Massachusetts Institute of Technology," "MIT," "Harvard," "Penn," "UPenn", "Johns Hopkins," "JHU," etc.). The strings may contain an exact name of a school (e.g., "University of Pennsylvania"), an acronym associated with a school (e.g., "MIT"), a nickname for a school (e.g., "Penn"), etc. Other types of job requirements (e.g., skill(s) a candidate is preferred to have, employer(s) a candidate is preferred to have been employed by, etc.) may be obtained using analogous text-processing techniques.

In some embodiments, a default value may be assigned to a job requirement for which a value was not obtained by processing the natural language description (e.g., because the description does not provide or because the employed technique did not identify such a value). For example, if a degree preference was not obtained by processing the natural language description, a default preferred degree may be selected (e.g., based on or independent of other information provided about the job, based on or independent of information available about the type of job, and/or in any other suitable way.) For instance, a natural language description of a "Data Scientist" job may not specify any degree requirements/preference, but the talent scoring system executing process 1700 may have access to information indicating that a majority of people employed as a "Data Scientist" have a PhD. Accordingly, the talent scoring system may determine that the default value for a highest preferred degree is a "PhD." As another example, if a natural language job description does not indicate the relative importance of professional or academic credentials of a candidate, a default value may be provided. For example, if the natural language job description contains more information about required/preferred professional credentials than about academic credentials or if job description indicates at least a threshold number of years (e.g., at least five, at least ten, etc.) of experience, the talent scoring system may determine that a candidate's professional credentials are more important to the recruiter than the candidate's academic credentials.

In some embodiments, after a credential (that a candidate for a job is preferred to or require to have) has been identified in a phrase, an importance of the identified credential to the employer may be determined. An importance of the identified credential may be determined based at least in part on other text in the phrase. For example, the phrase may be processed to determine whether the phrase contains keywords indicative of the importance of the identified credential to the employer (e.g., "desired," "required," "preferred," etc.), or in any other suitable way, as aspects of the technology described herein are not limited in this respect.

It should be appreciated that the above-described NLP techniques are illustrative and any other suitable NLP technique(s) may be used together with or instead of the above-described techniques to process the natural language description of the job to obtain one or more job requirements.

Next, process 1700 proceeds to act 1706, where a second representation of job requirements is generated based, at least in part, on the first representation of job requirements. In some embodiments, the second representation of job requirements generated at act 1706 of process 1700 may be a same type of representation as the representation of job requirements generated at act 1404 of process 1400 and/or act 1606 of process 1600. Accordingly, in some embodiments, generating the second representation of job requirements comprises calculating: (1) one or more parameter values for use in calculating credential scores for a candidate's credentials; and (2) one or more parameter values used to calculate the candidate's talent score based on the candidate's credential scores. Examples of such parameters are described above with reference to act 1404 of process 1400. At least some of the parameter values may be calculated based, at least in part, on information in the first representation of job requirements obtained at act 1704. Examples of calculating parameter values based on information in the first representation of job requirements are described with reference to act 1404 of process 1400.

Next, process 1700 proceeds to act 1708, where credential information is obtained for one or more candidates. This may be done in any suitable way, as described herein.

Next, process 1700 proceeds to act 1710, where talent score(s) are calculated for the one or more candidates by using their credential information (obtained at act 1708) and the second representation of the job requirements generated at act 1706. This may be done in any of the ways described herein. For example, in some embodiments, a talent score for a candidate may be calculated by: (1) calculating a credential value for each of one or more of the candidate's credentials; (2) calculating a corresponding credential score for each calculated credential value by using the second representation of job requirements generated act 1706 (e.g., by using one or more mappings from credential values to credential scores, which are parameterized by one or more parameter values generated as part of generating the representation of job requirements, as described above); (3) calculating the talent score based on the calculated credential scores (e.g., by combining the calculated credential scores using one or more parameter values generated as part of generating the representation of job requirements, as described above). After talent score(s) are calculated at act 1710, process 1700 completes.

In some embodiments, one or more (e.g., all) acts of process 1700 may be performed by an application program executing on a user's computing device (e.g., a "plug-in" application program configured to work with a web browser application program executing on the user's device, such as a mobile device). The application program (e.g., the plug-in application) may be configured to perform one or more acts of process 1700 at least in part by sending information to and/or receiving information from a remote talent scoring system. The application program may also be configured to perform one or more (e.g., all) acts of process 1700 without sending information to and/or receiving information from the remote talent scoring system. The application program may allow a job-seeker to evaluate his/her suitability for one or more jobs. For example, when the job seeker is presented a job description via a browser (e.g., via a website such as Monster, Indeed, LinkedIn, a company website, etc.), a plug-in application may be activated to process the job description to identify job requirements for the job and calculate a talent score for the job seeker based, at least in part, on the identified job requirements. In this way, a job seeker may evaluate himself/herself for any suitable number of jobs whose descriptions the job-seeker may access via a web browser application).

As described above, the inventors have developed automated techniques for processing electronic documents frequently used for resume exchange (e.g., Microsoft Word documents, portable document format (PDF) documents, HTML, XML, etc.) to obtain credentials information encoded therein. This technology may be used for a variety of different applications. For example, using this technology, a talent scoring system may process multiple resumes and calculate talent scores for respective individuals using any of the talent scoring techniques described herein. In this way, talent scores may be quickly computed for all candidates that submit their resumes to a company looking for candidates for a job.

As another example, the resume processing technology described herein may be used to update online profiles (or any other type of profiles) from resumes. In this way, a user's online profile on one or more online services/websites (e.g., Monster®, Indeed®, LinkedIn®, website of a company seeking employees, etc.,) may be automatically updated to reflect the content of the user's resume without the user having to manually enter information about his/her credentials on each such online service/website. Thus, the relatively tedious process of populating a profile associated with an online service, which frequently results in sparse and incomplete profiles, can be avoided by automating the process. As a result, a user can simply upload their resume and the system can automatically produce a populated profile for the user.

Structure of information within resumes varies across resumes such that there is no single way in which information about credentials of a candidate is organized. For example, information about a same set of credentials may be presented in a different order in different resumes. As another example, information about the same type of credential (e.g., academic credentials) may be presented in different formats in different resumes. As yet another example, information about the same type of credential may be presented with different level of detail in different resumes (e.g., one resume may indicate a GPA, while another resume may not).

The inventors have appreciated that, although the organization of information in resumes may vary, many resumes are semi-structured in that they comprise sections (or sections) each having information about credentials of a particular type. For example, a resume for a candidate may comprise at least one section having information about the academic credentials of a candidate, at least one section having information about professional credentials of the candidate, at least one section having information about skills a candidate possesses, at least one section having information about references for the candidate, a section having information about honors/awards for a candidate, etc. Many resumes each have one or more such sections, even if information within these sections is not organized/formatted in the same way across the resumes. Accordingly, some embodiments are directed to processing an electronic document comprising a candidate's resume by identifying sections in the document corresponding to different types of credentials and then applying natural language processing techniques to process the identified sections to identify the credentials contained therein.

Figure 18:
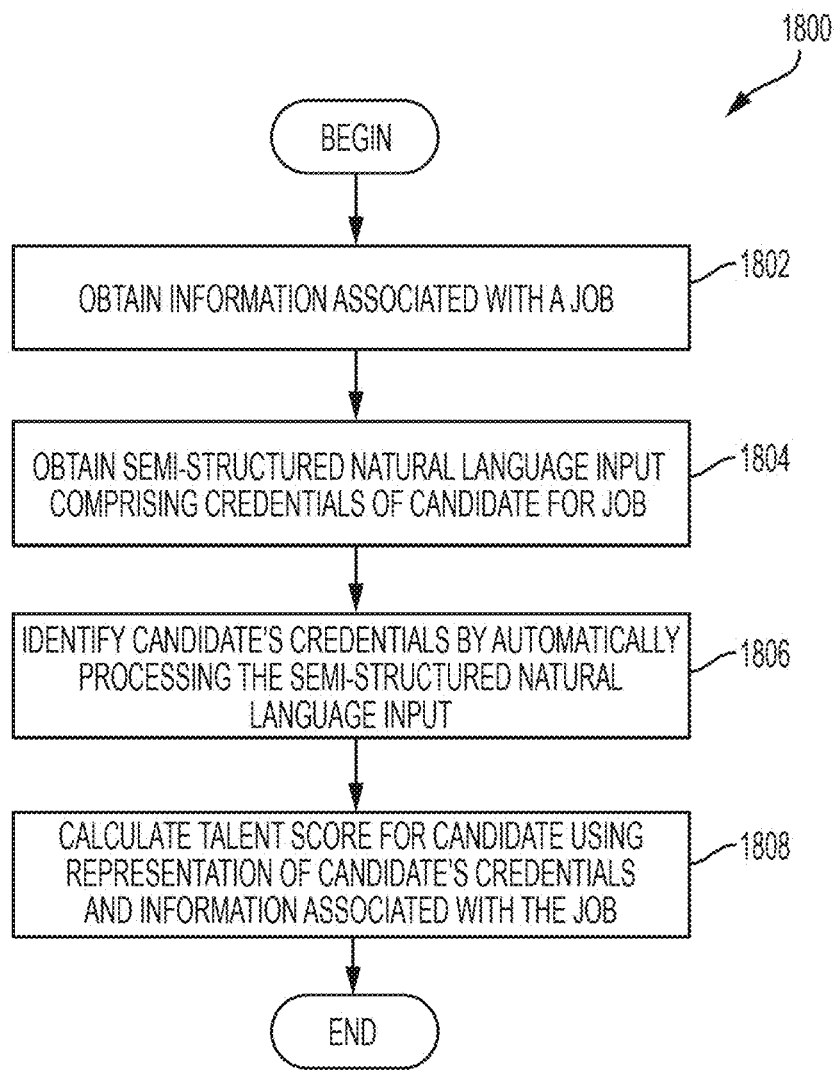
FIG. 18 is a flow chart of an illustrative process for calculating a talent score for a candidate at least in part by automatically processing semi-structured natural language input comprising the candidate's credentials, in accordance with some embodiments.

FIG. 18 is a flow chart of an illustrative process 1800 for calculating a talent score for a candidate at least in part by automatically processing semi-structured natural language input comprising the candidate's credentials (e.g., a resume). In some embodiments, illustrative process 1800 may be performed by any talent scoring system and, for example, may be performed by example talent scoring systems 1112 or 112 described herein.

Process 1800 begins at act 1802, where information associated with a job is obtained. The obtained information may be any suitable information from which job requirements for the job may be obtained. For example, information associated with a job may comprise input provided by a recruiter via a user interface with the input comprising job requirements, as described above with reference to FIGS. 14 and 15. As another example, information associated with a job may comprise information identifying one or more individuals whose credentials may be processed to generate job requirements for the job, as described above with reference to FIG. 16. As yet another example, information associated with a job may comprise a natural language job description comprising language indicating job requirements for the job, as described above with reference to FIG. 17.

Next, process 1800 proceeds to act 1804, where semi-structured natural language input (e.g., a resume) comprising information about a candidate's credentials is obtained. The organization of all the content in the semi-structured natural language input may not be known in advance of examining/processing that input. That is, for a particular piece of content in the semi-structured natural language input, the precise location of the piece of content in the input may not be known without examining/processing the input. In contrast, the location of a piece of content (e.g., last name of a customer) in structured input (e.g., a database table each row of which corresponds to a respective customer) is known without examining/processing the structured input (e.g., because the last name of the customer always goes in a known column of the database table).

In some embodiments, the semi-structured natural language input may comprise multiple sections, each section comprising semantically-distinct information. For example, the semi-structured natural language input may comprise multiple sections, each section comprising information about a particular type of credential information. In some instances, two sections in the input may be disjoint (e.g., a section having information about a candidate's academic credentials and a section having information about a candidate's professional credentials may be disjoint), while in other instances the sections may overlap. Each section may comprise natural language content in any suitable format.

In some embodiments, the semi-structured natural language input may comprise a resume. The resume may be in any one of numerous types of electronic document formats including, but not limited to, Microsoft Word, portable document format (PDF) documents, HTML, XML, a text file, etc. The semi-structured natural language input may be obtained from any suitable source, as aspects of the technology described herein are not limited in this respect.

Next, process 1800 proceeds to act 1806, where a candidate's credentials are identified by automatically processing the semi-structured natural language input. In some embodiments, automatically processing the semi-structured natural language input may comprise processing the input to identify sections of content in the input corresponding to different types of credentials. For example, automatically processing the semi-structured natural language input may comprise identifying a first section of the semi-structured natural language input comprising information about a first type of credential of the candidate (e.g., information about the candidate's academic credentials) and identifying a second portion of the semi-structured natural language input comprising information about a second type of credential of the candidate (e.g., information about the candidate's professional credentials).

In some embodiments, different sections of content in the semi-structured natural language input may be identified based on words in the input, formatting of content in the input, and/or syntax of text in the input. For example, a section of content may be identified based, at least in part, on one or more keywords. As a specific example, appearance of a keyword such as "Education" or "Experience" may be used to determine that a section of content comprising information about a candidate's academic or professional credentials, respectively, starts following the keyword. A keyword may comprise one word (e.g., "Education") or multiple words (e.g., "Computer Skills"). Information indicating that a section starts at a particular location in the input may signal that another section ends at the particular location. As another example, a section of content may be identified based on formatting of the content in the input. Any suitable type of formatting information may be used to identify sections of content including, but not limited to, spaces, tabs, line breaks, centering of text, whether text is emphasized (e.g., via italics, bolding, underlining, capitalization, etc.), font, and font size. As a specific example, some keywords when emphasized by being underlined, bolded, and/or italicized may signal a start of a section (e.g., "Education" may signal a start of a section comprising information about a candidate's academic credentials). As yet another example, a horizontal line or a line break may indicate the start of one section and the end of another section. It should be appreciated that the above-described examples of how sections of semi-structured natural language input may be identified are illustrative, and that sections of semi-structured natural language input may be identified in any other suitable way based on the above-described features and/or any other types of features.

In some embodiments, one or more identified section of the natural language input may be processed further to identify subsections. For example, a section of the semi-structured natural language input identified as comprising information about academic credentials of a candidate may be further processed to identify subsections of content relating to different degrees that the candidate may have earned (e.g., a subsection of content about the candidate's undergraduate education, a subsection of content about the candidate's graduate education, etc.). As another example, a section of the semi-structured natural language input identified as comprising information may be further processed to identify subsections of content relating to different previous jobs the candidate may have had. Not every identified section in the semi-structured natural language input may be further processed to identify subsections. For example, a section comprising information about a candidate's references may not be processed further to identify subsections.

After one or more sections (and, optionally one or more sub-sections) of the semi-structured natural language input are identified, the identified section(s) and subsection(s) may be further processed using natural language processing techniques to identify the candidate's credentials. In some embodiments, the natural language processing techniques used to process content in a section comprising a particular type of credential information (e.g., information about professional credentials, academic credentials, skill credentials, etc.) of the semi-structured natural language input may be tailored for identifying credentials of the particular type (e.g., an NLP technique for identifying the employer(s) for whom the candidate previously worked, an NLP technique for identifying the degree(s) the candidate earned, an NLP technique for identifying skills a candidate possesses. Any suitable NLP techniques may be used to process a section or subsection of content including keyword matching techniques (as described below) and/or one or more other NLP techniques such as statistical natural language processing techniques, for example.

In some embodiments, one or more keyword matching techniques may be employed to process a section of content to identify the candidate's credentials specified therein. The keyword matching techniques used may be the techniques used for processing natural language job descriptions, as described above with reference to act 1704 of process 1700, or may be any other suitable keyword matching techniques. To identify a candidate's degree(s), for example, a section of the input identified as having the candidate's academic credential information may be further processed to identify exact or partial matches with strings indicative of a degree type (e.g., such as "B.A," "B.Sc.," "BTech," "MA," MS," "PhD," "MBA," "Bachelors," "Masters," "Associate," "Doctorate," etc.). To identify a candidate's primary and/or secondary field of study, for example, a section of the input identified as having the candidate's academic credential information may be processed to identify exact or partial matches with names of fields (e.g., "Computer Science," "Electrical Engineering," Mathematics"), keywords related to fields (e.g., "Mathematical," "Financial," "Business," etc.), and/or other phrases (e.g., "Major," "Minor," "Concentration," etc.). As yet another example, to identify a school or schools that the candidate has attended, the section may be processed to identify exact or partial matches strings indicating a name of a school (e.g., "Massachusetts Institute of Technology," "MIT," "Harvard," "Penn," "UPenn", "Johns Hopkins," "JHU," etc.). As yet another example, the candidate's GPA may be identified by searching for exact or partial matches with the strings "Grade Point Average," "G.P.A.," "GPA," and, if a match is found, identifying the numbers appearing next to the matching string as the candidate's GPA. Other types of credentials may be identified using analogous keyword-matching techniques.

Next, process 1800 proceeds to act 1808, where the candidate's credentials, obtained at act 1806, and information about a job, obtained at act 1802 may be used to calculate a talent score for the candidate indicative of the candidate's suitability for the job. This may be done in any of the ways described herein. After the talent score is calculated, process 1800 completes.

As may be appreciated from the foregoing, the inventors have developed automated techniques for identifying a person's credentials from his or her resume based not only on the content of the resume, but also on the way in which that content is formatted. Using formatting information and content information together allows for more accurate identification of a person's credentials and their respective attributes than using content information alone.

Figure 21:
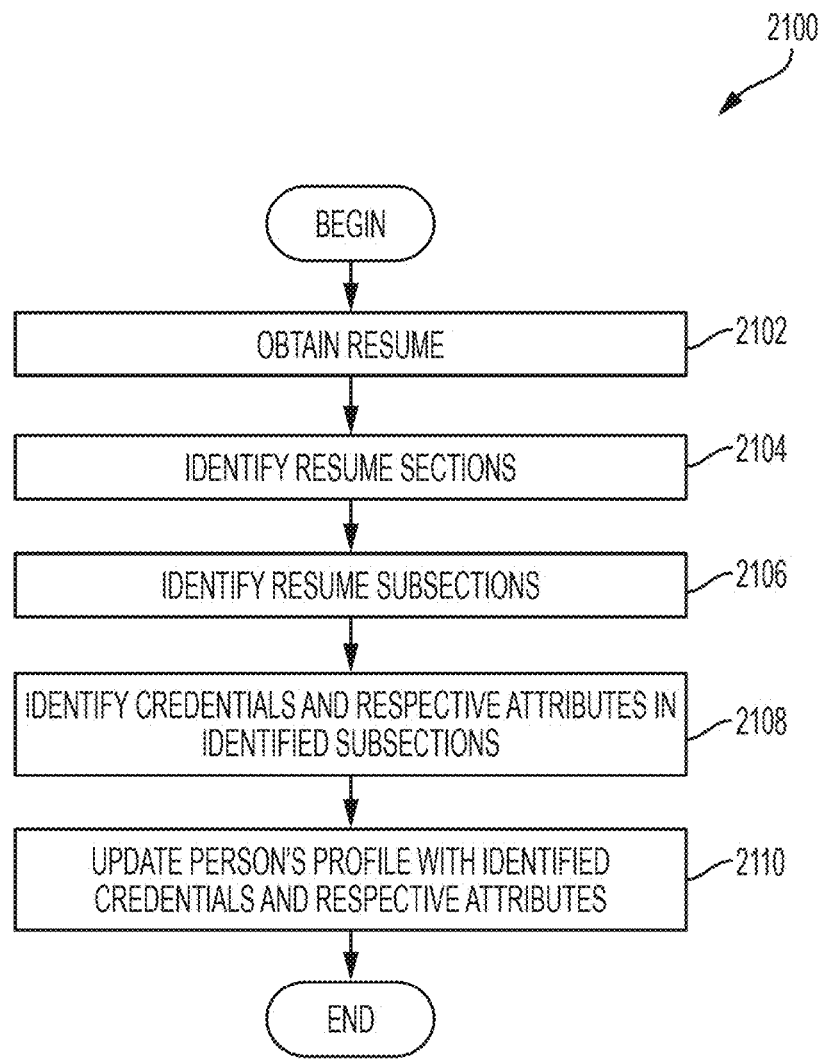
FIG. 21 is a flow chart of an illustrative process for updating a profile of a person from his or her resume, in accordance with some embodiments.

FIG. 21 is a flow chart of an illustrative process 2100 for automatically processing a person's resume to extract the person's credentials and associated attributes described therein, and updating one or more of the person's profiles to reflect the extracted information. Illustrative process 2100 may be performed by a talent scoring system (e.g., systems 112, 1112 described herein), a system operated by an online service and/or website (e.g., Monster®, Indeed®, LinkedIn®, etc.), and/or any other suitable computing device or devices.

Process 2100 begins at act 2102, where a person's resume is obtained. In some embodiments, the resume may be obtained from (e.g., provided by) the person. For example, a person may provide his/her resume for processing such that information contained in the resume may be extracted and used to generate or update the person's online profile. The person may provide the resume via an application program such as a web-browser plug-in, an application program executing on a mobile device, and/or an application program executing on a fixed device such as a desktop computer. As another example, the resume may be obtained from (e.g., provided by) a recruiter or an employer seeking to extract information from the resume. As yet another example, the resume may be obtained from (e.g., provided by) an online service and/or online website seeking to generate or update online profiles of one or more of its members. It should be appreciated that the resume may be obtained from any other suitable source, as aspects of the technology described herein are not limited in this respect.

The obtained resume may be in any one of numerous types of electronic document formats. For example, the resume may be a portable document format (PDF) document, an HTML document, an XML document, a rich text document, a text document, and/or any other suitable type of document. In some embodiments, prior to performing subsequent processing on the resume, the obtained resume may be converted to a common format at act 2102. For example, in some embodiments, the obtained resume may be converted to a format in which information about how the resume's content is formatted is accessible. As a specific non-limiting example, the obtained resume may be converted to HTML format (e.g., a resume obtained in PDF format may be converted to HTML by using the pdf2htmlEX converter or any other suitable converter).

Next, process 2100 proceeds to act 2104, where different sections of content in the resume are identified. The different sections may be recognized based, at least in part, on content of the resume and formatting of the content. In some embodiments, identifying different sections of content in the resume may be performed by identifying section headings (e.g., "Experience," "Education," "Skills," "Awards," etc.) in the resume. Once the section headings are identified, the different sections may be identified as those sections which are demarcated by the section headings. Text in the resume may be identified as a section heading based on the word(s) in the text and the formatting of the text, as discussed in more detail below.

In some embodiments, the section headings may be identified by identifying section heading candidates and selecting the section headings from among the candidates by using one or more rules. The section heading candidates may be identified based on content and/or formatting of text in the resume. For example, one or more of the section heading candidates may be identified based on content of text in the resume. For example, any phrase of one or more words in the resume that matches one or more predetermined keywords may be identified as section heading candidate. Each of the predetermined keywords may include one or multiple words. Examples of predetermined keywords that may be used to identify section heading candidates include, but are not limited to, "Awards," "Education," "Experience," "Honors," "Languages," "Objective," "Professional Summary," "Programming Skills," "Qualifications," "References," and "Skills."

In some embodiments, a phrase in the resume may be identified as a section heading candidate based on how it is formatted. For example, a phrase in the resume may be identified as a section heading candidate if it is formatted in a similar manner to a previously-identified section heading candidate. For example, the phrase "Education" may be identified as a section heading candidate (e.g., based on keyword matching as described above) and the phrase "Professional Experience" may be identified as a section heading candidate because it is formatted in a similar manner to the way in which the phrase "Education" is formatted. In this way, phrases in the resume that would not be identified as section heading candidates based on their content alone (e.g., the phrase "Professional Experience" may not match any predetermined keyword and, as such, may not be identified using keyword matching alone) may nonetheless be identified as section heading candidates based on the way in which they are formatted.

In some embodiments, a phrase may be identified as a section heading candidate based on whether it is formatted in a similar manner to that of one or more other section heading candidates, and not based on the content of the phrase. In other embodiments, a phrase may be identified as a section heading candidate based on its formatting and its content. For example, a phrase may be identified as a section heading candidate based on how similarly it is formatted to another section heading candidate and on whether at least one or more words in the phrase match a predetermined keyword. For example, the phrase "Professional Experience" may be identified as a section heading candidate because it is formatted similarly to another section heading candidate and because the word "Experience," which is part of the phrase, matches a predetermined keyword.

In some embodiments, a phrase may be identified as a section heading candidate when it is formatted in exactly the same way as another section heading candidate, but this is not a limitation of the technology described herein. For example, in some embodiments, a phrase made be identified as a section heading candidate when at least a threshold number (e.g., at least one, at least two, at least three, at least four, at least five, etc.) of its formatting characteristics match those of one or more other section heading candidates. Examples of formatting characteristics of a phrase include, but are not limited to, alignment of the phrase (e.g., center alignment, left-alignment, right-alignment, etc.), font of the phrase, font size, font color, emphasis (e.g., whether the phrase is presented using bold-face font, underlining, italicizing, etc.), and whether the phrase is preceded by an emphasizing symbol (e.g., a bullet of any suitable type, a letter of any suitable type, a number, etc.).

As described above, after section heading candidates are identified, the section headings may be identified among the section heading candidates using one or more rules. In some embodiments, the rule(s) may be used to eliminate section heading candidates that are unlikely to be section headings, and the remaining section heading candidates may be identified as the section headings in the resume and used to identify the sections of the resume. For example, any section heading candidate that is too long (e.g., having at least a threshold number of words, such as more than five words) may be eliminated from consideration. As another example, any section heading candidate containing any character that is not a letter (e.g., a number or a special character) may be eliminated from consideration. As another example, any section heading that includes a date may be eliminated from consideration. As yet another example, any section heading candidate that occurs in the middle of other text on a same line may be eliminated from consideration. It should be appreciated that the above examples of rules are non-limiting and illustrative, and any others suitable rule or rules may be used to identify section headings among the section heading candidates.

After resume sections are identified at act 2104, process 2100 proceeds to act 2106, where subsections of content are identified within each of one or more sections identified at act 2104. Each of the subsections identified at act 2106 may comprise a respective credential. For example, each of the subsections identified in an "Education" section may include information about a degree obtained by the person. For instance, one subsection may include information about the person's Bachelor's degree, another subsection may include information the person's Master's degree, and another subsection may include information about the person's PhD degree. As another example, each of the subsections identified in an "Experience" section may include information about a job previously or currently held by the person. For instance, one subsection may include information about the person's job and one or more other subsections may include respective information about the person's previous job(s).

In some embodiments, subsections of a resume section may be identified by finding the first lines text of each subsection. The first or beginning line of text of a subsection is the text line with which the subsection begins. Once the beginning text line of each subsection is identified, then the different subsections may be identified as those subsections which are demarcated by the beginning lines.

The inventors have appreciated that beginning lines of subsections in a single resume may be formatted in a similar way and may include similar content. For example, subsections of the "Experience" section may each begin with a line that contains three portions: a left-aligned portion (e.g., having the name of the position, having the name of the employer), a center-aligned portion (e.g., having a location of where the job was held); and a right-aligned portion (e.g., having a time period during which the job was held). Although the formatting of and type of content contained in the beginning lines of subsections may differ from one resume to another, the inventors have recognized that similarities in the formatting of and type of content included in beginning lines of subsections in a single resume may be used to accurately identify the beginning lines of subsections in a resume section.

Accordingly, in some embodiments, beginning lines of subsections in a section may be identified by: (1) generating features for each line of text in the section; (2) clustering the lines of text in the section based on similarities among the generated features; and (3) identifying one of the obtained clusters as a cluster having the beginning lines of text in the section. The features generated for each line of text in the section may include one or more formatting features and one or more content features, non-limiting examples of which are described below.

In some embodiments, one or more of the following formatting features may be generated for a line of text in a section: a feature indicating whether the line starts with a bullet, font color of the first token in the line, font color of one or more subsequent tokens in the line (e.g., if different from that of the first token), name of the font (or font family) of the first token in the line, name of the font (or font family) of one or more subsequent tokens in the line (e.g., if different from that of the first token), font size of the first token in the line, font size of one or more subsequent tokens in the line (e.g., if different from that of the first token), a feature indicating whether the line is aligned in a particular way (e.g., left aligned, right aligned, or center aligned), a feature indicating whether the first token is upper case or lower case, a feature indicating the vertical distance of the text line from the nearest text line above the text line, and a feature indicating an amount of empty space between the first and last token in the text line. Though, it should be appreciated, that the above-described formatting features are non-limiting and that in some embodiments one or more other formatting features may be used in addition to or instead the above-described formatting features, as aspects of the technology described herein are not limited in this respect.

In some embodiments, one or more of the following content features may be generated for a line of text in a section: a feature indicating whether the line contains a job title, a feature indicating whether the line contains a date, a feature indicating whether a line contains a start date and an end date, a feature indicating whether the next line in the section contains a date, a feature indicating whether the next line in the section contains a start date and an end date, a feature indicating whether the line contains a name of a location (e.g., a city), a feature indicating whether the line contains a name of a degree, a feature indicating whether the next line of text in the section contains a name of a degree, a feature indicating whether the line contains a grade or GPA, a feature indicating whether the next line of text in the section contains a grade or GPA, a feature indicating whether the line contains a field of a degree (e.g., Computer Science, Math, English, Engineering, etc.), a feature indicating whether the next line in the section contains a field of a degree, a feature indicating whether the line contains a name of a school, and a feature indicating whether the next line in the section contains a name of a school. Though, it should be appreciated, that the above-described examples of content features are non-limiting and that, in some embodiments, one or more other content features may be used in addition to or instead the above-described content features, as aspects of the technology described herein are not limited in this respect.

In some embodiments, the features used to identify beginning lines of subsections may depend on the resume section in which the subsections are being detected. For example, the features used to identify beginning lines of subsections of one section (e.g., an "Education" section) may be different from the features used to identify beginning lines of subsections in another section (e.g., an "Experience" section). For example, features concerning whether a GPA, a degree, a field of a degree, and name of a school is contained in a text line or the following text line may be used to identify beginning lines of subsections in the "Education" section, but not the "Experience Section." As another example, features concerning whether a job title, a date or multiple dates, and a location is contained in a text line or the following text line may be used to identify beginning lines of subsections in the "Experience" section, but not the "Education section."

After features are obtained from each of the lines of text in a resume section, the features may be used to cluster the lines of text. In some embodiments, the lines of text may be clustered into two clusters. In other embodiments, the lines of text may be clustered into more than two clusters, as aspects of the technology described herein are not limited in this respect. The clustering may be performed using any suitable clustering technique (e.g., a K-means clustering technique, a statistical clustering technique, a spectral clustering technique, etc.).

After the clusters of text lines have been obtained as a result of the clustering, one of the clusters of text lines may be identified to be the cluster that contains the beginning lines of subsections. The cluster that contains the beginning lines of subsections may be identified based on how many lines of text the cluster contains relative to other clusters. For example, a subsection of content will generally include two or more lines of text and, as such, a resume section contains fewer beginning lines of subsections than other lines of text. Accordingly, when the text lines in a section are grouped into two clusters, the cluster having the smaller number of text lines may be identified as the cluster containing the beginning lines of subsections. However, the cluster that contains the beginning lines of subsections may be identified in any other suitable way, as aspects of the disclosure described herein are not limited in this respect.

Next, the lines in the cluster identified as the one containing beginning lines of subsections are be identified as the beginning lines of subsections and are used, in turn, to identify the subsections in the resume section for which the above—described clustering technique was performed. The clustering technique may be performed for each of one or more resume sections (e.g., "Education" section, "Experience" section, "Skills" section, "Personal Information" section, etc.).

Next, process 2100 proceeds to act 2108, where the person's credentials and associated attributes are identified in the subsections obtained at act 2106. This may be done based at least in part on knowledge about what information is likely to be found in each section. For example, the way in which credentials and respective attributes are identified in subsections of the Education resume section may be different from the way in which credentials and respective attributes are identified in subsections of the Experience resume section. Accordingly, in some embodiments, text in each identified subsection may be processed to obtain information about the credential in the subsection and associated attributes that are expected to be found in the subsection.

As one example, a subsection in the "Experience" section may include information about a professional credential and may be processed to identify one or more attributes of the professional credential such as job title, employer name, location of job and/or employer, start date of employment, end date of employment, whether or not the job is a past job or a current job, a description of responsibilities of the job, and/or any other suitable attribute of the professional credential described in the subsection. As another example, a subsection in the "Education" section may include information about an academic credential and may be processed to identify one or more attributes of the academic credential such as a name of a school, a name of a degree, a name of a major, a name of a minor, a location of the school, a grade point average, an honor (e.g., Dean's list, magna cum laude, etc.), a starting date of the degree program, an ending date of the degree program, and/or any other suitable entity related to the education credential described in the subsection. The processing of text in a subsection to identify an attribute of a credential described therein may sometimes be termed an "entity detection" process.

In some embodiments, attributes of a credential in a subsection may be identified based on content of text in the subsection. Some attributes may be identified by at least partially matching text in the subsection against one or more predetermined keywords. For example, attributes of a credential described in a subsection of the Experience section of the resume (e.g., name of employer, job title, and dates of employment) may be identified at least by partially matching the text in the subsection against predetermined keywords. For instance, text in the subsection may be identified as the name of an employer when the text matches a name of an employer on a list of employers or when a portion of the text matches one or more keywords (e.g., "Inc", "LLC", "LLP", "Corp", and "Institute of") indicating that the text is likely a name of an employer. Similarly, text in the subsection may be identified as a job title when the text directly matches a title in a fixed list of job titles or when a portion of the text matches one or more keywords indicating that the text is likely a job title. As another example, attributes of a credential described in a subsection of the Education section of a resume (e.g., name of school, names of degrees, names of program, name of major, names of minor, etc.) may be identified by at least partially matching text in the subsection against one or more predetermined keywords. As a specific example, text in the subsection may be identified as a name of a school may be identified when it directly matches a name of a school in a school list or when a portion of the text matches one or more keywords indicating that the text is likely a name of a school (e.g., the text contains the word "university" or "college"). Similarly, text in the subsection may be identified as a degree when it matches a degree in a list of degrees or when a portion of the text matches one or more keywords indicating that the text is likely a name of a degree (e.g., the text contains the word "Bachelors"). As may be appreciated from the foregoing, different sets of keywords may be used for identifying attributes in subsections of different sections. That is, different sets of keywords may be used to identify attributes of an academic credential in a subsection of the Education section of the resume and attributes of a professional credential in a subsection of the Experience section of the resume.

Additionally or alternatively, attributes of a credential in a subsection may be identified based on formatting of text in the subsection. For example, some information (e.g., dates) is more likely to be right-aligned than left-aligned. As another example, some information is more likely to be emphasized (e.g., using bolding, italicizing, underlining, etc.). For example, names of jobs are more likely to be emphasized than other text. As another example, dates (e.g., dates of employment, dates of attending a school, etc.) may be identified by finding any text that conforms to a date format (e.g., a sequence of numbers and special characters organized in a certain way to indicate a date). In some embodiments, dates may identified in resume text using regular expressions.

In some embodiments, attributes of a credential in a subsection of a resume section may be identified based on information obtained from another subsection of the resume section. For example, text in a subsection may be identified as an attribute of the credential described in the subsection based, at least in part, on formatting of the same types attribute(s) already identified in other subsection(s). As one non-limiting example, the Experience section of a resume may include multiple subsections each including text identifying the location of the job described therein. The location of a job (e.g., Philadelphia) in a first subsection may be identified using keyword matching and it may be determined that this text is located at the end of the first line of the first subsection. Accordingly, the job location for a job described in a second subsection (e.g., Boston) may be identified as the text located at the end of the first line of the second subsection because the similar attributes of credentials are likely formatted the same way among the subsections. Identifying attributes in this way provides for a more robust and accurate resume parser because relying on keyword matching alone to identify attributes may result in missed identifications when the resume contains information that is not reflected in the keywords used to perform the matching. For instance, if the job location of the second job in the above example was not Boston but rather a city whose name is not stored in the database of keywords used to do keyword matching, the job location may not be found using keyword matching alone. However, the job location would be easily found based on information about how other attributes are formatted.

After information about credentials and their respective attributes is identified at act 2108, process 2100 proceeds to act 2110 where the obtained information is used to update a person's profile. Updating a profile may include generating a profile to include the information obtained from the person's resume or editing an existing profile to reflect the information obtained from the person's resume.

In some embodiments, the obtained information may be used to update a person's online profile that is associated with one or more online services or websites (e.g., one or more recruiting services and/or websites, one or more networking services and/or websites, etc.). For example, the obtained information may be used to update the person's LinkedIn® profile, the person's Monster® profile, the person's Indeed® profile, the person's Facebook® profile, and/or any other online profile. It should be appreciated that the information obtained from a person's resume is not limited to being used for update the person's online profile and, for example, may be used to update any profile of the person. For example, the information obtained from a person's resume may be used to update a profile of the person kept by a recruiter or by an employer, which profile may not be publicly accessible. As another example, the information obtained from a person's resume may be stored for any suitable subsequent use. After act 2110 is performed, process 2100 completes.

As discussed above, some embodiments provide for an application program that may help employers identify the candidates, from among users in an online service, that are best suited for one or more jobs (see e.g., discussion with reference to FIGS. 11 and 12). The application program may receive profile information of individuals identified via a user search of an online service (e.g., LinkedIn®, Monster®, any other professional website, etc.) and generate talent scores for these individuals. In many circumstances, however, the individuals being scored are limited to those individuals returned by the online service in response to a user (e.g., a recruiter) providing the keywords for the search query used by the online service to identify the individuals. As such, the pool of individuals being scored may be limited unnecessarily by poor choice of (keywords in) the search query.

The inventors have developed techniques for generating improved search queries based on information associated with a job for which candidates are sought, so that when the improved search queries are used to search for candidates via an online service, the online service may return a rich and more comprehensive set of candidates, which may then be scored to determine their suitability for the job. Accordingly, some embodiments are directed to automatically generating a search query based, at least in part, on job requirements for the job. The search query may comprise one or more keywords provided by a recruiter as part of the job requirements and one or more keywords related to the keyword(s) in the job requirements, but not themselves part of the job requirements. For example, if a recruiter indicates that a candidate for a job is preferred to have a degree from Stanford University and is required to have machine learning and Java programming skills, a search query may be generated having the keywords "Stanford," "Machine Learning," and "Java" as well as the keywords "Berkeley" (determined to be related to "Stanford"), "Data Mining" (determined to be related to "Machine Learning," and "C++" (determined to be related to "Java"). For example, the search query ("Stanford" OR "Berkeley") AND ("Machine Learning" OR "Data Scientist") AND ("Java" OR "C++") may be generated. This query may result in a richer and more comprehensive set of candidates than a simple query limited to having only those keywords that were provided by a recruiter as part of the job description (e.g., "Stanford" AND "Machine Learning" and "Java"). The related keywords, such as the ones illustrated in the above example, may be identified based, at least in part, on information that captures relationships among entities such as universities, employers, fields of study, skills, etc.

Figure 19:
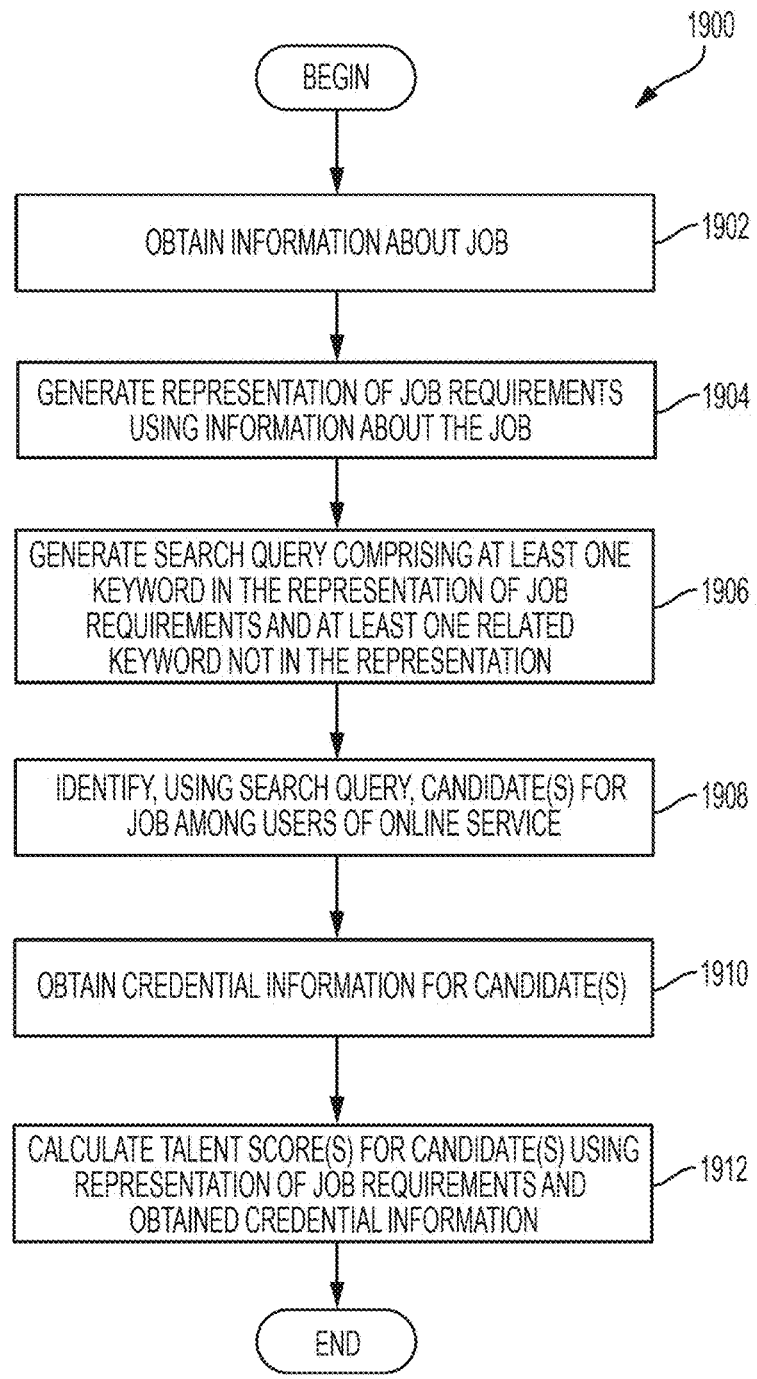
FIG. 19 is a flow chart of an illustrative process for calculating talent scores for candidates identified using a measure of similarity between information about a first job associated with a first employer and information about a second job associated with a second employer, in accordance with some embodiments.

FIG. 19 is a flow chart of an illustrative process 1900 for identifying candidates for a job from among users of an online network based on search queries automatically generated using information about the job. Illustrative process

1900 may be performed by any talent scoring system and, for example, may be performed by talent scoring system 112 and 1112 as described herein. As another example, one or more acts of process 1900 may be performed by an application program executing on a device of a user (e.g., a recruiter) such as, for example, application program 1106, as described herein.

Process 1900 begins at act 1902, where information associated with a job is obtained. The obtained information may be any suitable information from which job requirements for the job may be obtained. For example, information associated with a job may comprise input provided by a recruiter via a user interface with the input comprising job requirements, as described above with reference to FIGS. 14 and 15. As another example, information associated with a job may comprise information identifying one or more individuals whose credentials may be processed to generate job requirements for the job, as described above with reference to FIG. 16. As yet another example, information associated with a job may comprise a natural language job description comprising language indicating job requirements for the job, as described above with reference to FIG. 17.

Next process 1900 proceeds to act 1904, where a representation of job requirements is generated based on information about the job. This may be done in any suitable way including, for example, in any of the ways described with reference to acts 1604 and 1704 of processes 1600 and 1700, respectively. For example, when the information associated with the job is provided by a recruiter via a user interface (e.g., as described with reference to FIGS. 14 and 15), the representation of the job requirements may comprise the information specified by the recruiter including, for example, a list of credentials (of any of the types described herein) that a candidate for a job required and/or preferred to have. As another example, when the information associated with a job comprises information identifying one or more individuals, generating a representation of job requirements may comprise generating the representation based on the credentials of the identified individuals, as described with reference to FIG. 16. As yet another example, when the information associated with a job comprises a natural language description of the job, the representation of job requirements may be generated by automatically processing the natural language description of the job to obtain one or more job requirements, as described with reference to FIG. 17.

Next, process 1900 proceeds to act 1906, where a search query is generated based, at least in part, on the representation of job requirements obtained at act 1904. The search query may comprise at least one keyword in the job requirements and at least one other keyword not in the job requirements, but related to the at least one keyword and/or other information in the job requirements. Accordingly, in some embodiments generating the search query may comprise: (A) identifying a first set of one or more keywords in the representation of job requirements; (B) identifying a second set of one or more keywords not in the representation of job requirements but related to the first set of keywords, and (C) generating the search query comprising at least one keyword in the first set of keywords and at least one keyword in the second set of keywords.

Identifying a first set of one or more keywords in the representation of job requirements to use for generating a search query may be done in any suitable way. One or more keywords may be selected from the representation of job requirements for each of one or more types of credentials. For example, one or more keywords may be selected from information in the representation of job requirements specifying the recruiter's academic credential preferences (e.g., at least one keyword specifying a type of degree a candidate is preferred to have, at least one keyword specifying a name of a school a candidate is preferred to have attended, at least one keyword specifying a primary and/or secondary field a candidate has studied, etc.). As another example, one or more keywords may be selected from information specifying the recruiter's professional credential preferences (e.g., at least one keyword specifying a name of an employer a candidate is preferred to have been employed by, at least one keyword specifying a skill or skills a candidate for the job is preferred to have, etc.). Any suitable number of keywords may be selected from the job description to be used as part of a search query, as aspects of the technology described herein are not limited in this respect.

In some embodiments, a second set of one or more keywords related to one or more keywords in the first set of keywords may be obtained at least in part by using one or more data structures representing relationships among credentials. For example, the data structure(s) may encode a credentials graph that represents relationships among credential areas, as described above with reference to FIGS. 6 and 9, and the credential graph may be used to obtain one or more keywords related to keywords in the representation of job requirements. For example, a particular keyword in the first set of keywords may be a name of a particular skill (e.g., "Machine Learning") represented in the credentials graph and keywords associated with other skills related, via the credentials graph, to the particular skill may be identified as keywords related to the keyword in the first set (e.g., "Signal Processing," "Data Mining," etc.). As another example, a particular keyword in the first set of keywords may be a name of a particular field of study (e.g., "Mathematics" and "Computer Science") represented in the credentials graph and keywords associated with other fields of study related, via the credentials graph, to the particular field of study may be identified as keywords related to the keyword in the first set (e.g., "Statistics" and "Electrical Engineering"). As another example, the data structure(s) may encode information relating schools based on a similarity of their ranking and/or proximity of their location to one another. Such information may be used to identify, for a keyword representing a particular school (e.g., Harvard) a related keyword representing another school having a similar ranking to the particular school (e.g., Yale, Stanford, Princeton) and/or being close to the particular school (e.g., MIT and Brown). More generally, the data structure(s) may encode any suitable relationships among entities of interest to recruiters (relationships among schools, relationships among employers, relationships among skills, relationships among degrees, relationships among areas of study, etc.) and these relationships may be used to identify keywords that may be included in a search query even though they may not be in the representation of job requirements.

It should be appreciated that for a particular keyword in the representation of job requirements, any suitable number (e.g., one, two, three, five, ten, etc.) of related keywords not in the representation of job requirements may be identified as part of act 2006. For example, if the keyword "Java" is in the representation of job requirements multiple related keywords may be identified (e.g., "C," "Python," "Ruby," "Programming," "Software," "Computer Science," etc.).

After a first set of one or more keywords in the representation of job requirements and a second set of one or more keywords related to but not in the representation of job requirements is identified, a search query may be generated that comprises one or more keywords in the first set of keywords and one or more keywords in the second set of keywords. The search query may be formed at least in part by concatenating the keywords using one or more Boolean operators such as "AND," "OR," "NOT" and/or any other suitable operators/symbols used to generate queries. For example, a keyword in the first set of keywords may be joined via an "OR" with a related keyword in the second set of keywords (e.g., "Stanford" may be joined with "Berkeley" to form "Stanford OR Berkeley," which may be part of the generated search string).

Next process 1900 proceeds to act 1908, where the search query generated at act 1906 is used to identify one or more candidates for the job among users of an online service. This may be done in any suitable way. For example, the search query generated at act 1906 may be submitted to the online service and the online service may perform a search using the search query to identify one or more candidates for the job among users of the online service. As another example, the search query generated at act 1906 may be submitted to a search engine configured to search information accessible via the online service and the search engine may identify one or more candidates for the job among users of the online service based on the query.

Next process 1900 proceeds to act 1910, where credential information for one or more individuals identified among users of the online service are obtained. The credential information may be obtained in any of the ways described with respect to act 1204 of process 1200 or in any other suitable way.

After the credentials of one or more online service users are obtained at act 1910, process 1900 proceeds to act 1912 where a talent score is calculated for one or more of the online service users whose credentials have been obtained. The talent score for an online service user may be calculated based, at least in part, on the user's credentials (obtained at act 1910) and information associated with the job (obtained at act 1902). This may be done in any suitable way described herein. The calculated talent scores may be used to rank the users that were scored to find the users deemed most suitable for the job. After the talent scores are calculated at act 1912, process 1900 completes.

The inventors have appreciated that when a recruiter searches for job candidates among users of an online service, the recruiters search may be limited by the online service to users of the online service that are in the recruiters network. For example, the online service may limit the recruiters search only to those candidates that are directly connected to the recruiter in the online network and/or are connected indirectly through no more than a threshold number of other connections. As a result, there may be users of the online service who are qualified for the job for which a recruiter is seeking candidates, but a recruiter searching for candidates among users of the online service may not be able to identify all such users.

Accordingly, some embodiments are directed to techniques for expanding the scope of a recruiter's search for job candidates among users of an online service and allowing a talent scoring system to calculate talent scores for candidates that are not directly connected or indirectly connected (through no more than a threshold number of connections) to the recruiter. In some embodiments, when different recruiters search for job candidate for multiple jobs and the jobs are sufficiently similar according to a measure of similarity, users of the online service in the network of one recruiter may be scored for a job for which another recruiter is seeking job candidates. In this way, users in the network of recruiter A, but not in the network of recruiter B may be evaluated (e.g., scored) for a job for which recruiter B is seeking candidates.

Figure 20:
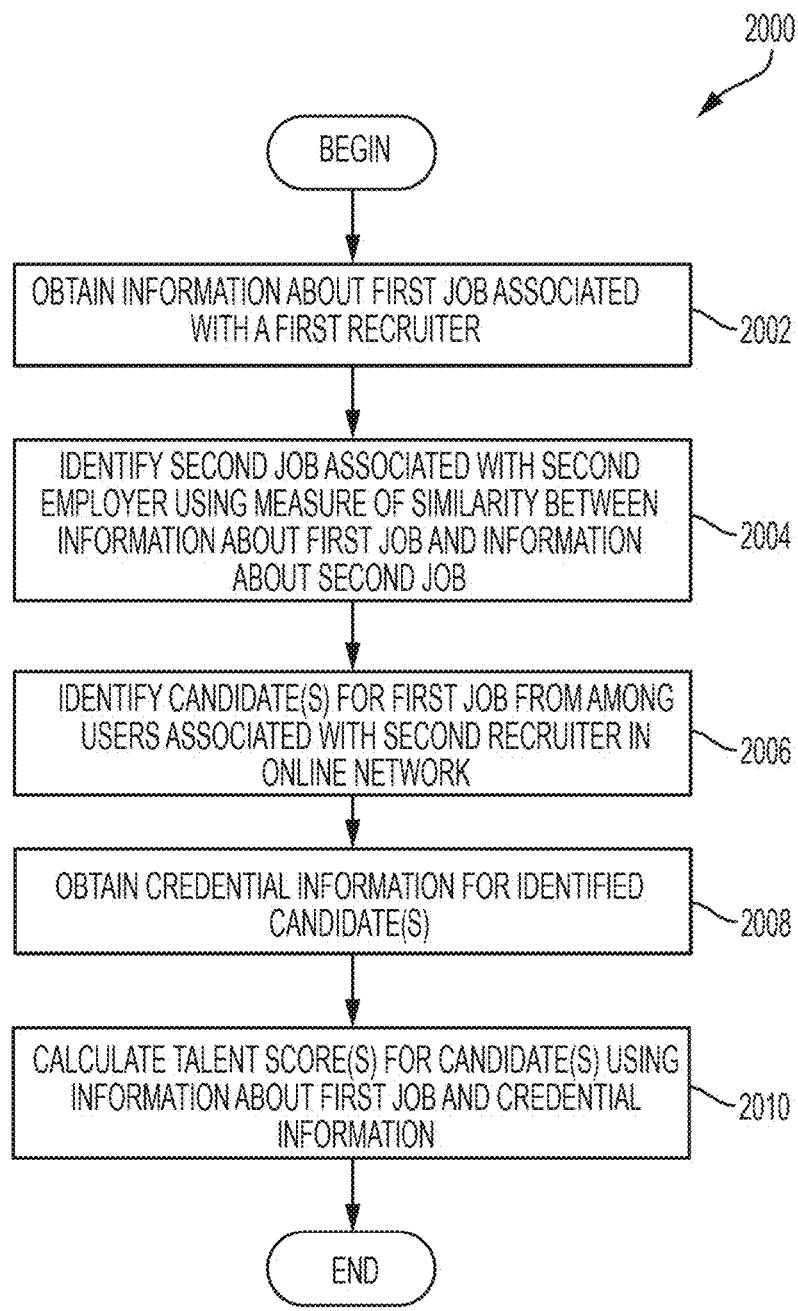
FIG. 20 is a flow chart of an illustrative process for identifying candidates for a job from among users of an online network based on search queries automatically generated using information about the job, in accordance with some embodiments.

FIG. 20 is a flow chart of an illustrative process for calculating talent scores for candidates identified using a measure of similarity between information about a first job associated with a first employer and information about a second job associated with a second employer. Illustrative process 2000 may be performed by any talent scoring system and, for example, may be performed by talent scoring system 112 and 1112 as described herein. As another example, one or more acts of process 2000 may be performed by an application program executing on a device of a user (e.g., a recruiter) such as, for example, application program 1106, as described herein.

Process 2000 begins at act 2002, where information associated with a first job is obtained. The first job may be associated with a first recruiter (e.g., the first recruiter may be seeking job candidates for the first job). The obtained information may be any suitable information from which job requirements for the first job may be obtained. For example, information associated with the first job may comprise input provided by the first recruiter via a user interface with the input comprising job requirements, as described above with reference to FIGS. 14 and 15. As another example, information associated with the first job may comprise information identifying one or more individuals whose credentials may be processed to generate job requirements for the first job, as described above with reference to FIG. 16. As yet another example, information associated with the first job may comprise a natural language job description comprising language indicating job requirements for the first job, as described above with reference to FIG. 17.

Next process 2000 proceeds to act 2004, where a second job associated with a second recruiter (e.g., the second recruiter may be or may have been seeking job candidates for the second job) may be identified using a measure of similarity between information about first job and information about the second job. The second job may be identified from among a plurality of jobs by calculating the measure of similarity between information about the first job and information about one or more jobs in the plurality of jobs.

In some embodiments, calculating a measure of similarity between information about the first job and information about another job may comprise: (1) calculating a first set of talent scores for a set of individuals using information about the first job and credentials of the individuals in the first set of individuals; (2) calculating a second set of talent scores for the same set of individuals using information about the other job; and (3) calculating the measure of similarity based on a measure of distance between the first set of talent scores and the second set of talent scores. The set of individuals used in the above steps may be representative of individuals for which talent scores may be computed and may be selected because the credentials of individuals in the set form a representative sample of the types of credentials that job candidates may have. In this way, the task of calculating a measure of similarity between job descriptions may be performed by proxy—when a similar talent scores for different jobs are obtained using the same set of different individuals, the job descriptions are likely similar. Indeed, the same set of talent scores would be obtained in the limiting case where the two descriptions are identical.

The first set of talent scores for the set of individuals may be calculated by generating (or accessing a previously generated) at least one representation of job requirements for the first job based on information obtained about the first job at act 2002. The at least one representation of job requirements for the first job may be generated in any of the ways described herein (e.g., as described with respect to FIGS. 14, 16, and 17). The first set of talent scores may be calculated based, at least in part, on the at least one generated representation of job requirement for the first job and credentials of the individuals in the first set of individuals in any of the ways described herein. Similarly, the second set of talent scores may be calculated based on at least one representation of job requirements for the other job and credentials of the individuals in the first set of individuals in any of the ways described herein. The first set of talent scores may consist of a same number of talent scores as the second set of talent scores.

In some embodiments, the measure of distance between the first set of talent scores and the second set of talent score may be calculated by calculating a measure of distance between two vectors, where the first vectors contains talent scores from the first set of talent scores and the second vector contains talent scores from the second set of talent scores. Any suitable measure of distance between two vectors may be employed including, but not limited to, Euclidean distance between the vectors, Hamming distance, $l_p$-distance for any prime integer p, weighted Euclidean distance, etc.

After a second job associated with a second recruiter is identified at act 2004, process 2000 proceeds to act 2006, where one or more candidates for the first job is identified from among users in the online network that are connected (directly or indirectly) to the second recruiter. The candidates may be identified based on the magnitude of their respective talent scores for the second job or in any other suitable way. For example, the top scoring (e.g., top five, top ten, etc.) online network users connected to the second recruiter may be identified as candidates for the first job.

Next process 2000 proceeds to act 2008, where credential information for the candidates identified at act 2006 is obtained. This may be done in any of the ways described herein. Next process 2000 proceeds to act 2010, where talent scores for the candidates identified at act 2006 are calculated using their credential information (obtained at act 2008) and information about the first job (obtained at act 2010), which may be done in any of the ways described herein. In this way, the qualifications of one or more candidates in associated with (e.g., connected directly or indirectly) to a second recruiter in an online network may be scored for their suitability for a job for which the first recruiter is seeking candidates. After talent scores are calculated at act 2010, process 2000 completes.

Figure 22:
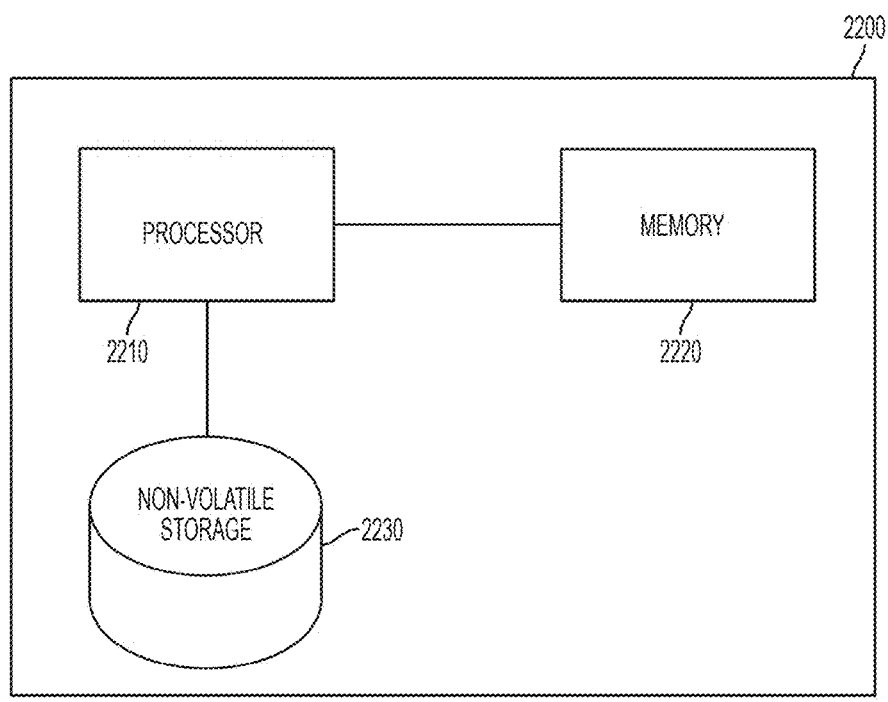
FIG. 22 is a block diagram of an illustrative computer system that may be used in implementing some embodiments.

FIG. 22 is a block diagram of an illustrative computer system that may be used in implementing some embodiments. An illustrative implementation of a computer system 2200 that may be used to implement one or more of the scoring or evaluation techniques, or to perform one or more other services described herein is shown in FIG. 22. Computer system 2200 may include one or more processors 2210 and one or more non-transitory computer-readable storage media (e.g., memory 2220 and one or more non-volatile storage media 2230). The processor 2210 may control writing data to and reading data from the memory 2220 and the non-volatile storage device 2230 in any suitable manner, as the aspects of the invention described herein are not limited in this respect.

To perform functionality and/or techniques described herein, the processor 2210 may execute one or more instructions stored in one or more computer-readable storage media (e.g., the memory 2220, storage media, etc.), which may serve as non-transitory computer-readable storage media storing instructions for execution by the processor 2210. Computer system 2200 may also include any other processor, controller or control unit needed to route data, perform computations, perform I/O functionality, etc. For example, computer system 2200 may include any number and type of input functionality to receive data and/or may include any number and type of output functionality to provide data, and may include control apparatus to operate any present I/O functionality.

In connection with the scoring techniques and other evaluation and recommendation services described herein, one or more programs configured to receive information, evaluate data, determine one or more talent scores and/or provide information to employers and/or candidates may be stored on one or more computer-readable storage media of computer system 2100. Processor 2210 may execute any one or combination of such programs that are available to the processor by being stored locally on computer system 2200 or accessible over a network. Any other software, programs or instructions described herein may also be stored and executed by computer system 2200. Computer 2200 may be a standalone computer, server, part of a distributed computing system, mobile device, etc., and may be connected to a network and capable of accessing resources over the network and/or communicate with one or more other computers connected to the network.

Implementation of some of the techniques described herein (e.g., computing talent scores) on a computer system such as computer 2200 is an integral component of practicing these techniques, as aspect of these techniques cannot be realized absent computer implementation. At least part of the inventor's insight is derived from the recognition that widespread, automated, distributed talent scoring can only be implemented using a computer system. In addition, techniques described herein that are performed by one or more computers are capable of quantifying matches in an objective, distributed and saleable manner not possible using manually driven approaches.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the technology described herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (see e.g., FIGS. 2-4, 5A-B, 6, 10, 12, 14, and 16-21) have been provided. The acts performed as part of each process may be ordered in any suitable way. Accordingly, embodiments may be constructed in which acts are performed in an order different than illustrated, which may include performing some acts concurrently, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method comprising:
using at least one computer hardware processor to perform:
accessing an electronic version of a resume of a person;
automatically parsing the resume at least in part by:
identifying, based at least in part on formatting of the resume, a plurality of sections in the resume including a first section, wherein identifying the plurality of sections comprises identifying a plurality of section headings at least in part by:
identifying a plurality of section heading candidates at least in part by:
identifying a first phrase in the resume as a first section heading candidate based, at least in part, on content of the first phrase, and
identifying a second phrase in the resume as a second section heading candidate when at least a threshold number of formatting characteristics of the second phrase match those of the first phrase; and
selecting, based on one or more attributes of the plurality of section heading candidates, the plurality of section headings from the plurality of section heading candidates;
identifying, based at least in part on content in the first section and formatting of the content, a plurality of subsections of the first section including a first subsection and a second subsection, the identifying comprising:
generating one or more first formatting features and one or more first content features for each line of text of multiple lines of text in the first section,
clustering the multiple lines of text in the first section based on the one or more first formatting features and the one or more first content features to obtain a first plurality of clusters including a first cluster, the first cluster comprising at least one line of text from the first subsection of the plurality of subsections of the first section and at least one line of text from the second subsection of the plurality of subsections of the first section,
identifying, from the first plurality of clusters, a cluster containing beginning lines of text of multiple subsections of the first section, and
identifying the plurality of subsections of the first section based, at least in part, on the identified cluster containing the beginning lines of text of the multiple subsections of the first section; and
processing text in the plurality of subsections to identify a plurality of credentials and associated attributes; and
populating an online profile for the person to reflect the plurality of credentials and the associated attributes, wherein the online profile for the person is one of a plurality of online profiles associated with a plurality of users of an online service.

2. The method of claim 1, wherein selecting, based on the one or more attributes of the plurality of section heading candidates, the plurality of section headings from the plurality of section heading candidates comprises:
identifying, based on the one or more attributes, a first set of section heading candidates of the plurality of section heading candidates that are unlikely to be section headings;
identifying a second set of section heading candidates of the plurality of section heading candidates that are likely to be section headings; and
selecting the second set of section heading candidates as the plurality of section headings in the resume.

3. The method of claim 1, wherein the plurality of sections in the resume include a second section, and the method further comprises:
identifying a plurality of subsections of the second section at least in part by:
generating one or more second formatting features and one or more second content features for each line of text of multiple lines of text in the second section, the one or more second formatting features and the one or more second content features being different from the one or more first formatting features and the one or more first content features associated with the first section;
clustering the multiple lines of text in the second section based on the one or more second formatting features and the one or more second content features to obtain a second plurality of clusters including a second cluster, the second cluster comprising at least one line of text from a first subsection of the plurality of subsections of the second section and at least one line of text from a second subsection of the plurality of subsections of the second section;
identifying, from the second plurality of clusters, a cluster containing beginning lines of text of multiple subsections of the second section; and
identifying the plurality of subsections of the second section based, at least in part, on the identified cluster containing the beginning lines of text of the multiple subsections of the second section.

4. The method of claim 1, wherein the one or more first formatting features comprises at least one member selected from the group consisting of: a feature indicating whether the line of text starts with a bullet, a font color of a first token or one or more subsequent tokens in the line of text, a name of a font of the first token or the one or more subsequent tokens in the line of text, a font size of the first token or the one or more subsequent tokens in the line of text, a feature indicating whether the line of text is aligned in a particular way, a feature indicating whether the first token is upper case or lower case, a feature indicating a vertical distance of the line of text from a nearest line of text above the line of text, and a feature indicating an amount of empty space between the first token and a last token in the line of text.

5. The method of claim 1, wherein the first subsection includes text describing a first credential, wherein the second subsection includes text describing a second credential, and wherein processing the text in the plurality of subsections comprises:
identifying first text in the first subsection as a first attribute of the first credential; and
identifying second text in the second subsection as a second attribute of the second credential based on formatting of the first text.

6. The method of claim 1, wherein the first plurality of clusters comprises the first cluster and a second cluster, the cluster identified as containing the beginning lines of text is the first cluster, and identifying the cluster containing the beginning lines of text comprises identifying that the first cluster has a smaller number of lines of text than the second cluster.

7. At least one non-transitory computer-readable storage medium storing processor executable instructions that, when executed using at least one computer hardware processor, cause the at least one computer hardware processor to perform a method comprising:
accessing an electronic version of a resume of a person;
automatically parsing the resume at least in part by:
identifying, based at least in part on formatting of the resume, a plurality of sections in the resume including a first section, wherein identifying the plurality of sections comprises identifying a plurality of section headings at least in part by:
identifying a plurality of section heading candidates at least in part by:
identifying a first phrase in the resume as a first section heading candidate based, at least in part, on content of the first phrase, and
identifying a second phrase in the resume as a second section heading candidate when at least a threshold number of formatting characteristics of the second phrase match those of the first phrase; and
selecting, based on one or more attributes of the plurality of section heading candidates, the plurality of section headings from the plurality of section heading candidates;
identifying, based at least in part on content in the first section and formatting of the content, a plurality of subsections of the first section including a first subsection and a second subsection, the identifying comprising:
generating one or more first formatting features and one or more first content features for each line of text of multiple lines of text in the first section,
clustering the multiple lines of text in the first section based on the one or more first formatting features and the one or more first content features to obtain a first plurality of clusters including a first cluster, the first cluster comprising at least one line of text from the first subsection of the plurality of subsections of the first section and at least one line of text from the second subsection of the plurality of subsections of the first section,
identifying, from the first plurality of clusters, a cluster containing beginning lines of text of multiple subsections of the first section, and
identifying the plurality of subsections of the first section based, at least in part, on the identified cluster containing the beginning lines of text of the multiple subsections of the first section; and
processing text in the plurality of subsections to identify a plurality of credentials and associated attributes; and
populating an online profile for the person to reflect the plurality of credentials and the associated attributes, wherein the online profile for the person is one of a plurality of online profiles associated with a plurality of users of an online service.

8. The at least one non-transitory computer-readable storage medium of claim 7, wherein selecting, based on the one or more attributes of the plurality of section heading candidates, the plurality of section headings from the plurality of section heading candidates comprises:
identifying, based on the one or more attributes, a first set of section heading candidates of the plurality of section heading candidates that are unlikely to be section headings;
identifying a second set of section heading candidates of the plurality of section heading candidates that are likely to be section headings; and
selecting the second set of section heading candidates as the plurality of section headings in the resume.

9. The at least one non-transitory computer-readable storage medium of claim 7, wherein the plurality of sections in the resume include a second section, and the method further comprises:
identifying a plurality of subsections of the second section at least in part by:
generating one or more second formatting features and one or more second content features for each line of text of multiple lines of text in the second section, the one or more second formatting features and the one or more second content features being different from the one or more first formatting features and the one or more first content features associated with the first section;
clustering the multiple lines of text in the second section based on the one or more second formatting features and one or more second content features to obtain a second plurality of clusters including a second cluster, the second cluster comprising at least one line of text from a first subsection of the plurality of subsections of the second section and at least one line of text from a second subsection of the plurality of subsections of the second section;
identifying, from the second plurality of clusters, a cluster containing beginning lines of text of multiple subsections of the second section; and
identifying the plurality of subsections of the second section based, at least in part, on the identified cluster containing the beginning lines of text of the multiple subsections of the second section.

10. The at least one non-transitory computer-readable storage medium of claim 7, wherein the one or more first formatting features comprises at least one member selected from the group consisting of: a feature indicating whether the line of text starts with a bullet, a font color of a first token or one or more subsequent tokens in the line of text, a name of a font of the first token or the one or more subsequent tokens in the line of text, a font size of the first token or the one or more subsequent tokens in the line of text, a feature indicating whether the line of text is aligned in a particular way, a feature indicating whether the first token is upper case or lower case, a feature indicating a vertical distance of the line of text from a nearest line of text above the line of text, and a feature indicating an amount of empty space between the first token and a last token in the line of text.

11. The at least one non-transitory computer-readable storage medium of claim 7, wherein the first subsection includes text describing a first credential, wherein the second subsection includes text describing a second credential, and wherein processing the text in the plurality of subsections comprises:
identifying first text in the first subsection as a first attribute of the first credential; and
identifying second text in the second subsection as a second attribute of the second credential based on formatting of the first text.

12. The at least one non-transitory computer-readable storage medium of claim 7, wherein the first plurality of clusters comprises the first cluster and a second cluster, the cluster identified as containing the beginning lines of text is the first cluster, and identifying the cluster containing the beginning lines of text comprises identifying that the first cluster has a smaller number of lines of text than the second cluster.

13. A system comprising:
at least one computer hardware processor configured to perform:
accessing an electronic version of a resume of a person;
automatically parsing the resume at least in part by:
identifying, based at least in part on formatting of the resume, a plurality of sections in the resume including a first section, wherein identifying the plurality of sections comprises identifying a plurality of section headings at least in part by:
identifying a plurality of section heading candidates at least in part by:
identifying a first phrase in the resume as a first section heading candidate based, at least in part, on content of the first phrase, and
identifying a second phrase in the resume as a second section heading candidate when at least a threshold number of formatting characteristics of the second phrase match those of the first phrase; and
selecting, based on one or more attributes of the plurality of section heading candidates, the plurality of section headings from the plurality of section heading candidates;
identifying, based at least in part on content in the first section and formatting of the content, a plurality of subsections of the first section including a first subsection and a second subsection, the identifying comprising:
generating one or more first formatting features and one or more first content features for each line of text of multiple lines of text in the first section,
clustering the multiple lines of text in the first section based on the one or more first formatting features and the one or more first content features to obtain a first plurality of clusters including a first cluster, the first cluster comprising at least one line of text from the first subsection of the plurality of subsections of the first section and at least one line of text from the second subsection of the plurality of subsections of the first section,
identifying, from the first plurality of clusters, a cluster containing beginning lines of text of multiple subsections of the first section, and
identifying the plurality of subsections of the first section based, at least in part, on the identified cluster containing the beginning lines of text of the multiple subsections of the first section; and processing text in the plurality of subsections to identify a plurality of credentials and associated attributes; and populating an online profile for the person to reflect the plurality of credentials and the associated attributes, wherein the online profile for the person is one of a plurality of online profiles associated with a plurality of users of an online service.

14. The system of claim 13, wherein selecting, based on the one or more attributes of the plurality of section heading candidates, the plurality of section headings from the plurality of section heading candidates comprises:

identifying, based on the one or more attributes, a first set of section heading candidates of the plurality of section heading candidates that are unlikely to be section headings;

identifying a second set of section heading candidates of the plurality of section heading candidates that are likely to be section headings; and selecting the second set of section heading candidates as the plurality of section headings in the resume.

15. The system of claim 13, wherein the plurality of sections in the resume include a second section, and the method further comprises:

identifying a plurality of subsections of the second section at least in part by:

generating one or more second formatting features and one or more second content features for each line of text of multiple lines of text in the second section, the one or more second formatting features and the one or more second content features being different from the one or more first formatting features and the one or more first content features associated with the first section;

clustering the multiple lines of text in the second section based on the one or more second formatting features and the one or more second content features to obtain a second plurality of clusters including a second cluster, the second cluster comprising at least one line of text from a first subsection of the plurality of subsections of the second section and at least one line of text from a second subsection of the plurality of subsections of the second section;

identifying, from the second plurality of clusters, a cluster containing beginning lines of text of multiple subsections of the second section; and identifying the plurality of subsections of the second section based, at least in part, on the identified cluster containing the beginning lines of text of the multiple subsections of the second section.

16. The system of claim 13, wherein the one or more first formatting features comprises at least one member selected from the group consisting of: a feature indicating whether the line of text starts with a bullet, a font color of a first token or one or more subsequent tokens in the line of text, a name of a font of the first token or the one or more subsequent tokens in the line of text, a font size of the first token or the one or more subsequent tokens in the line of text, a feature indicating whether the line of text is aligned in a particular way, a feature indicating whether the first token is upper case or lower case, a feature indicating a vertical distance of the line of text from a nearest line of text above the line of text, and a feature indicating an amount of empty space between the first token and a last token in the line of text.

17. The system of claim 13, wherein the first subsection includes text describing a first credential, wherein the second subsection includes text describing a second credential, and wherein processing the text in the plurality of subsections comprises:

identifying first text in the first subsection as a first attribute of the first credential; and identifying second text in the second subsection as a second attribute of the second credential based on formatting of the first text.

18. The method of claim 1, wherein the one or more first content features comprises at least one member selected from the group consisting of: a feature indicating whether the line of text contains a job title, a feature indicating whether the line of text contains a date, a feature indicating whether a line of text contains a start date and an end date, a feature indicating whether a next line of text in the first section contains a date, a feature indicating whether the next line of text in the first section contains a start date and an end date, a feature indicating whether the line of text contains a name of a location, a feature indicating whether the line of text contains a name of a degree, a feature indicating whether the next line of text in the first section contains a name of a degree, a feature indicating whether the line of text contains a grade or grade point average, a feature indicating whether the next line of text in the first section contains a grade or grade point average, a feature indicating whether the line of text contains a field of a degree, a feature indicating whether the next line of text in the first section contains a field of a degree, a feature indicating whether the line of text contains a name of a school, and a feature indicating whether the next line of text in the first section contains a name of a school.

19. The at least one non-transitory computer-readable storage medium of claim 7, wherein the one or more first content features comprises at least one member selected from the group consisting of: a feature indicating whether the line of text contains a job title, a feature indicating whether the line of text contains a date, a feature indicating whether a line of text contains a start date and an end date, a feature indicating whether a next line of text in the first section contains a date, a feature indicating whether the next line of text in the first section contains a start date and an end date, a feature indicating whether the line of text contains a name of a location, a feature indicating whether the line of text contains a name of a degree, a feature indicating whether the next line of text in the first section contains a name of a degree, a feature indicating whether the line of text contains a grade or grade point average, a feature indicating whether the next line of text in the first section contains a grade or grade point average, a feature indicating whether the line of text contains a field of a degree, a feature indicating whether the next line of text in the first section contains a field of a degree, a feature indicating whether the line of text contains a name of a school, and a feature indicating whether the next line of text in the first section contains a name of a school.

20. The system of claim 13, wherein the one or more first content features comprises at least one member selected from the group consisting of: a feature indicating whether the line of text contains a job title, a feature indicating whether the line of text contains a date, a feature indicating whether a line of text contains a start date and an end date, a feature indicating whether a next line of text in the first section contains a date, a feature indicating whether the next line of text in the first section contains a start date and an end date, a feature indicating whether the line of text contains a name of a location, a feature indicating whether the line of text contains a name of a degree, a feature indicating whether the next line of text in the first section contains a name of a degree, a feature indicating whether the line of text contains a grade or grade point average, a feature indicating whether the next line of text in the first section contains a grade or grade point average, a feature indicating whether the line of text contains a field of a degree, a feature indicating whether the next line of text in the first section contains a field of a degree, a feature indicating whether the line of text contains a name of a school, and a feature indicating whether the next line of text in the first section contains a name of a school.

21. The method of claim 1, wherein the one or more attributes of the plurality of section heading candidates comprises at least one member selected from the group consisting of: an attribute indicating whether a section heading candidate includes at least a threshold number of words, an attribute indicating whether a section heading candidate contains any character that is not a letter, an attribute indicating whether a section heading candidate includes a date, and an attribute indicating whether a section heading candidate occurs in a middle of other text on a same line.

22. The at least one non-transitory computer-readable storage medium of claim 7, wherein the one or more attributes of the plurality of section heading candidates comprises at least member selected from the group consisting of: an attribute indicating whether a section heading candidate includes at least a threshold number of words, an attribute indicating whether a section heading candidate contains any character that is not a letter, an attribute indicating whether a section heading candidate includes a date, and an attribute indicating whether a section heading candidate occurs in a middle of other text on a same line.

23. The system of claim 13, wherein the one or more attributes of the plurality of section heading candidates comprises at least one member selected from the group consisting of: an attribute indicating whether a section heading candidate includes at least a threshold number of words, an attribute indicating whether a section heading candidate contains any character that is not a letter, an attribute indicating whether a section heading candidate includes a date, and an attribute indicating whether a section heading candidate occurs in a middle of other text on a same line.

* * * * *